US009424594B2

(12) United States Patent
Courtney, III et al.

(10) Patent No.: US 9,424,594 B2
(45) Date of Patent: *Aug. 23, 2016

(54) SYSTEM FOR TARGETING LOCATION-BASED COMMUNICATIONS

(71) Applicant: Muzak LLC, Fort Mill, SC (US)

(72) Inventors: Gordon Howard Courtney, III, Charlotte, NC (US); Russell John Hammond, Charlotte, NC (US); James Hodges McAliley, Rock Hill, SC (US)

(73) Assignee: Muzak LLC, Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/856,269

(22) Filed: Sep. 16, 2015

(65) Prior Publication Data
US 2016/0005079 A1  Jan. 7, 2016

Related U.S. Application Data

(63) Continuation of application No. 14/798,020, filed on Jul. 13, 2015, which is a continuation of application No. 13/933,007, filed on Jul. 1, 2013, now Pat. No. 9,099,080, application No. 14/856,269, which is a
(Continued)

(51) Int. Cl.
G06F 21/00 (2013.01)
G06Q 30/02 (2012.01)
(Continued)

(52) U.S. Cl.
CPC ........ *G06Q 30/0261* (2013.01); *G06Q 30/0259* (2013.01); *G06Q 30/0267* (2013.01); *G10L 19/018* (2013.01); *H04L 67/18* (2013.01); *H04L 67/2823* (2013.01)

(58) Field of Classification Search
CPC .................................................. G06Q 30/0241
USPC ...................................................... 705/10, 51
See application file for complete search history.

(56) References Cited

U.S. PATENT DOCUMENTS 5,450,490 A  9/1995 Jensen et al.
5,579,124 A  11/1996 Aijala et al.
(Continued)

FOREIGN PATENT DOCUMENTS

EP       697670 A1    2/1996
JP    2007200013 A    8/2007
(Continued)

OTHER PUBLICATIONS

Australian Patent Office; Patent Examination Report No. 1, dated Nov. 25, 2015, for Australian Patent Application No. 2014214875, 2 pages.
(Continued)

*Primary Examiner* — Charles C Agwumezie
(74) *Attorney, Agent, or Firm* — Moore & Van Allen PLLC; Patrick B. Horne

(57) ABSTRACT

Embodiments of the invention are directed to systems, methods and computer program products for providing targeted location-based communications. An exemplary apparatus is configured to receive an encoded signal, decode the encoded signal such that embedded data is retrieved, send the embedded data a remote server; and receive a message based at least partially on sending the embedded data. Another exemplary apparatus is configured to provide the encoded signal by receiving data input, receiving a host signal, embedding the data input within the host signal such that an encoded signal is generated, and transmitting the encoded signal. A third exemplary apparatus is configured to provide the targeted communications by storing one or more messages associated with an entity, receiving data, selecting at least one of the one or more messages based at least partially on the data received, and sending the at least one of the one or more messages selected.

20 Claims, 43 Drawing Sheets

Related U.S. Application Data continuation of application No. 13/933,013, filed on Jul. 1, 2013, now Pat. No. 9,317,872.

(60) Provisional application No. 61/761,577, filed on Feb. 6, 2013, provisional application No. 61/838,766, filed on Jun. 24, 2013.

(51) Int. Cl.
*G10L 19/018* (2013.01)
*H04L 29/08* (2006.01)

(56) References Cited

U.S. PATENT DOCUMENTS

| | | |
|---|---|---|
| 5,581,800 A | 12/1996 | Fardeau et al. |
| 5,764,763 A | 6/1998 | Jensen et al. |
| 5,774,452 A | 6/1998 | Wolosewicz |
| 5,822,360 A | 10/1998 | Lee et al. |
| 5,889,868 A | 3/1999 | Moskowitz et al. |
| 5,905,800 A | 5/1999 | Moskowitz et al. |
| 5,913,040 A | 6/1999 | Rakavy et al. |
| 5,933,798 A | 8/1999 | Linnartz |
| 5,940,135 A | 8/1999 | Petrovic et al. |
| 5,945,932 A | 8/1999 | Smith et al. |
| 6,005,501 A | 12/1999 | Wolosewicz |
| 6,091,956 A * | 7/2000 | Hollenberg ............ G06Q 30/02 455/456.5 |
| 6,163,803 A | 12/2000 | Watanabe |
| 6,175,627 B1 | 1/2001 | Petrovic et al. |
| 6,252,972 B1 | 6/2001 | Linnartz |
| 6,359,573 B1 | 3/2002 | Taruguchi et al. |
| 6,392,548 B2 | 5/2002 | Farringdon et al. |
| 6,397,057 B1 | 5/2002 | Malackowski et al. |
| 6,414,635 B1 | 7/2002 | Stewart et al. |
| 6,421,445 B1 | 7/2002 | Jensen et al. |
| 6,427,012 B1 | 7/2002 | Petrovic |
| 6,452,498 B2 | 9/2002 | Stewart |
| 6,477,431 B1 | 11/2002 | Kalker et al. |
| 6,505,160 B1 | 1/2003 | Levy et al. |
| 6,505,223 B1 | 1/2003 | Haitsma et al. |
| 6,567,780 B2 | 5/2003 | Rhoads |
| 6,577,747 B1 | 6/2003 | Kalker et al. |
| 6,594,373 B1 | 7/2003 | Gustafson |
| 6,611,607 B1 | 8/2003 | Davis et al. |
| 6,625,297 B1 | 9/2003 | Bradley |
| 6,625,298 B1 | 9/2003 | Maes et al. |
| 6,671,388 B1 | 12/2003 | Op De Beeck et al. |
| 6,675,146 B2 | 1/2004 | Rhoads |
| 6,681,029 B1 | 1/2004 | Rhoads |
| 6,683,958 B2 | 1/2004 | Petrovic |
| 6,714,658 B2 | 3/2004 | Kalker et al. |
| 6,737,957 B1 | 5/2004 | Petrovic et al. |
| 6,754,822 B1 | 6/2004 | Zhao |
| 6,792,542 B1 | 9/2004 | Lee et al. |
| 6,839,556 B2 | 1/2005 | Malackowski et al. |
| 6,845,360 B2 | 1/2005 | Jensen et al. |
| 6,865,589 B2 | 3/2005 | Haitsma et al. |
| 6,871,180 B1 | 3/2005 | Neuhauser et al. |
| 6,901,514 B1 | 5/2005 | Iu et al. |
| 6,912,315 B1 | 6/2005 | Wong et al. |
| 6,944,298 B1 | 9/2005 | Rhoads |
| 6,957,393 B2 | 10/2005 | Fano et al. |
| 6,965,682 B1 | 11/2005 | Davis et al. |
| 6,975,746 B2 | 12/2005 | Davis et al. |
| 6,993,153 B2 | 1/2006 | Bradley |
| 6,993,284 B2 | 1/2006 | Weinblatt et al. |
| 6,993,326 B2 | 1/2006 | Link et al. |
| 6,996,237 B2 | 2/2006 | Jensen et al. |
| 7,007,166 B1 | 2/2006 | Moskowitz et al. |
| 7,020,304 B2 | 3/2006 | Alattar et al. |
| 7,054,465 B2 | 5/2006 | Rhoads |
| 7,071,842 B1 | 7/2006 | Brady, Jr. |
| 7,095,871 B2 | 8/2006 | Jones et al. |
| 7,107,451 B2 | 9/2006 | Moskowitz |
| 7,146,394 B2 | 12/2006 | Haitsma et al. |
| 7,159,118 B2 | 1/2007 | Petrovic |
| 7,171,018 B2 | 1/2007 | Rhoads et al. |
| 7,191,334 B1 | 3/2007 | Kalker |
| 7,197,156 B1 | 3/2007 | Levy |
| 7,239,981 B2 | 7/2007 | Kolessar et al. |
| 7,316,025 B1 | 1/2008 | Aijala et al. |
| 7,324,159 B2 | 1/2008 | Eveleens et al. |
| 7,330,562 B2 | 2/2008 | Hannigan et al. |
| 7,343,492 B2 | 3/2008 | Moskowitz et al. |
| 7,362,781 B2 | 4/2008 | Rhoads |
| 7,389,420 B2 | 6/2008 | Tian |
| 7,395,211 B2 | 7/2008 | Watson et al. |
| 7,437,430 B2 | 10/2008 | Rhoads |
| 7,483,547 B2 | 1/2009 | Hannigan et al. |
| 7,532,740 B2 | 5/2009 | Levy |
| 7,532,741 B2 | 5/2009 | Stach |
| 7,533,266 B2 | 5/2009 | Bruekers et al. |
| 7,536,555 B2 | 5/2009 | Rhoads |
| 7,543,148 B1 | 6/2009 | Kirovski et al. |
| 7,545,951 B2 | 6/2009 | Davis et al. |
| 7,562,392 B1 | 7/2009 | Rhoads et al. |
| 7,567,686 B2 | 7/2009 | Rhoads |
| 7,587,602 B2 | 9/2009 | Rhoads |
| 7,606,366 B2 | 10/2009 | Petrovic |
| 7,639,599 B2 | 12/2009 | Van Der Veen et al. |
| 7,657,057 B2 | 2/2010 | Davidson et al. |
| 7,664,332 B2 | 2/2010 | Wong et al. |
| 7,751,596 B2 | 7/2010 | Rhoads |
| 7,770,017 B2 | 8/2010 | Moskowitz et al. |
| 7,779,261 B2 | 8/2010 | Moskowitz et al. |
| 7,779,271 B2 | 8/2010 | Langelaar |
| 7,822,969 B2 | 10/2010 | Anglin |
| 7,844,072 B2 | 11/2010 | Van Leest et al. |
| 7,870,393 B2 | 1/2011 | Moskowitz et al. |
| 7,930,545 B2 | 4/2011 | Moskowitz |
| 7,950,031 B2 | 5/2011 | Weinblatt et al. |
| 7,953,270 B2 | 5/2011 | Rhoads |
| 7,961,881 B2 | 6/2011 | Jensen et al. |
| 7,987,245 B2 | 7/2011 | Rhoads |
| 7,991,188 B2 | 8/2011 | Moskowitz |
| 7,992,003 B2 | 8/2011 | Rhoads |
| 8,000,543 B2 | 8/2011 | Wong et al. |
| 8,014,762 B2 * | 9/2011 | Chmaytelli ....... G06F 17/30867 455/414.1 |
| 8,020,004 B2 | 9/2011 | Winograd |
| 8,027,663 B2 | 9/2011 | Rhoads |
| 8,051,294 B2 | 11/2011 | Rhoads |
| 8,055,012 B2 | 11/2011 | Rhoads |
| 8,073,933 B2 | 12/2011 | Rhoads |
| 8,103,051 B2 | 1/2012 | Tewfik et al. |
| 8,106,744 B2 | 1/2012 | Petrovic et al. |
| 8,122,257 B2 | 2/2012 | Rhoads et al. |
| 8,131,007 B2 | 3/2012 | Tewfik et al. |
| 8,140,848 B2 | 3/2012 | Brundage et al. |
| 8,151,113 B2 | 4/2012 | Rhoads |
| 8,161,286 B2 | 4/2012 | Moskowitz et al. |
| 8,165,598 B2 | 4/2012 | Tran et al. |
| 8,180,098 B2 | 5/2012 | Kalker |
| 8,185,100 B2 | 5/2012 | Jones et al. |
| 8,204,222 B2 | 6/2012 | Rhoads |
| 8,224,022 B2 | 7/2012 | Levy et al. |
| 8,250,595 B2 | 8/2012 | Weinblatt |
| 8,250,596 B2 | 8/2012 | Weinblatt |
| 8,255,693 B2 | 8/2012 | Rhoads |
| 8,260,113 B2 | 9/2012 | Aijala et al. |
| 8,281,140 B2 | 10/2012 | Moskowitz |
| 8,290,423 B2 | 10/2012 | Wang |
| 8,301,893 B2 | 10/2012 | Brundage |
| 8,306,811 B2 | 11/2012 | Tewfik et al. |
| 8,307,213 B2 | 11/2012 | Moskowitz et al. |
| 8,321,679 B2 | 11/2012 | Petrovic et al. |
| 8,332,478 B2 | 12/2012 | Levy et al. |
| 8,355,514 B2 | 1/2013 | Rhoads |
| 8,364,720 B2 | 1/2013 | Levy |
| 8,386,258 B2 | 2/2013 | Wang et al. |
| 8,401,569 B1 | 3/2013 | Bell et al. |
| 8,447,067 B2 | 5/2013 | Rhoads et al. |
| 8,467,525 B2 | 6/2013 | Moskowitz et al. |
| 8,474,059 B2 | 6/2013 | Petrovic |

(56) References Cited

U.S. PATENT DOCUMENTS

| | | | |
|---|---|---|---|
| 8,489,112 B2 | 7/2013 | Roeding et al. | |
| 8,489,598 B2 | 7/2013 | Rhoads et al. | |
| 8,505,108 B2 | 8/2013 | Rhoads | |
| 8,532,644 B2 | 9/2013 | Bell et al. | |
| 8,538,064 B2 | 9/2013 | Rhoads et al. | |
| 8,538,066 B2 | 9/2013 | Petrovic et al. | |
| 8,549,307 B2 | 10/2013 | Winograd | |
| 8,555,305 B2 | 10/2013 | Weinblatt et al. | |
| 9,099,080 B2* | 8/2015 | Courtney, III | H04L 67/2823 |
| 2002/0097873 A1 | 7/2002 | Petrovic | |
| 2002/0150247 A1 | 10/2002 | Linnartz et al. | |
| 2002/0184503 A1 | 12/2002 | Kalker et al. | |
| 2003/0033530 A1 | 2/2003 | Sharma et al. | |
| 2003/0103645 A1 | 6/2003 | Levy et al. | |
| 2003/0120940 A1 | 6/2003 | Vataja | |
| 2003/0144035 A1 | 7/2003 | Weinblatt et al. | |
| 2004/0023666 A1 | 2/2004 | Moon et al. | |
| 2004/0034778 A1 | 2/2004 | Celik | |
| 2004/0037449 A1 | 2/2004 | Davis et al. | |
| 2004/0102961 A1 | 5/2004 | Jensen et al. | |
| 2004/0121803 A1 | 6/2004 | Weinblatt et al. | |
| 2004/0230993 A1 | 11/2004 | Weinblatt et al. | |
| 2004/0260930 A1 | 12/2004 | Malik et al. | |
| 2005/0025314 A1 | 2/2005 | Van Der Veen et al. | |
| 2005/0043830 A1 | 2/2005 | Lee et al. | |
| 2005/0108535 A1 | 5/2005 | Bruekers et al. | |
| 2005/0207379 A1* | 9/2005 | Shen | H04L 12/58 370/338 |
| 2005/0267817 A1 | 12/2005 | Barton et al. | |
| 2006/0020963 A1 | 1/2006 | Weinblatt et al. | |
| 2006/0053292 A1 | 3/2006 | Langelaar | |
| 2006/0062386 A1 | 3/2006 | Rhoads | |
| 2006/0109984 A1 | 5/2006 | Rhoads | |
| 2006/0161776 A1 | 7/2006 | Van Der Veen et al. | |
| 2006/0161777 A1 | 7/2006 | Kalker et al. | |
| 2006/0174348 A1 | 8/2006 | Rhoads et al. | |
| 2006/0239501 A1 | 10/2006 | Petrovic et al. | |
| 2006/0251291 A1 | 11/2006 | Rhoads | |
| 2007/0174624 A1 | 7/2007 | Wolosewicz et al. | |
| 2007/0288952 A1 | 12/2007 | Weinblatt | |
| 2008/0139182 A1 | 6/2008 | Levy et al. | |
| 2008/0204273 A1 | 8/2008 | Crystal et al. | |
| 2008/0215333 A1 | 9/2008 | Tewfik et al. | |
| 2008/0240435 A1 | 10/2008 | Celik et al. | |
| 2008/0270575 A1 | 10/2008 | Rodriguez | |
| 2009/0239511 A1 | 9/2009 | Chen et al. | |
| 2009/0260027 A1 | 10/2009 | Weinblatt | |
| 2010/0058065 A1 | 3/2010 | Celik et al. | |
| 2010/0114344 A1 | 5/2010 | Hannaby | |
| 2010/0131767 A1 | 5/2010 | Rhoads | |
| 2010/0226494 A1 | 9/2010 | Lynch et al. | |
| 2010/0268540 A1 | 10/2010 | Arshi et al. | |
| 2010/0268573 A1 | 10/2010 | Jain et al. | |
| 2011/0029359 A1 | 2/2011 | Roeding et al. | |
| 2011/0029362 A1 | 2/2011 | Roeding et al. | |
| 2011/0029364 A1 | 2/2011 | Roeding et al. | |
| 2011/0029370 A1 | 2/2011 | Roeding et al. | |
| 2011/0117928 A1 | 5/2011 | Barresse et al. | |
| 2011/0208515 A1 | 8/2011 | Neuhauser | |
| 2011/0224992 A1 | 9/2011 | Chaoui et al. | |
| 2011/0238192 A1 | 9/2011 | Shah et al. | |
| 2011/0320259 A1 | 12/2011 | Roumeliotis et al. | |
| 2012/0011592 A1 | 1/2012 | Loytynoja et al. | |
| 2012/0084131 A1 | 4/2012 | Bergel et al. | |
| 2012/0173701 A1 | 7/2012 | Tenbrock | |
| 2012/0191231 A1 | 7/2012 | Wang | |
| 2012/0209686 A1 | 8/2012 | Horowitz et al. | |
| 2012/0214515 A1 | 8/2012 | Davis et al. | |
| 2012/0215637 A1 | 8/2012 | Hermann | |
| 2012/0239407 A1 | 9/2012 | Lynch et al. | |
| 2012/0271442 A1 | 10/2012 | Shah et al. | |
| 2012/0303147 A1 | 11/2012 | Shah et al. | |
| 2012/0317241 A1 | 12/2012 | Wang | |
| 2013/0010204 A1 | 1/2013 | Wang | |
| 2013/0054363 A1 | 2/2013 | Sasankan et al. | |
| 2013/0066633 A1 | 3/2013 | Krishnan | |
| 2013/0079058 A1 | 3/2013 | Bell et al. | |
| 2013/0096705 A1 | 4/2013 | Vestergaard et al. | |
| 2013/0138231 A1 | 5/2013 | McKenna et al. | |
| 2013/0142382 A1 | 6/2013 | Petrovic et al. | |
| 2013/0151855 A1 | 6/2013 | Petrovic et al. | |
| 2013/0151856 A1 | 6/2013 | Petrovic et al. | |
| 2013/0152210 A1 | 6/2013 | Petrovic et al. | |
| 2013/0170752 A1 | 7/2013 | Ramnath Krishnan et al. | |
| 2013/0227295 A1 | 8/2013 | Wabnik et al. | |
| 2013/0283402 A1 | 10/2013 | Petrovic | |
| 2013/0288723 A1 | 10/2013 | Bell et al. | |
| 2013/0297727 A1 | 11/2013 | Levy | |
| 2013/0339029 A1 | 12/2013 | Petrovic et al. | |
| 2014/0020018 A1 | 1/2014 | Narasimha | |
| 2014/0029786 A1 | 1/2014 | Winograd | |
| 2014/0046464 A1 | 2/2014 | Reimann | |
| 2014/0108780 A1* | 4/2014 | Jin | H04B 11/00 713/150 |

FOREIGN PATENT DOCUMENTS

| | | |
|---|---|---|
| KR | 10-2006-0055925 | 5/2006 |
| WO | WO-00/70585 A1 | 11/2000 |
| WO | WO-01/48682 A1 | 7/2001 |
| WO | WO-01/61987 A2 | 8/2001 |
| WO | WO-02/088904 A2 | 11/2002 |
| WO | WO-2006/116270 A2 | 11/2006 |
| WO | WO-2007/100963 A2 | 9/2007 |
| WO | WO-2007/101076 A2 | 9/2007 |
| WO | WO-2009/077944 A1 | 6/2009 |
| WO | WO-2009/081322 A1 | 7/2009 |
| WO | WO-2011/014292 A1 | 2/2011 |
| WO | WO-2012/037420 A1 | 3/2012 |
| WO | WO-2012/061760 A2 | 5/2012 |
| WO | WO-2012/092294 A1 | 5/2012 |
| WO | WO-2012/125269 A1 | 9/2012 |
| WO | WO-2013/055206 A1 | 4/2013 |
| WO | WO-2013/082285 A1 | 6/2013 |
| WO | WO-2013/090462 A1 | 6/2013 |
| WO | WO-2013/090466 A1 | 6/2013 |
| WO | WO-2013/102016 A1 | 7/2013 |
| WO | WO-2013/144092 A1 | 10/2013 |

OTHER PUBLICATIONS

Abstract "Digital Audio Resampling Home Page", pp. 1-20, https://ccrma.stanford.edu/~jos/resample/resample.pdf.
International Search Report and Written Opinion dated May 28, 2014 for International Application No. PCT/US2014/015146.
International Search Report and Written Opinion dated Jun. 3, 2014 for International Application No. PCT/US2014/015149.
Australian Patent Office; Patent Examination Report No. 1, dated Apr. 14, 2016, for Australian Patent Application No. 2014214876, 3 pages.

* cited by examiner

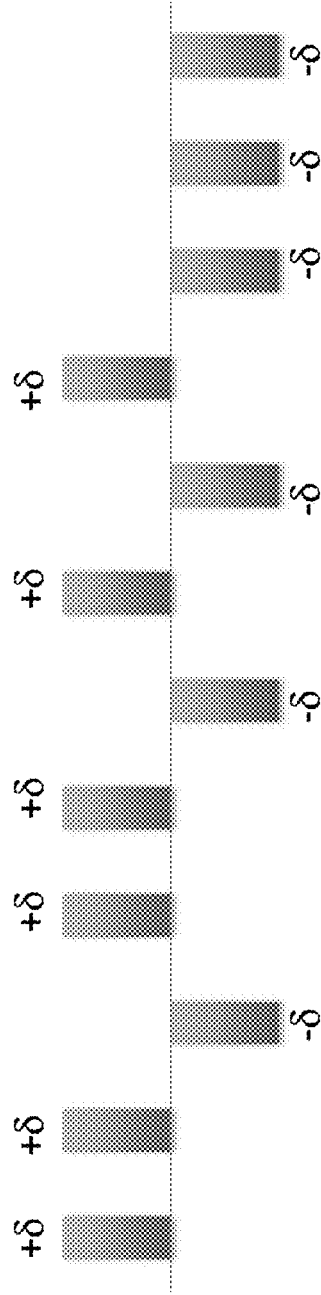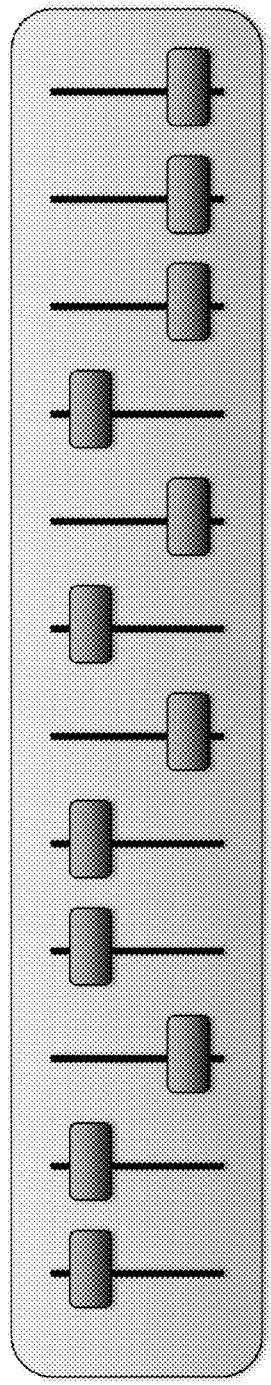
FIG. 11

Spread Spectrum: Embedding a 0-Bit
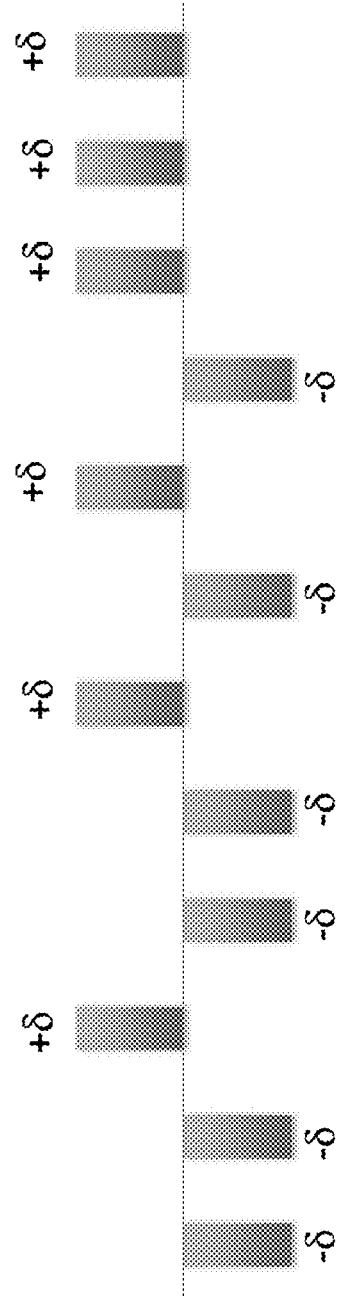
MESSAGE VECTOR FOR A "0" BIT IS INVERSE OF KEY SEQUENCE
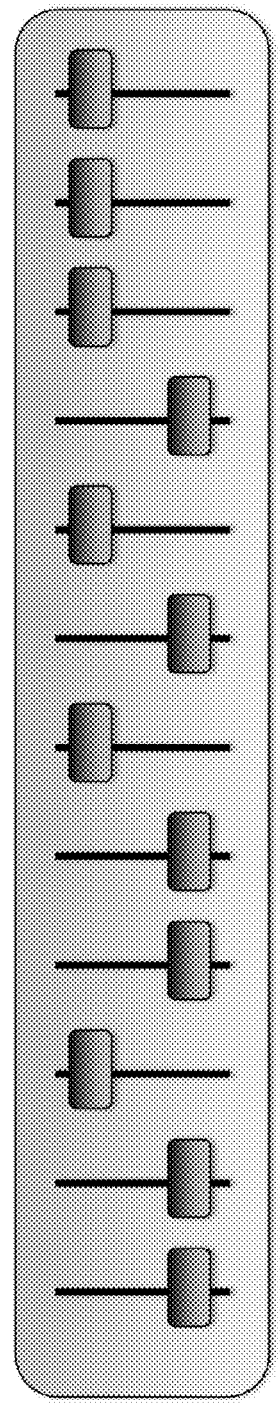
FIG. 12

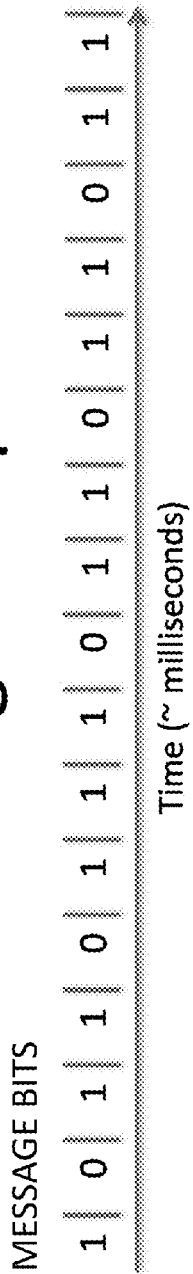
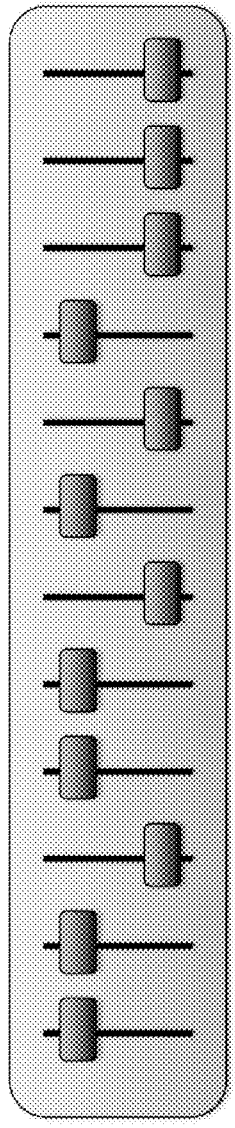
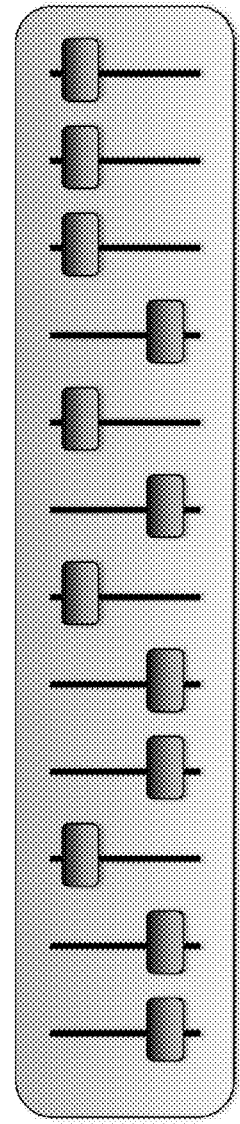
FIG. 13

If R < 0, then recovered signal is "0" - Bit

FIG. 38

| COMPANY:PRODUCT | | | | SIGN OUT |
|---|---|---|---|---|
| CAMPAIGNS | START DATE XX/XX/XXXX | END DATE XX/XX/XXXX | GO | |
| MEDIA CONTENT | SIGNAL READS BY LOCATION | | | EXPORT |
| ANALYTICS | DATE | SIGNAL LOCATION | COUNT | |
| DOCUMENTATION | NO DATA IS AVAILABLE IN THIS DATA RANGE. | | | |
| SUPPORT | SIGNAL READS BY CAMPAIGN | | | EXPORT |
| | DATE | CAMPAIGN | COUNT | |
| | NO DATA IS AVAILABLE IN THIS DATA RANGE. | | | |

SYSTEM FOR TARGETING LOCATION-BASED COMMUNICATIONS

CLAIMS OF PRIORITY UNDER 35 U.S.C. §119

This Non-provisional patent application is a continuation of and claims priority to U.S. patent application Ser. No. 14/798,020 entitled "SYSTEM FOR TARGETING LOCATION-BASED COMMUNICATIONS" filed Jul. 13, 2015, which is a continuation of and claims priority to U.S. patent application Ser. No. 13/933,007, entitled "SYSTEM FOR TARGETING LOCATION-BASED COMMUNICATIONS", filed Jul. 1, 2013, now U.S. Pat. No. 9,099,080 issued on Aug. 4, 2015, and further claims priority to U.S. Provisional Patent Application Ser. No. 61/761,577, filed Feb. 6, 2013, entitled "TARGETING LOCATION-BASED COMMUNICATIONS", and also claims priority to U.S. Provisional Patent Application Ser. No. 61/838,766, filed Jun. 24, 2013, entitled "TARGETING LOCATION-BASED COMMUNICATIONS", all of which are assigned to the assignee hereof and hereby expressly incorporated by reference herein. This Non-provisional patent application is a continuation of and claims priority to U.S. patent application Ser. No. 13/933,013 entitled "ENCODING AND DECODING AN AUDIO WATERMARK" filed Jul. 1, 2013, which claims priority to U.S. Provisional Patent Application Ser. No. 61/761,577, filed Feb. 6, 2013, entitled "TARGETING LOCATION-BASED COMMUNICATIONS", and also claims priority to U.S. Provisional Patent Application Ser. No. 61/838,766, filed Jun. 24, 2013, entitled "TARGETING LOCATION-BASED COMMUNICATIONS", all of which are assigned to the assignee hereof and hereby expressly incorporated by reference herein.

BACKGROUND

Typically, businesses have no way to identify consumers that are within their business location or to provide targeted communications to consumers who are present in the location. This limits the business to alternative means for providing consumers with relevant information as they frequent these locations. For example, merchants typically utilize mailing services to provide consumers with coupons, special in-store deals or sales ads. These methods fail to provide real-time location-specific communications, such as promotional offers, to consumers.

BRIEF SUMMARY

Embodiments of the invention are directed to systems, methods, and computer program products for providing location-based communications. Data input and a host signal are sent to an encoding device for encoding. The encoding device embeds the data input within a host signal to generate an encoded or watermarked signal. The embedded data is masked by the host signal, usually comprising an audio signal, and transmitted in conjunction with the audio signal throughout a merchant area by a broadcasting device. The encoded signal is received by a user's mobile device, which decodes the encoded signal and sends the embedded data or a signal based on the embedded data to a server application. The server application may look up the embedded data or otherwise determine at least one message to send to the mobile device based on the embedded data. For example, the server application may use a lookup table to determine a message corresponding with the embedded data. The server application then sends the message(s) to the mobile device for presentation to a user.

According to some embodiments of the invention, a system for provides communications to users present in at least one location of a plurality of locations and includes a message server to store one or more messages associated with a messaging campaign of a third party entity in a searchable database based on instructions received from the third party entity through a messaging campaign interface operatively connected with the message server; a content management server to store one or more instructions associated with the messaging campaign of the third party entity, the instructions comprising message data and instructions to cause an encoding device to generate at least one encoded signal comprising embedded data based on the message data; at least one encoding device maintained by a media distribution entity to generate at least one encoded signal comprising the embedded data based at least in part on instructions from the content management server; a plurality of broadcast devices maintained by the media distribution entity to broadcast the at least one encoded signal proximate at least one of the plurality of locations based at least in part on instructions from the content management server, the encoded signal being identifiable by mobile devices carried by users in the at least one location; and wherein the message server is further to receive the embedded data or other data representing the embedded data, wherein the embedded data or other data is transmitted by the at least one mobile device in response to the at least one mobile device identifying the embedded data; select at least one of the one or more messages based at least partially on the received embedded data or other data; and send the selected at least one message to the at least one mobile device.

In some embodiments, the message server comprises the content management server or the content management server comprises the message server. In some embodiments, the third party entity comprises a product supplier that supplies at least one product to the at least one location and the selected at least one message is associated with the at least one product.

In some embodiments, the media distribution entity manages a media distribution network comprising the plurality of broadcast devices and the at least one encoding device. In some such embodiments, at least one of a plurality of encoding devices is operably connected to each of the plurality of broadcast devices and wherein each encoding device generates at least one encoded signal based at least in part on instructions from the content management server. In some of these embodiments, the instructions from the content management server are received by the content management server from the third party entity through the messaging campaign interface operatively connected with the content management server. In others of these embodiments, the instructions from the content management server are received by the content management server from the media distribution entity through a media distribution interface operatively connected with the content management server.

According to some embodiments of the invention, a computer program product for providing communications to users present in at least one location of a plurality of locations includes a non-transitory computer-readable medium comprising a set of codes for causing a computer to store one or more messages, on a message server, the messages associated with a messaging campaign of a third party entity in a searchable database based on instructions received from the third party entity through a messaging campaign interface operatively connected with the message server; store one or more instructions, on a content management server, the instructions associated with the messaging campaign of the third party entity, the instructions comprising message data and instructions to cause an encoding device to generate at least one encoded signal comprising embedded data based on the message data; generate, using at least one encoding device maintained by a media distribution entity, at least one encoded signal comprising the embedded data based at least in part on instructions from the content management server; broadcast, using a plurality of broadcast devices maintained by the media distribution entity, to the at least one encoded signal proximate at least one of the plurality of locations based at least in part on instructions from the content management server, the encoded signal being identifiable by mobile devices carried by users in the at least one location; and receive, using the message server, the embedded data or other data representing the embedded data, wherein the embedded data or other data is transmitted by the at least one mobile device in response to the at least one mobile device identifying the embedded data; select, using the message server, at least one of the one or more messages based at least partially on the received embedded data or other data; and send, using the message server, the selected at least one message to the at least one mobile device.

In some embodiments, the message server comprises the content management server or the content management server comprises the message server. In some embodiments, the third party entity comprises a product supplier that supplies at least one product to the at least one location and the selected at least one message is associated with the at least one product.

In some embodiments, the media distribution entity manages a media distribution network comprising the plurality of broadcast devices and the at least one encoding device. In some such embodiments, at least one of a plurality of encoding devices is operably connected to each of the plurality of broadcast devices and wherein each encoding device generates at least one encoded signal based at least in part on instructions from the content management server. In other such embodiments, the instructions from the content management server are received by the content management server from the third party entity through the messaging campaign interface operatively connected with the content management server. In yet other such embodiments, the instructions from the content management server are received by the content management server from the media distribution entity through a media distribution interface operatively connected with the content management server.

According to embodiments of the invention, a method for providing communications to users present in at least one location of a plurality of locations includes storing one or more messages, on a message server, the messages associated with a messaging campaign of a third party entity in a searchable database based on instructions received from the third party entity through a messaging campaign interface operatively connected with the message server; storing one or more instructions, on a content management server, the instructions associated with the messaging campaign of the third party entity, the instructions comprising message data and instructions to cause an encoding device to generate at least one encoded signal comprising embedded data based on the message data; generating, using at least one encoding device maintained by a media distribution entity, at least one encoded signal comprising the embedded data based at least in part on instructions from the content management server; broadcasting, using a plurality of broadcast devices maintained by the media distribution entity, to the at least one encoded signal proximate at least one of the plurality of locations based at least in part on instructions from the content management server, the encoded signal being identifiable by mobile devices carried by users in the at least one location; and receiving, using the message server, the embedded data or other data representing the embedded data, wherein the embedded data or other data is transmitted by the at least one mobile device in response to the at least one mobile device identifying the embedded data; selecting, using the message server, at least one of the one or more messages based at least partially on the received embedded data or other data; and sending, using the message server, the selected at least one message to the at least one mobile device.

In some embodiments, the message server comprises the content management server or the content management server comprises the message server. In some embodiments, the third party entity comprises a product supplier that supplies at least one product to the at least one location and the selected at least one message is associated with the at least one product.

In some embodiments, the media distribution entity manages a media distribution network comprising the plurality of broadcast devices and the at least one encoding device. In some such embodiments, at least one of a plurality of encoding devices is operably connected to each of the plurality of broadcast devices and wherein each encoding device generates at least one encoded signal based at least in part on instructions from the content management server. In other such embodiments, the instructions from the content management server are received by the content management server from the third party entity through the messaging campaign interface operatively connected with the content management server. In yet other such embodiments, the instructions from the content management server are received by the content management server from the media distribution entity through a media distribution interface operatively connected with the content management server.

According to embodiments of the invention, a system for providing communications to users present in a location includes a message server to store one or more messages in a searchable database; at least one encoding device to generate at least one encoded signal; a content management server to store one or more instructions associated with the message, where the instructions cause the encoding device to generate at least one encoded signal comprising embedded data based on the message data; at least one broadcast device that broadcasts the at least one encoded signal at the location, the encoded signal being identifiable by mobile devices carried by users in the location; and wherein the message server is further to receive a signal or other data is transmitted by the at least one mobile device in response to the at least one mobile device identifying the embedded data; select at least one of the one or more messages based at least partially on the received signal or other data; and send the selected at least one message to the at least one mobile device.

According to embodiments of the invention, a system for providing communications to users present in at least one location of a plurality of locations includes a message server to store one or more messages associated with a messaging campaign of a third party entity in a searchable database based on instructions received from the third party entity through a messaging campaign interface operatively connected with the message server; a content management server to store one or more instructions associated with the messaging campaign of the third party entity, the instructions comprising message data and instructions to cause an encoding device to generate at least one encoded signal comprising embedded data based on the message data; at least one encoding device maintained by a media distribution entity to generate at least one encoded signal comprising the embedded data based at least in part on instructions from the content management server; a plurality of broadcast devices maintained by the media distribution entity to broadcast the at least one encoded signal proximate at least one of the plurality of locations based at least in part on instructions from the content management server, the encoded signal being identifiable by mobile devices carried by users in the at least one location; and a mobile device application running on at least one mobile device carried by a user in the at least one location, the mobile device application to decode the at least one encoded signal to determine the embedded data and communicate the decoded embedded data or other data representing the decoded embedded data to the message server; and wherein the message server is further to receive the embedded data or other data representing the embedded data from the mobile device application; select at least one of the one or more messages based at least partially on the received embedded data or other data; and send the selected at least one message to the mobile device application running on the at least one mobile device.

In some embodiments, the mobile device application comprises an application maintained by the third party entity. In some embodiments, the mobile device application comprises an application maintained by another third party entity without access to the messaging campaign interface or the one or more messages associated with the messaging campaign of the third party entity. In some such embodiments, the mobile device application further comprises a decoding application comprising a decoding key for use in decoding the at least one encoded signal, the decoding application provided by the media distribution entity to the other third party entity for integration with the application of the other third party entity; and wherein the media distribution entity manages access of the third party to the messaging campaign using an administrator role of the messaging campaign interface.

Additionally, the system may include a content management apparatus that enables the user to configure or control the content of the one or more message. In some embodiments, the user may create, edit, modify, manage, or delete content via a plurality of devices.

BRIEF DESCRIPTION OF THE DRAWINGS

Figure 1:
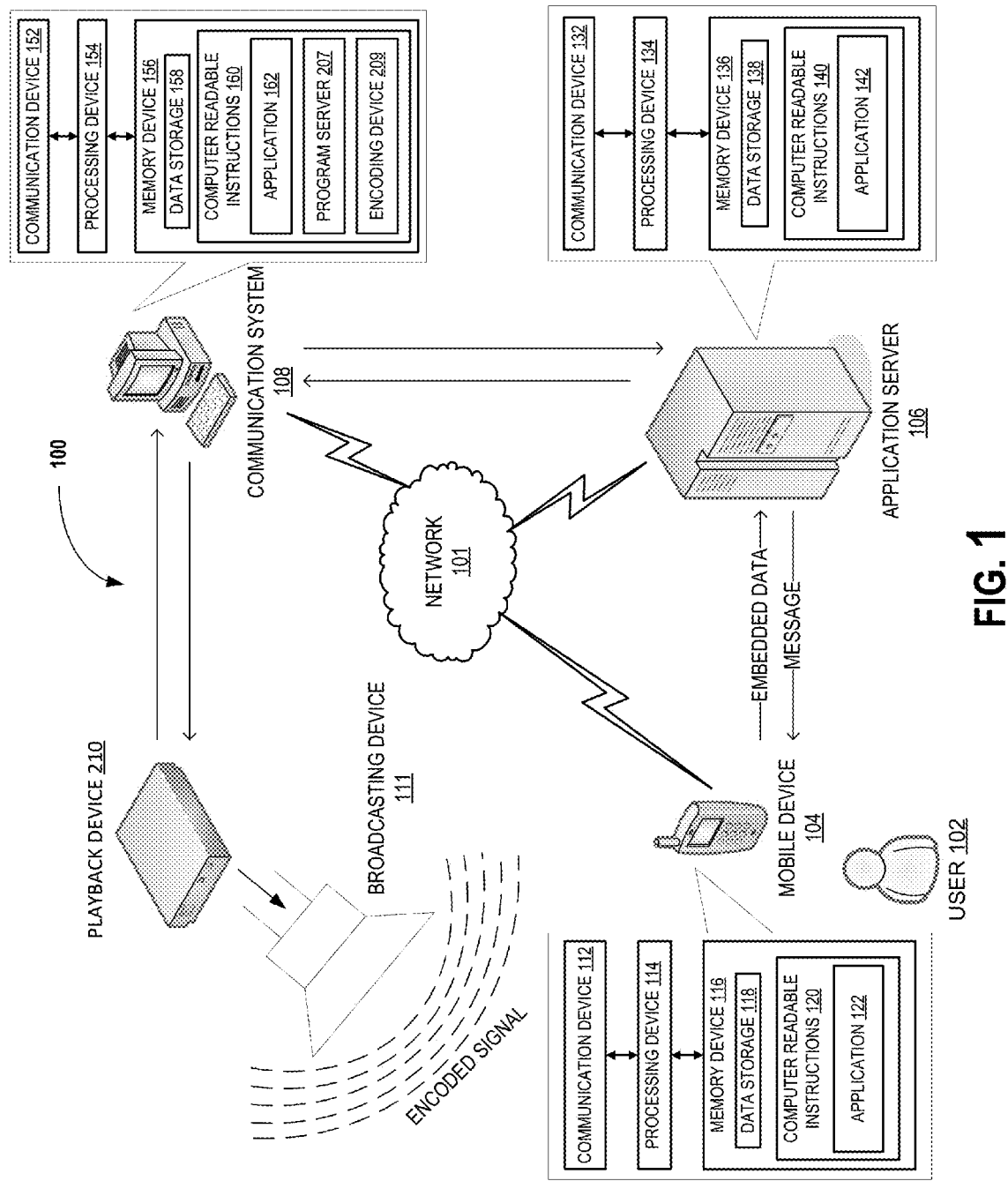
Figure 2:
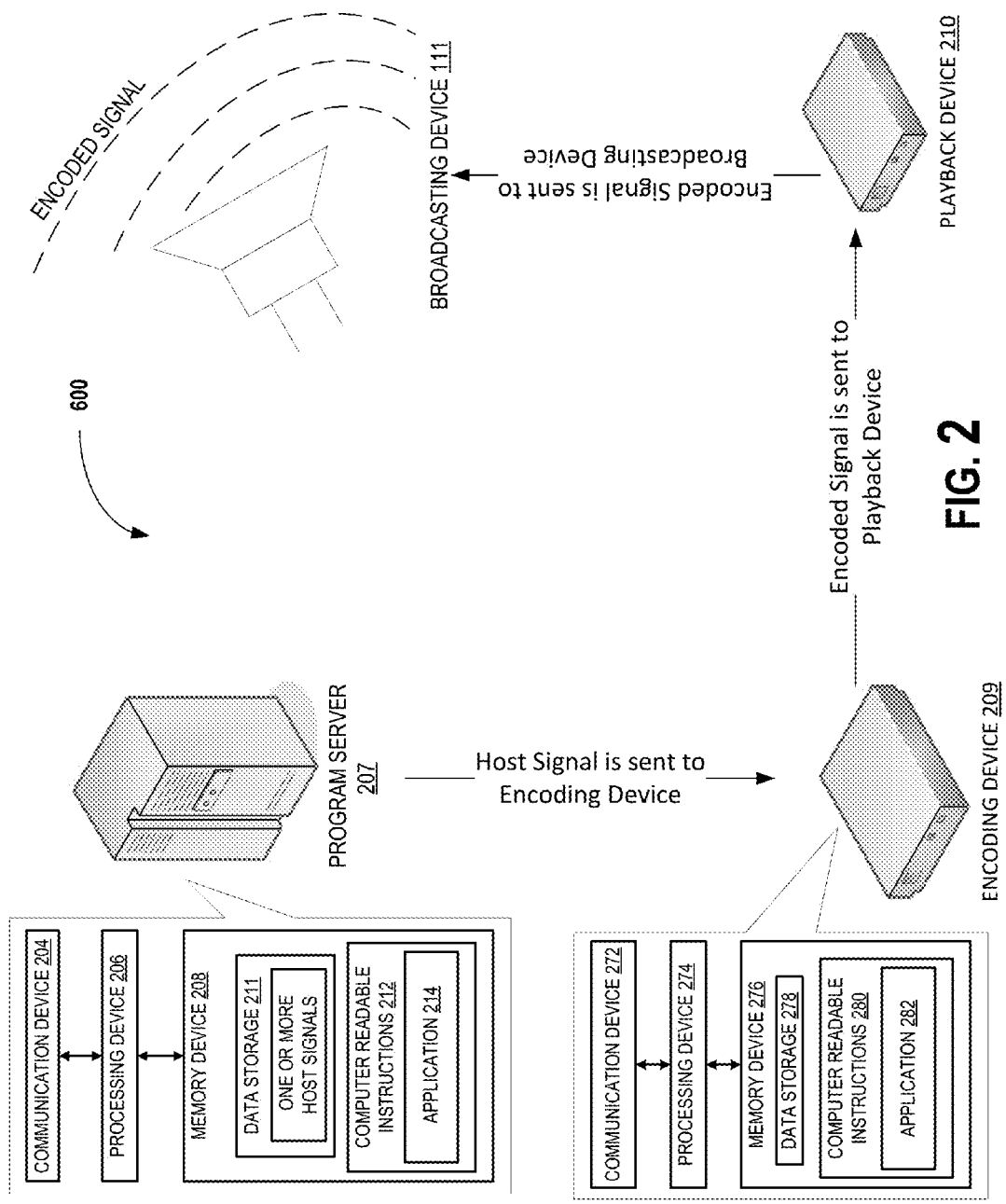
Figure 3:
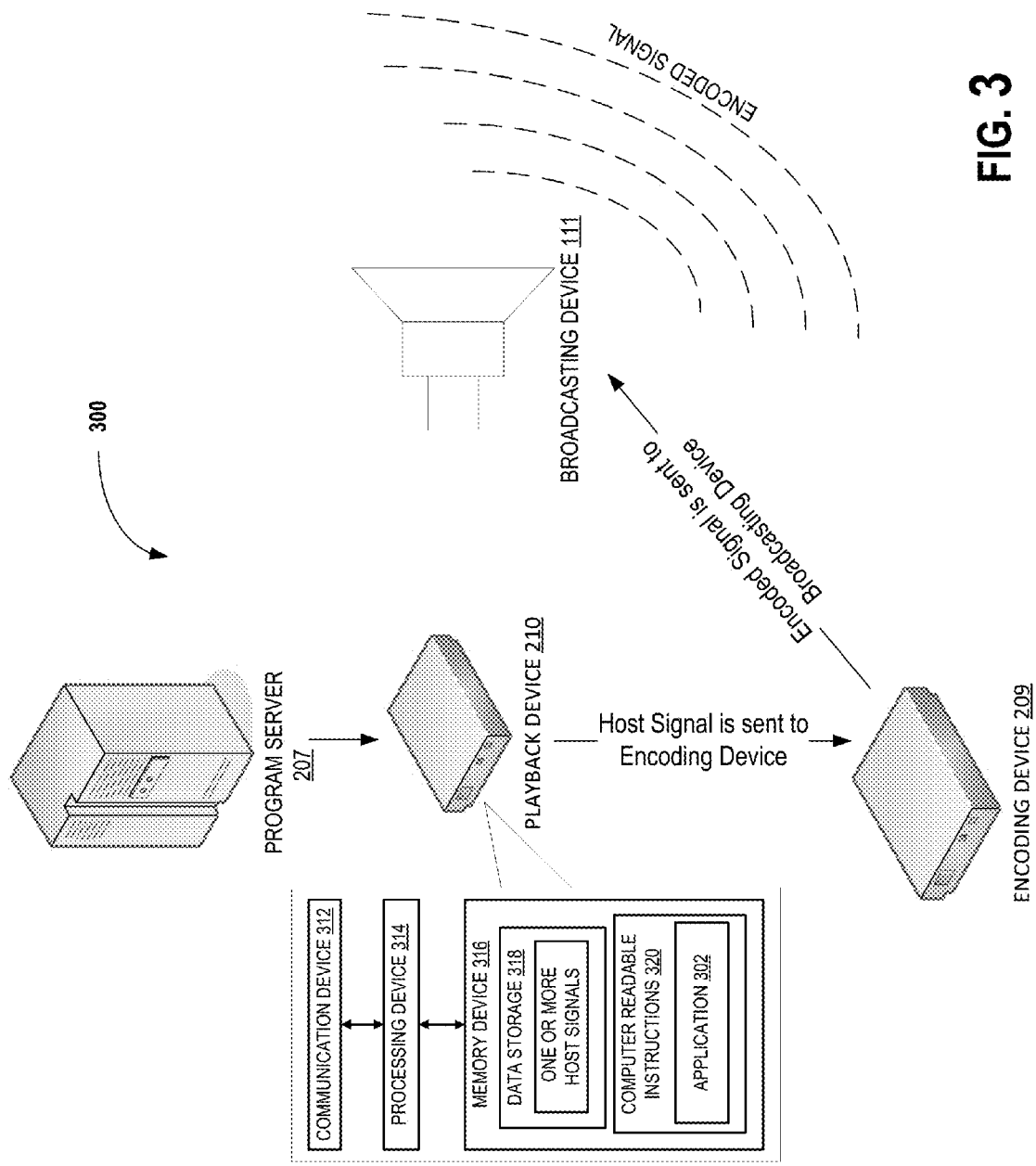
Figure 4:
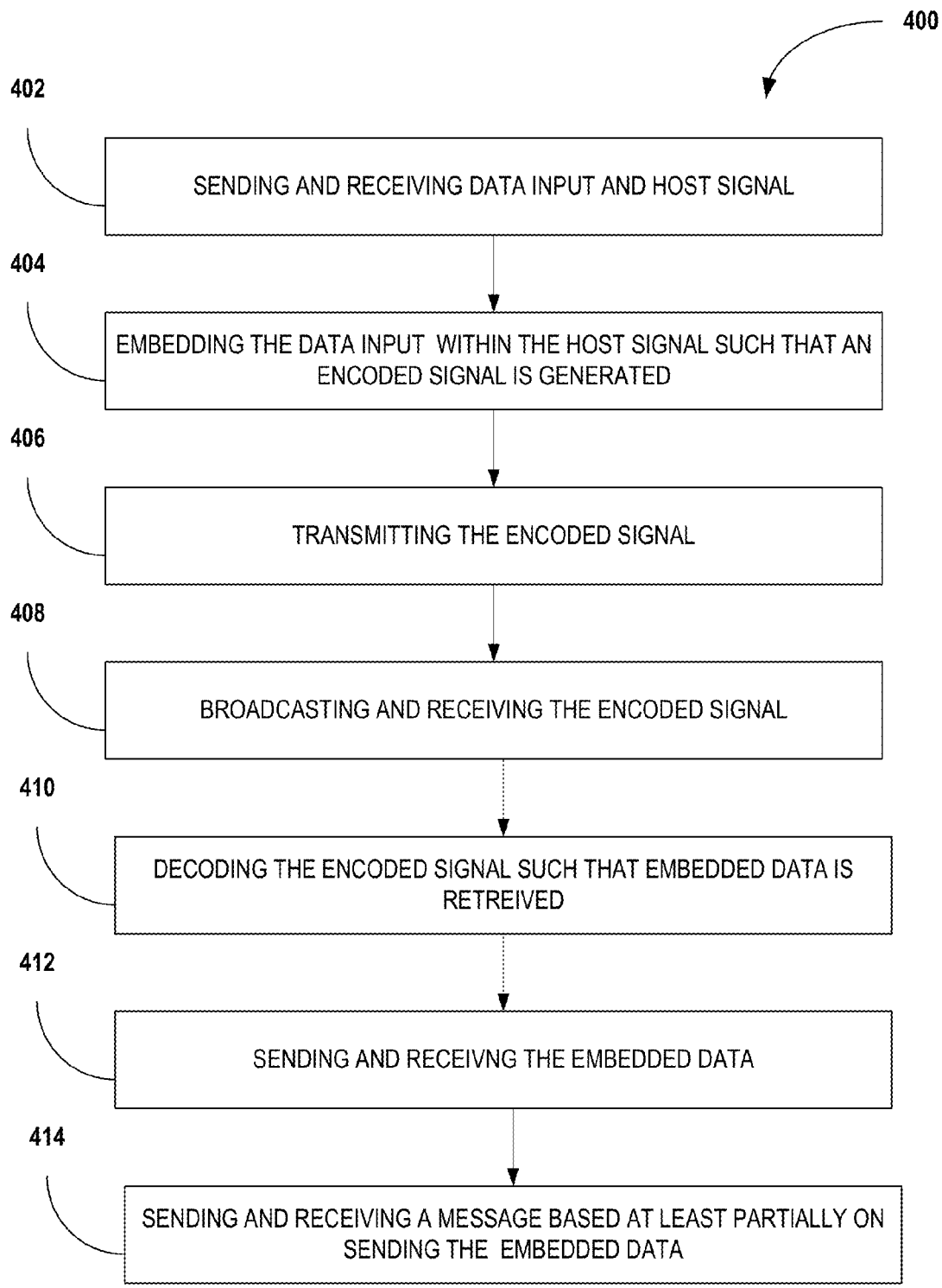
Figure 5:
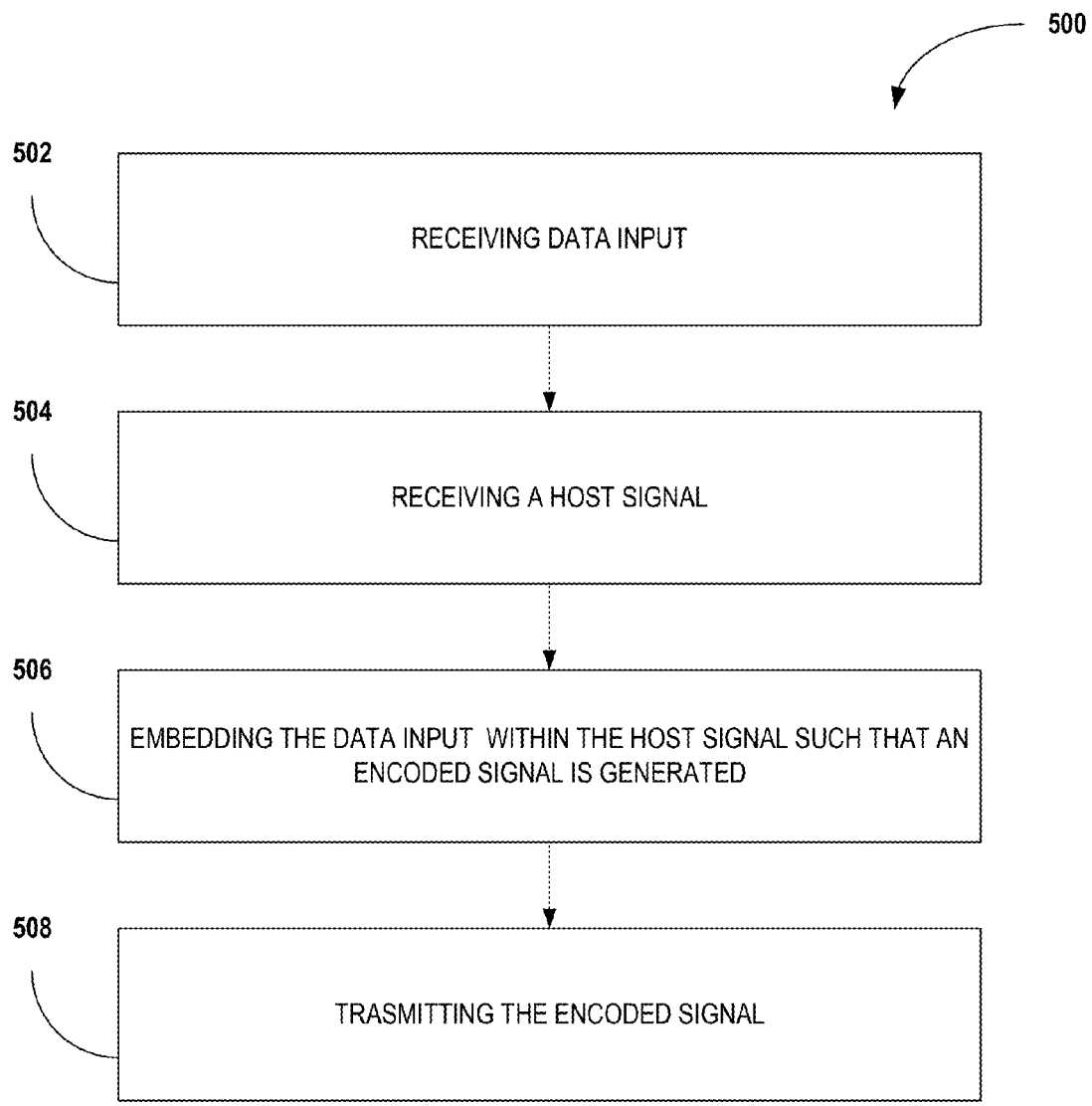
Figure 6:
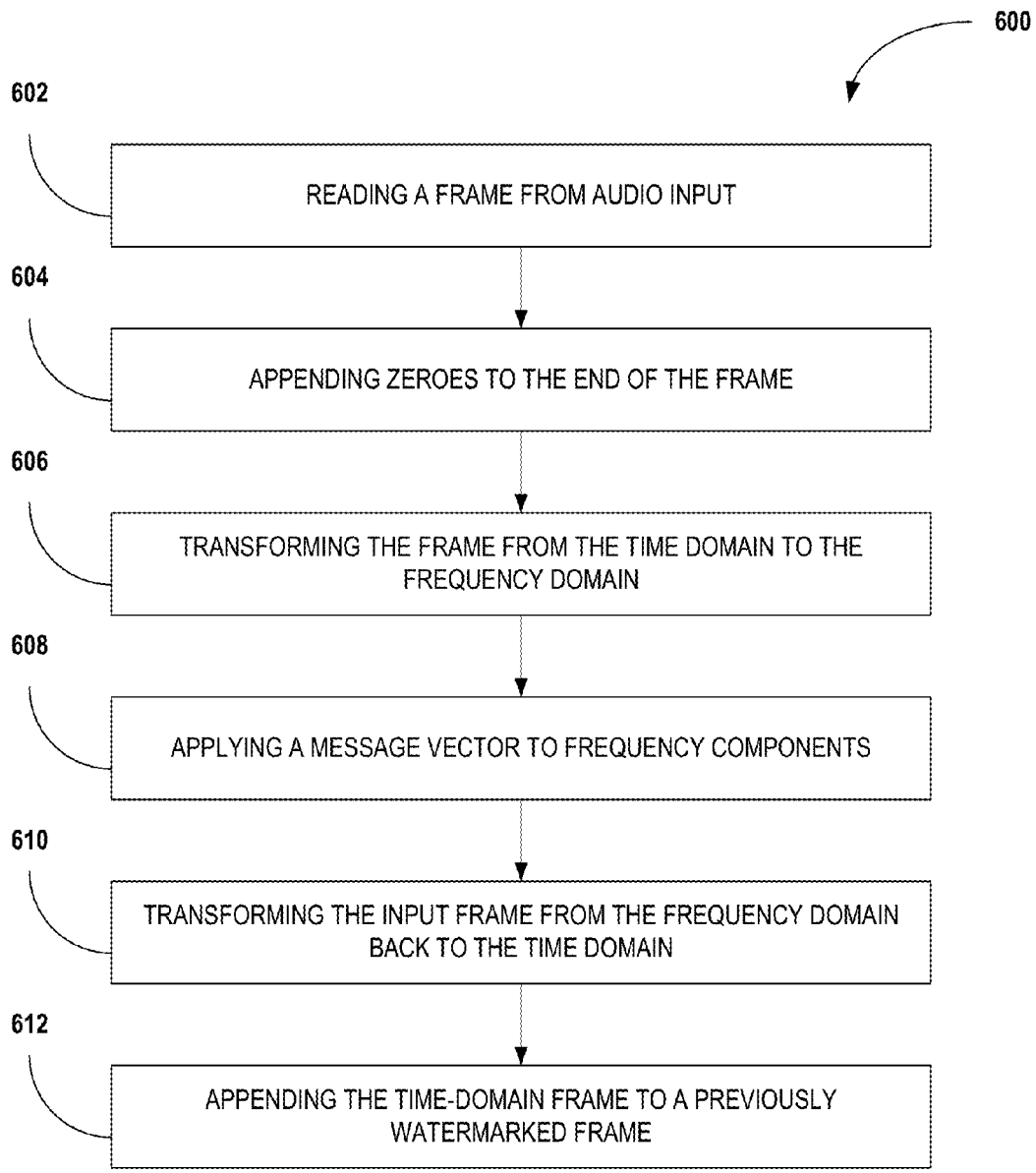
Figure 7:
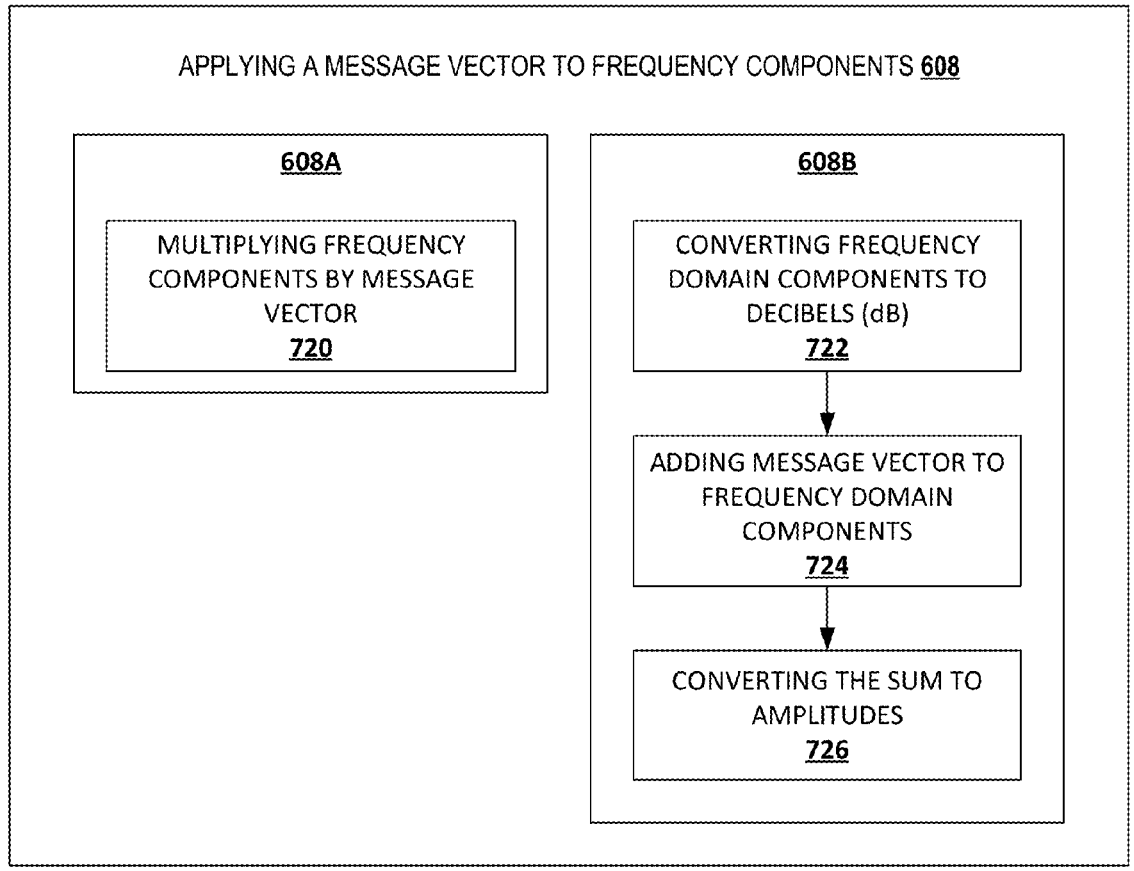
Figure 8:
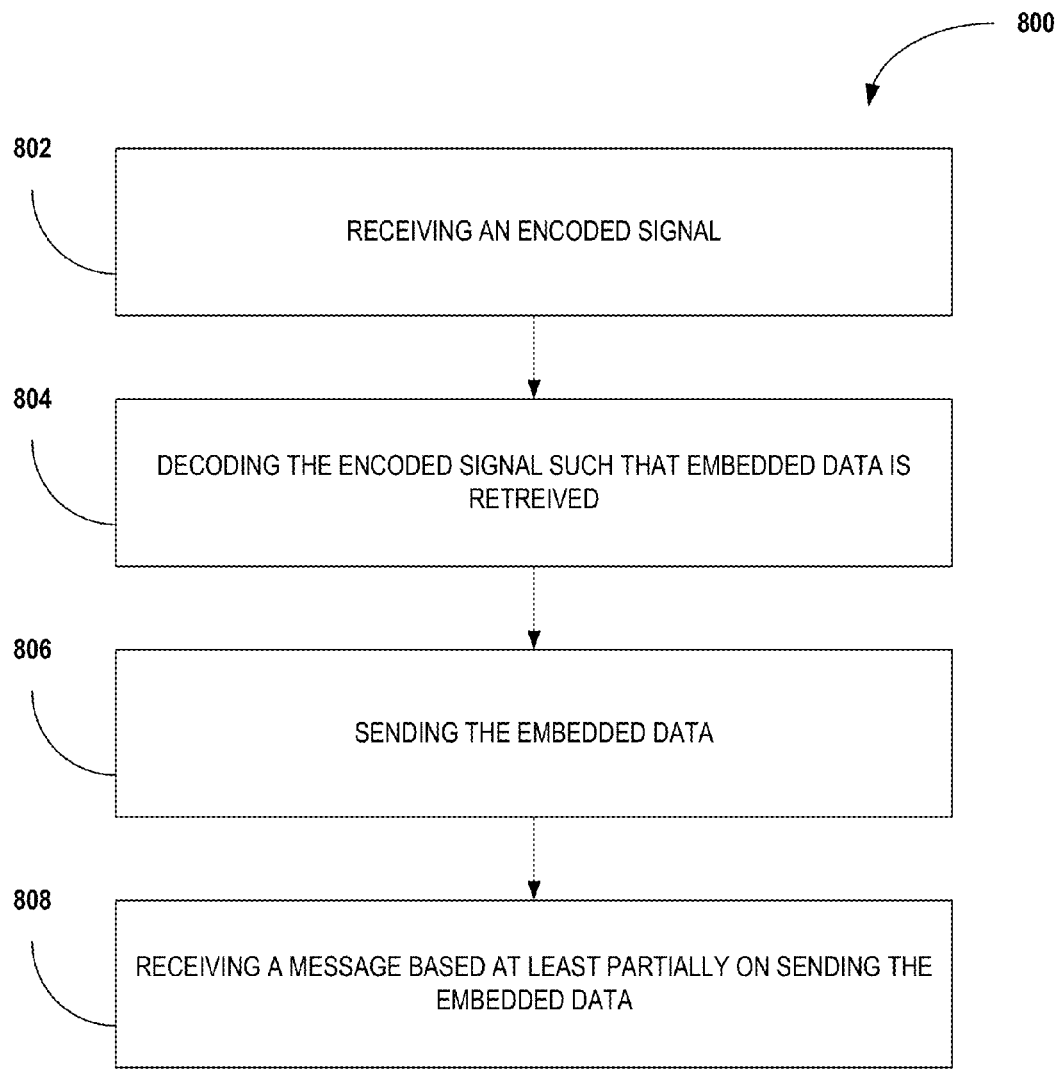
Figure 9:
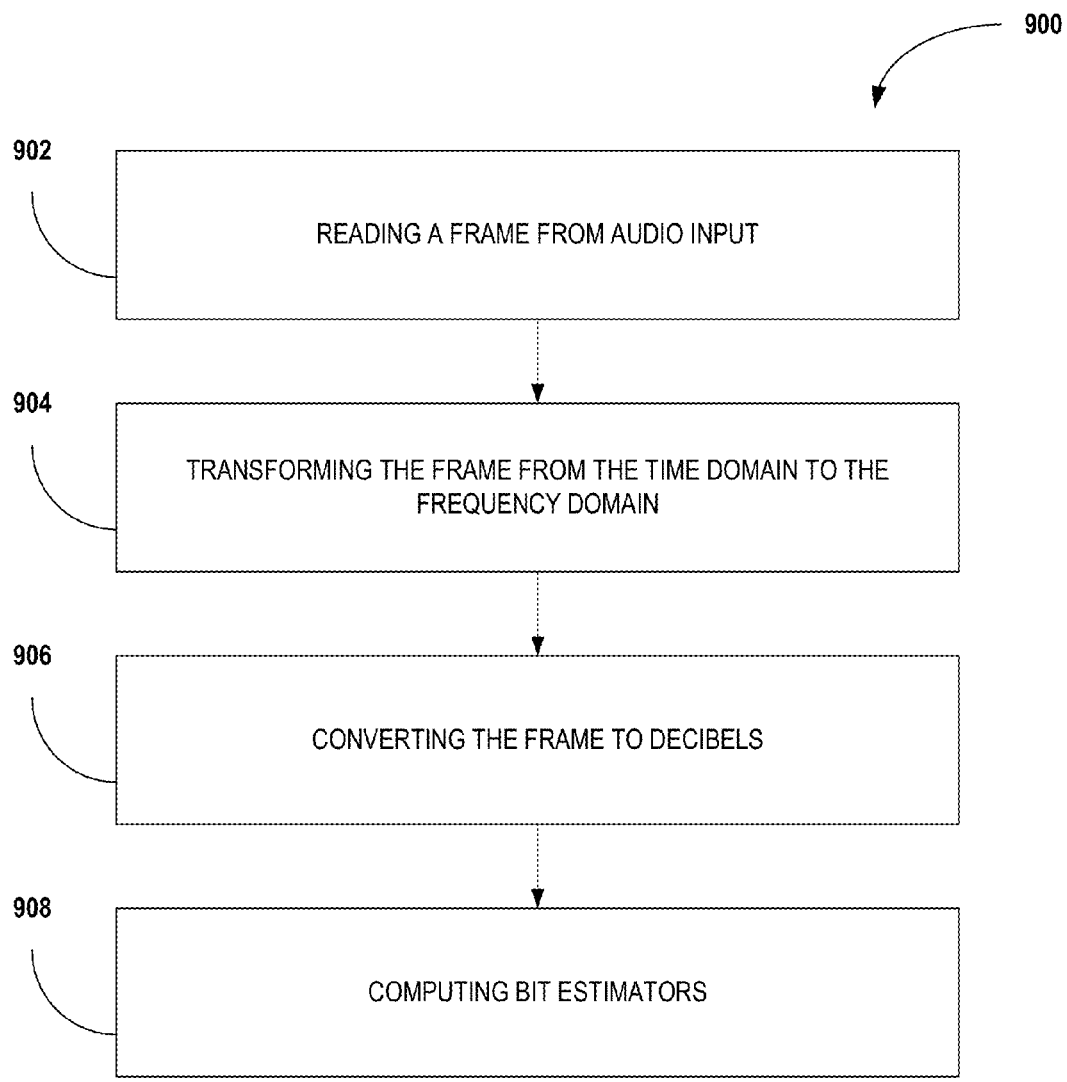
Figure 10:
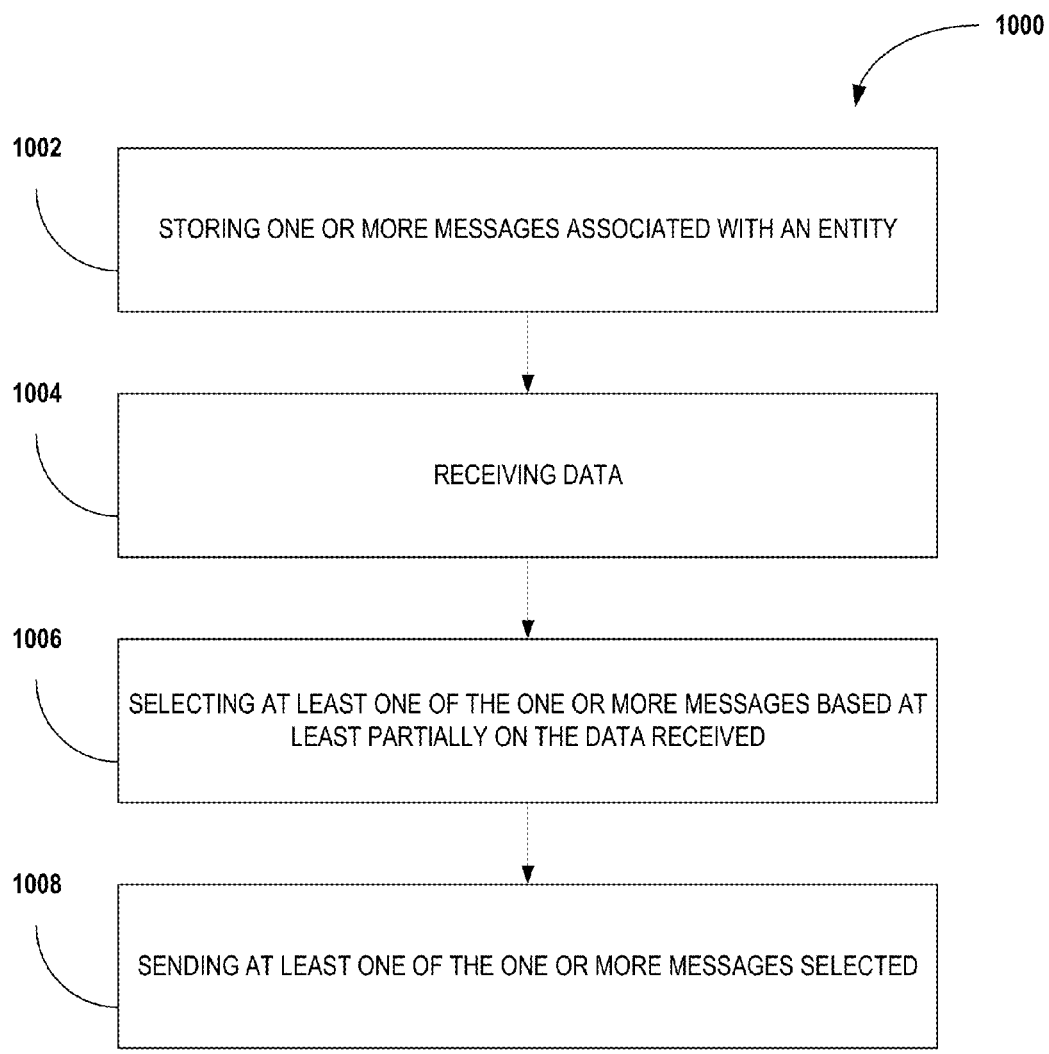
Figure 14:
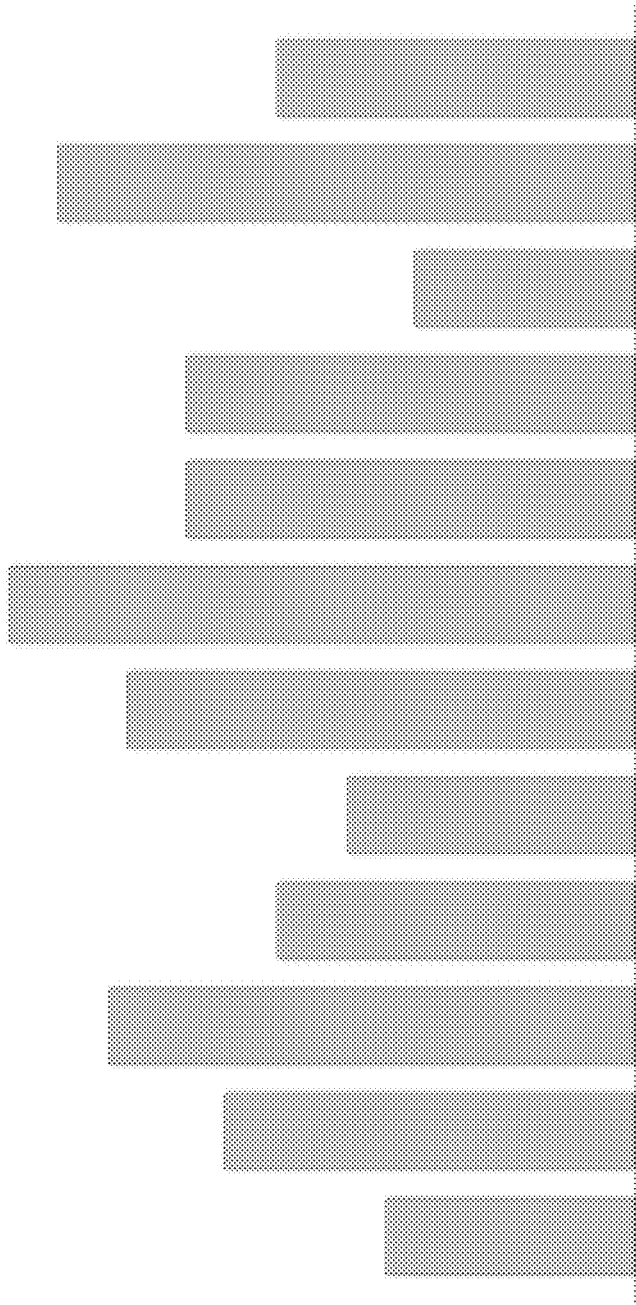
Figure 15:
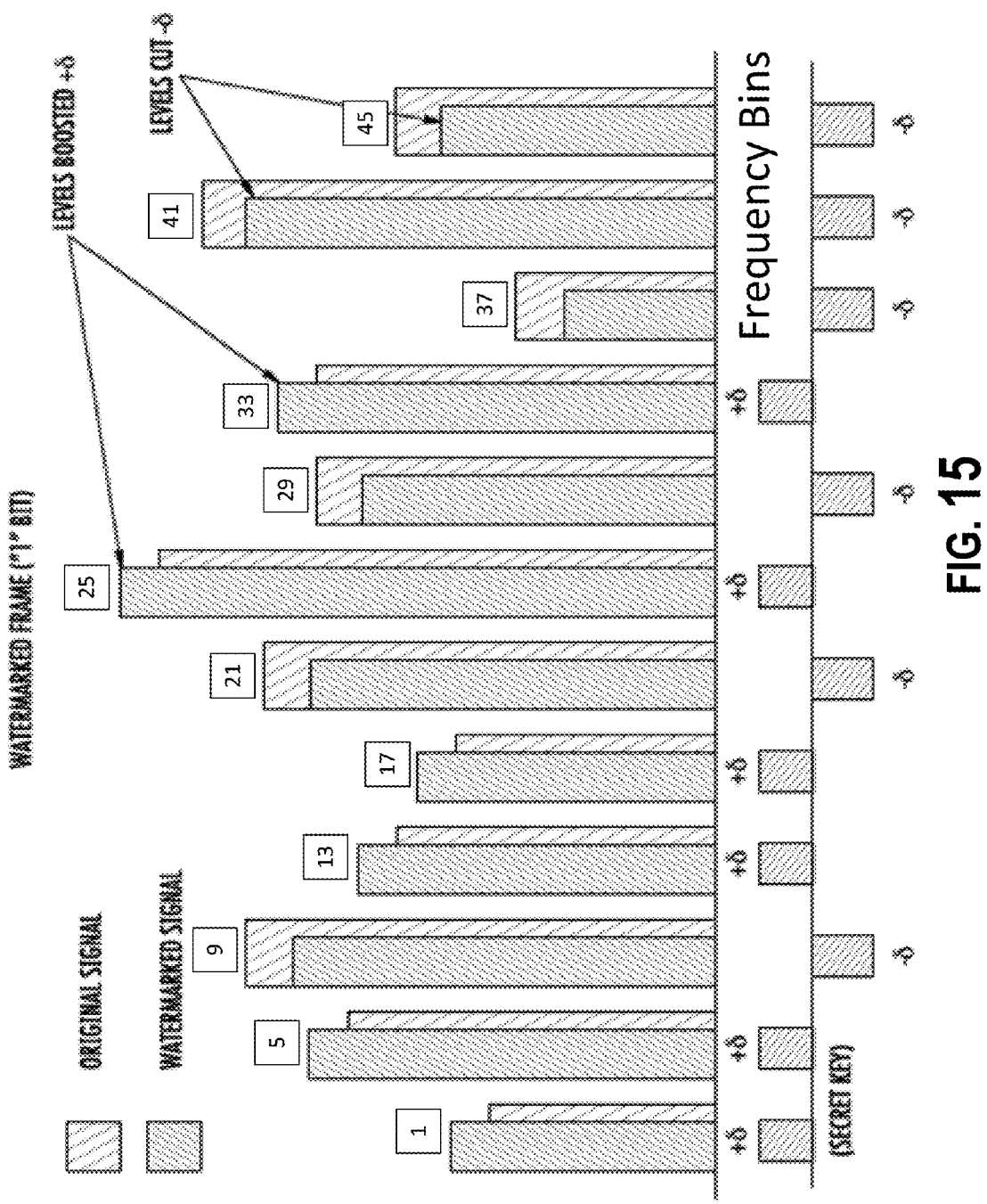
Figure 16:
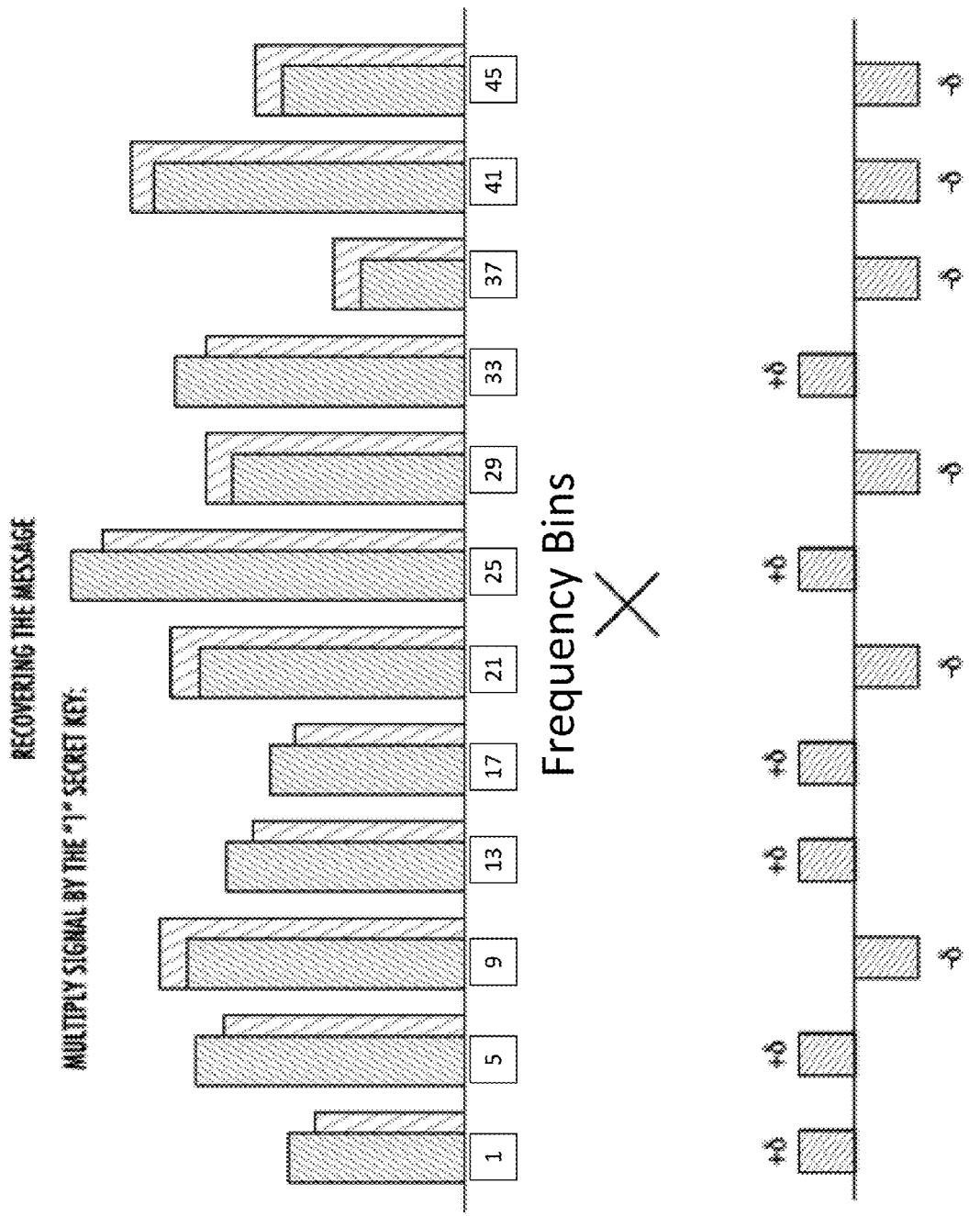
Figure 17:
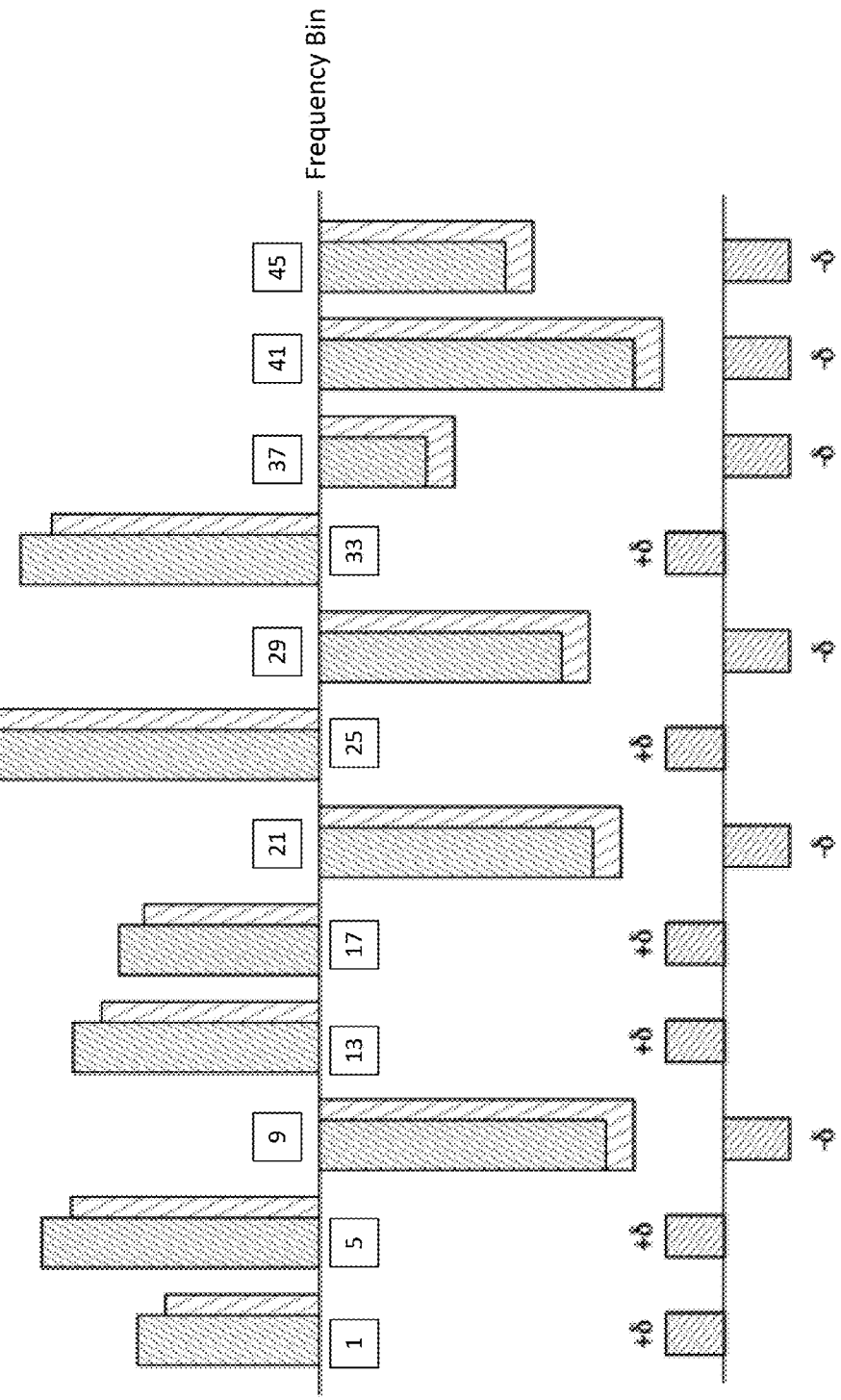
Figure 18:
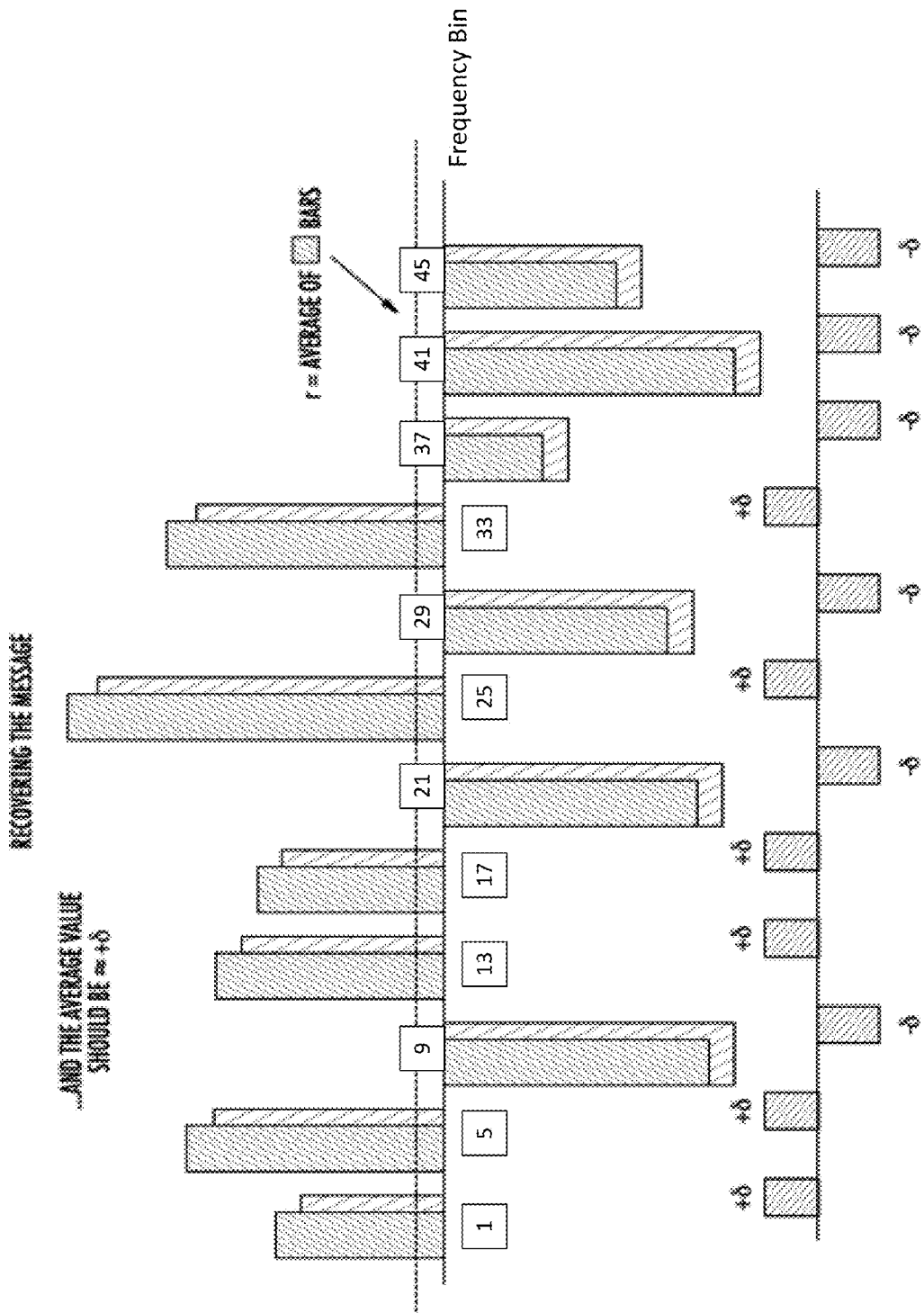
Figure 19:
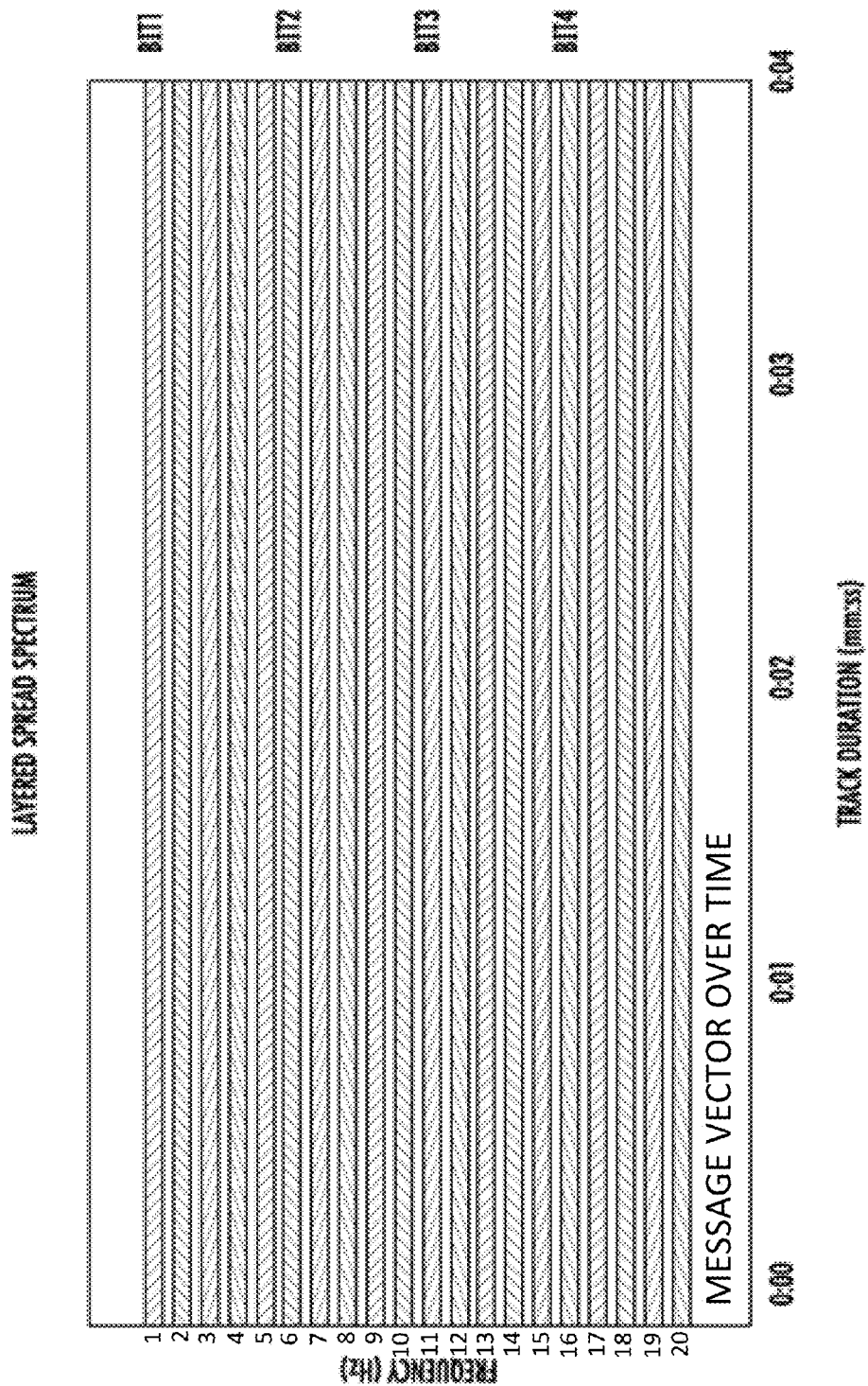
Figure 20:
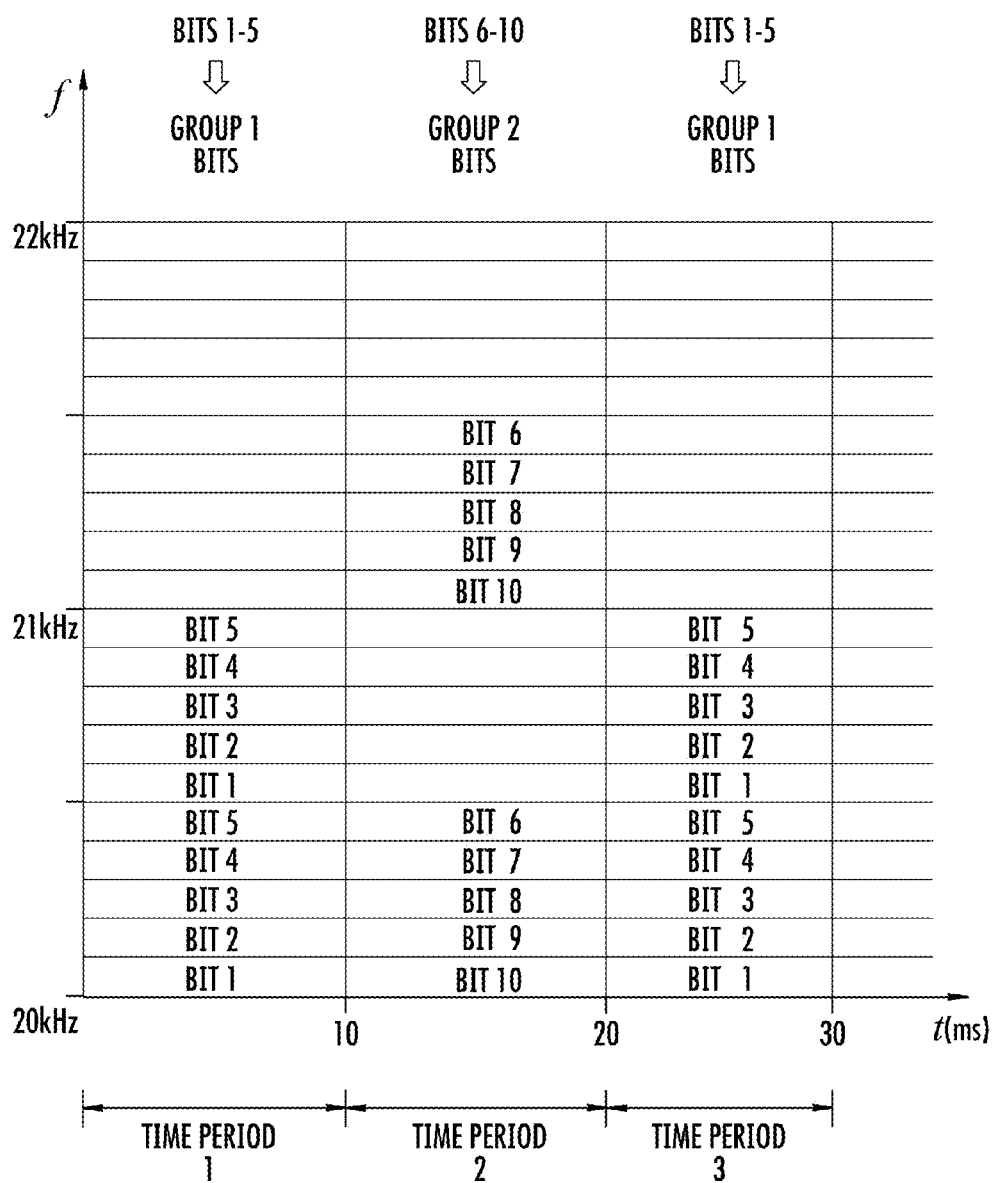
Figure 21:
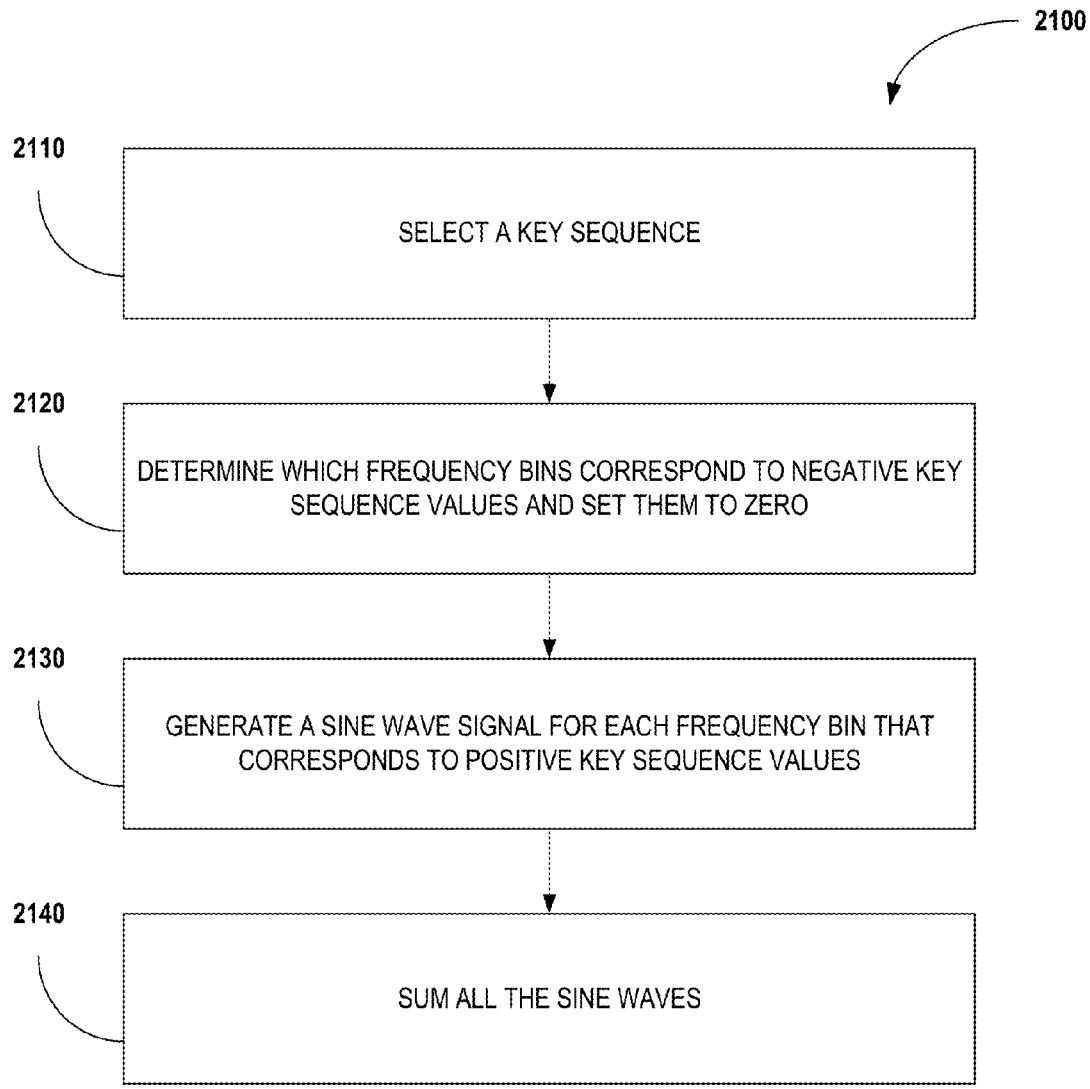
Figure 22A:
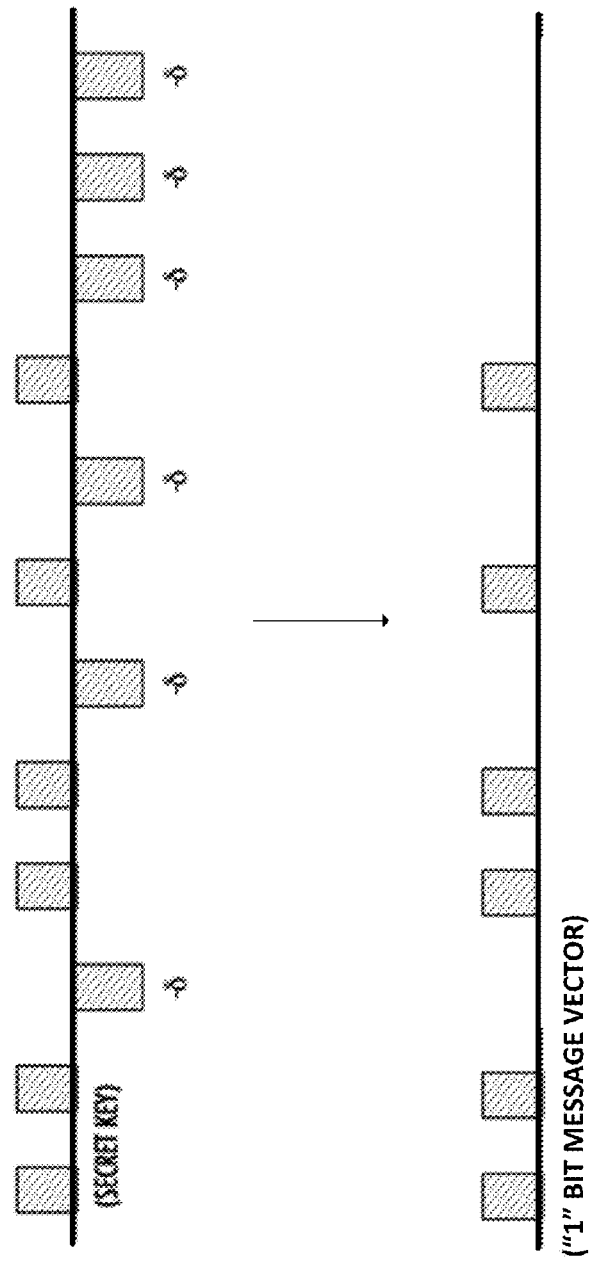
Figure 22B:
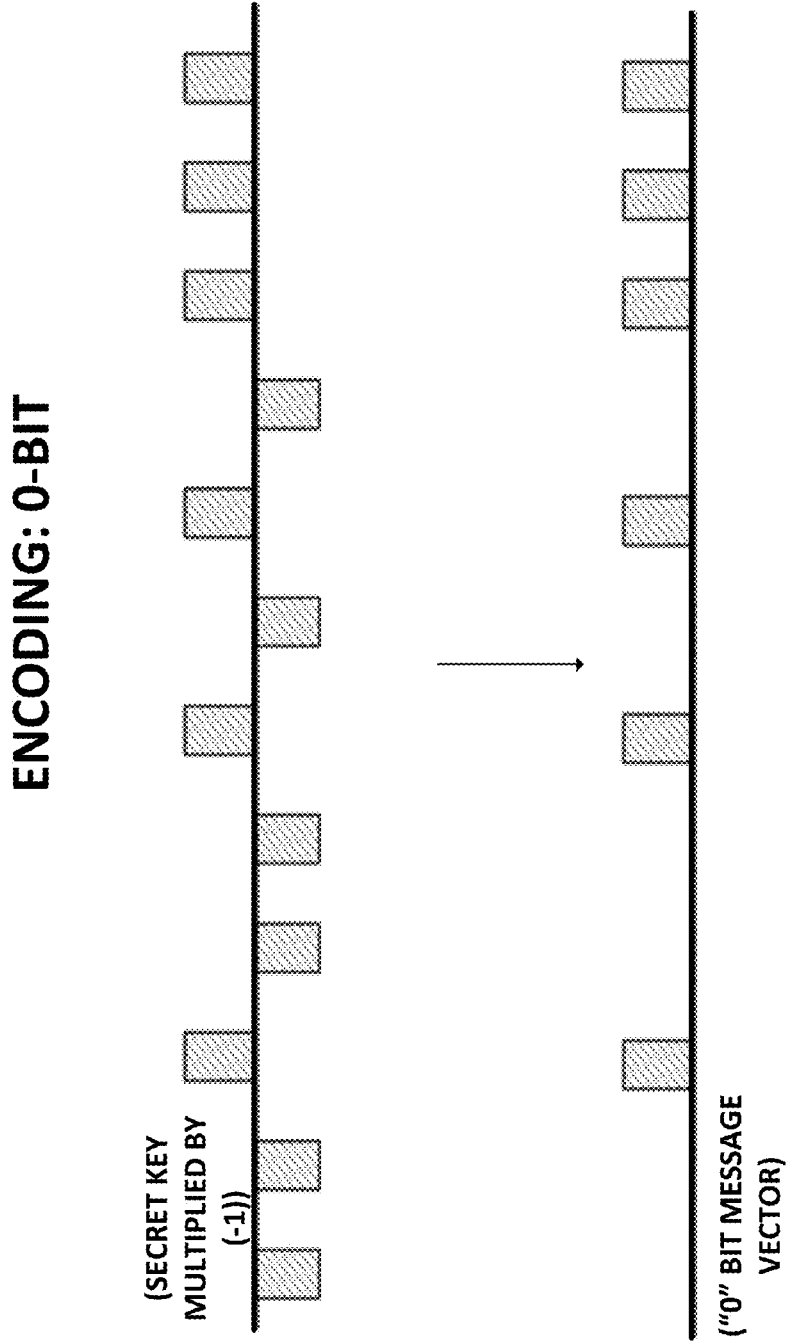
Figure 23A:
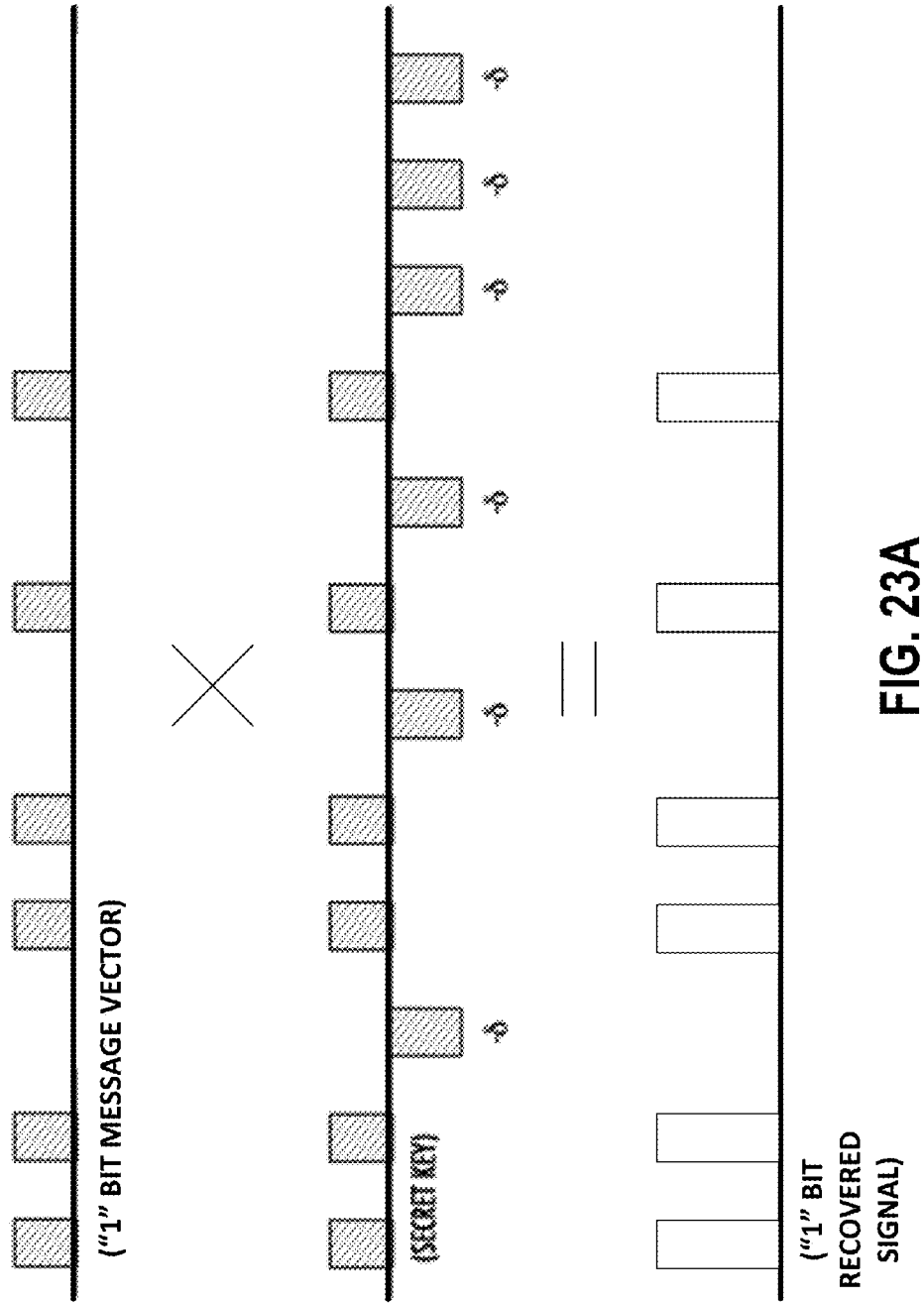
Figure 23B:
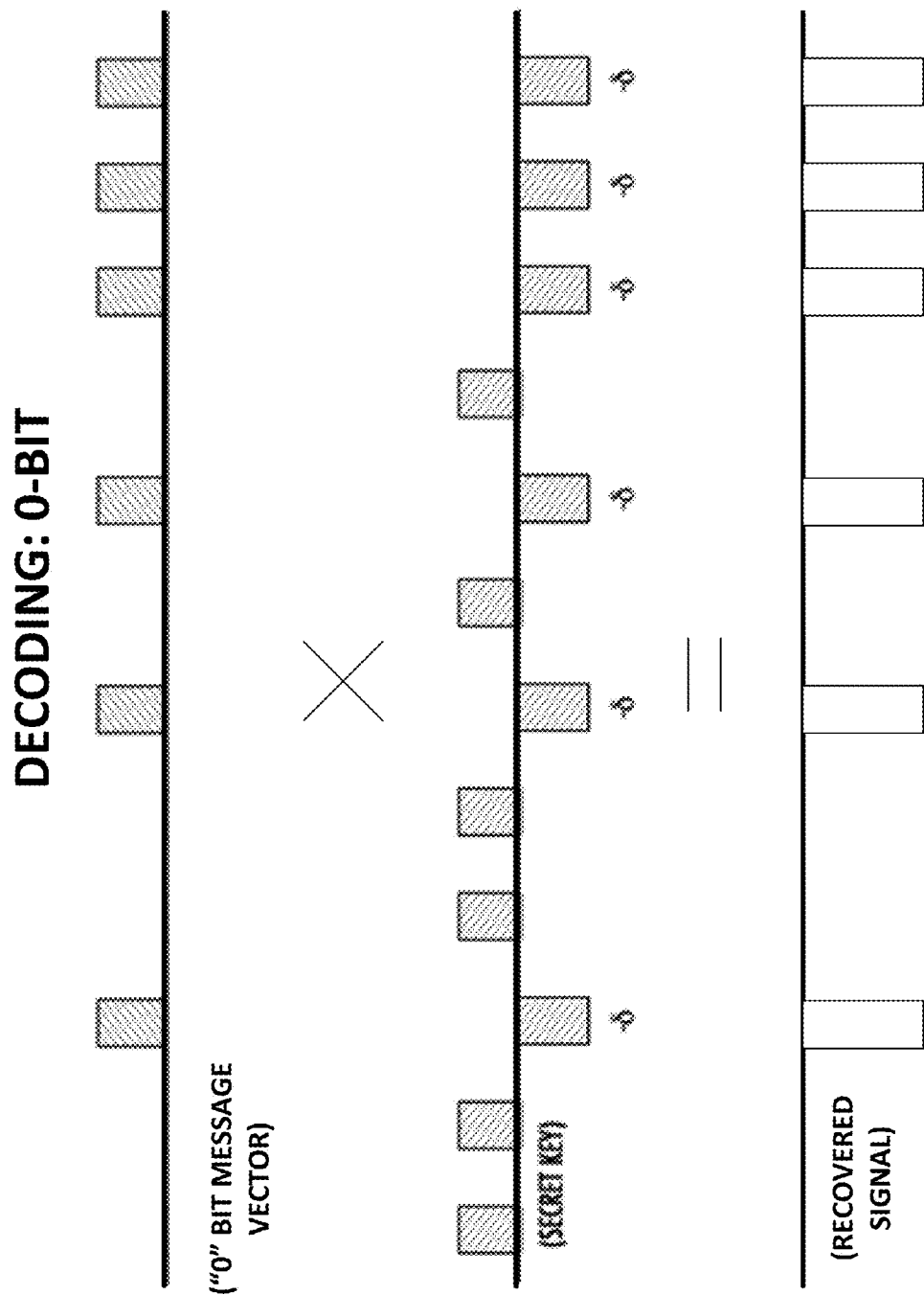
Figure 24:
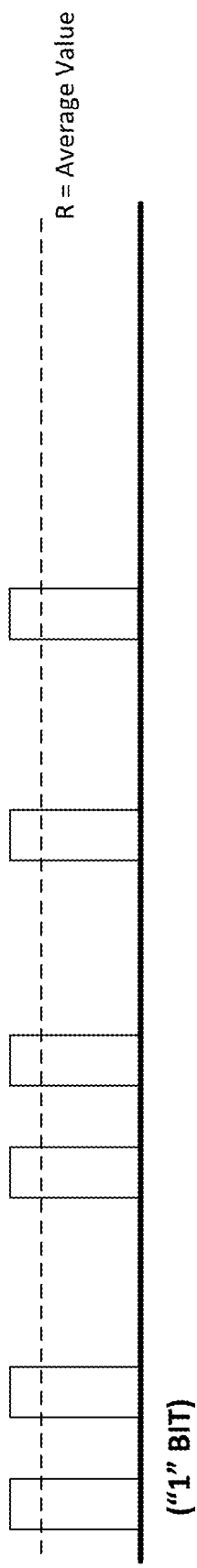
Figure 25:
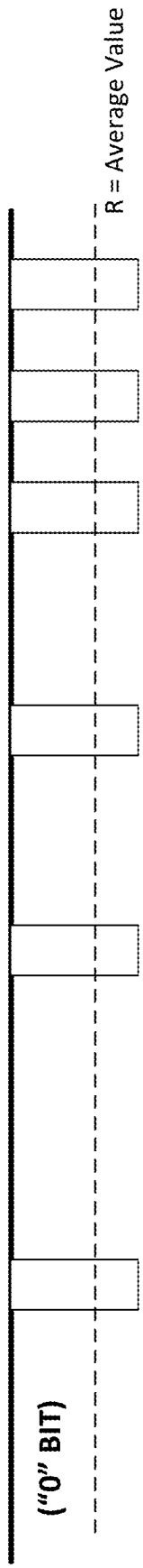
Figure 26:
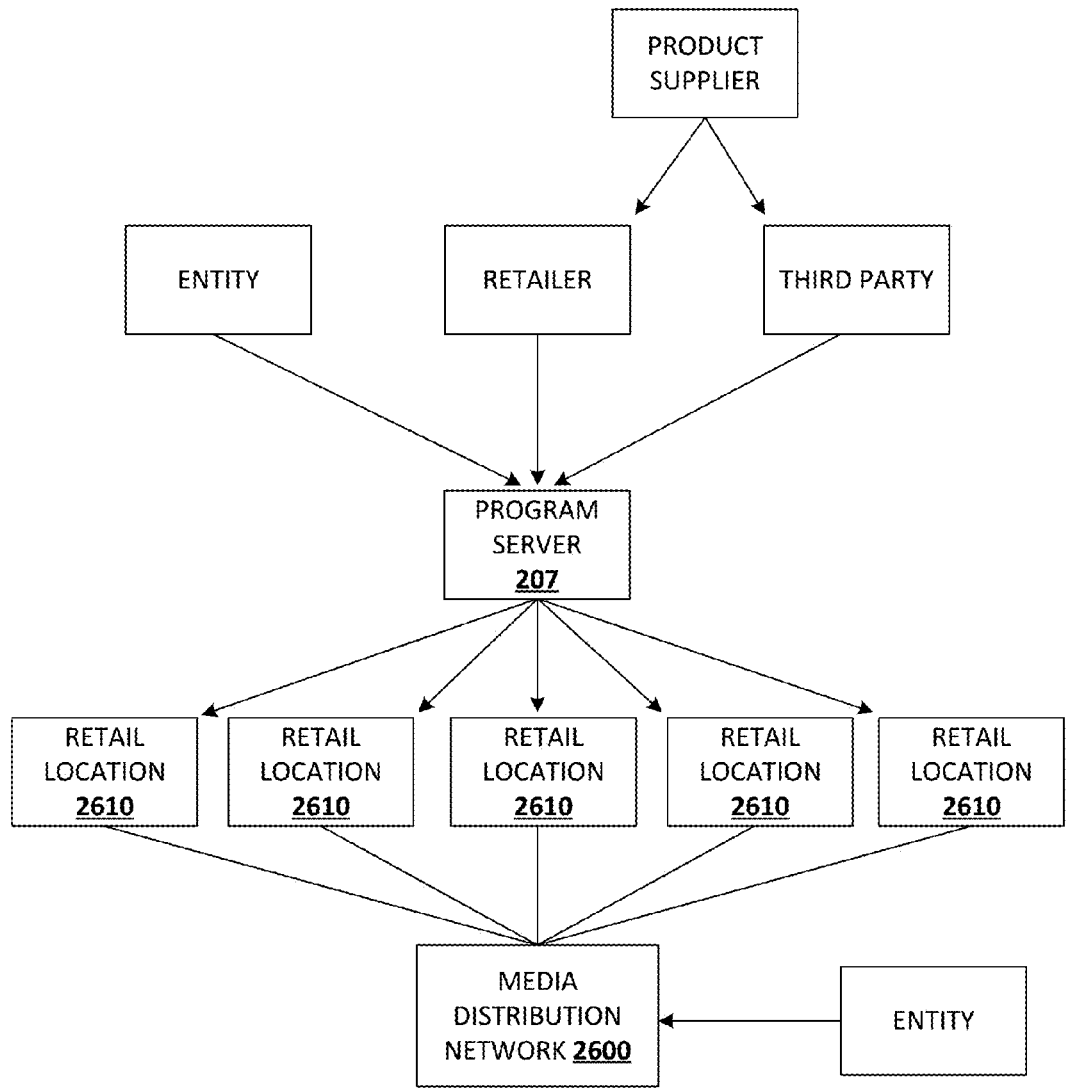
Figure 27:
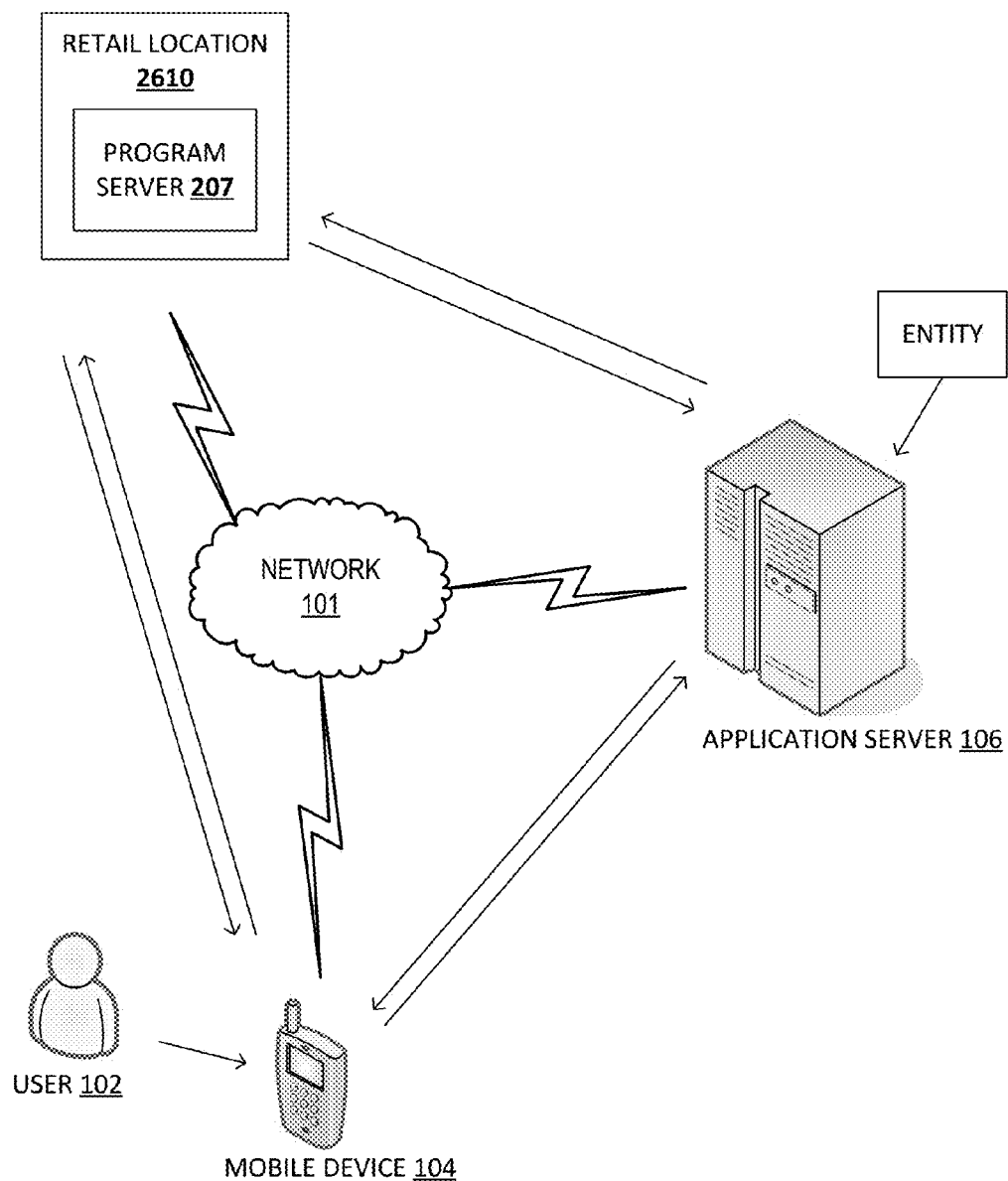
Figure 28:
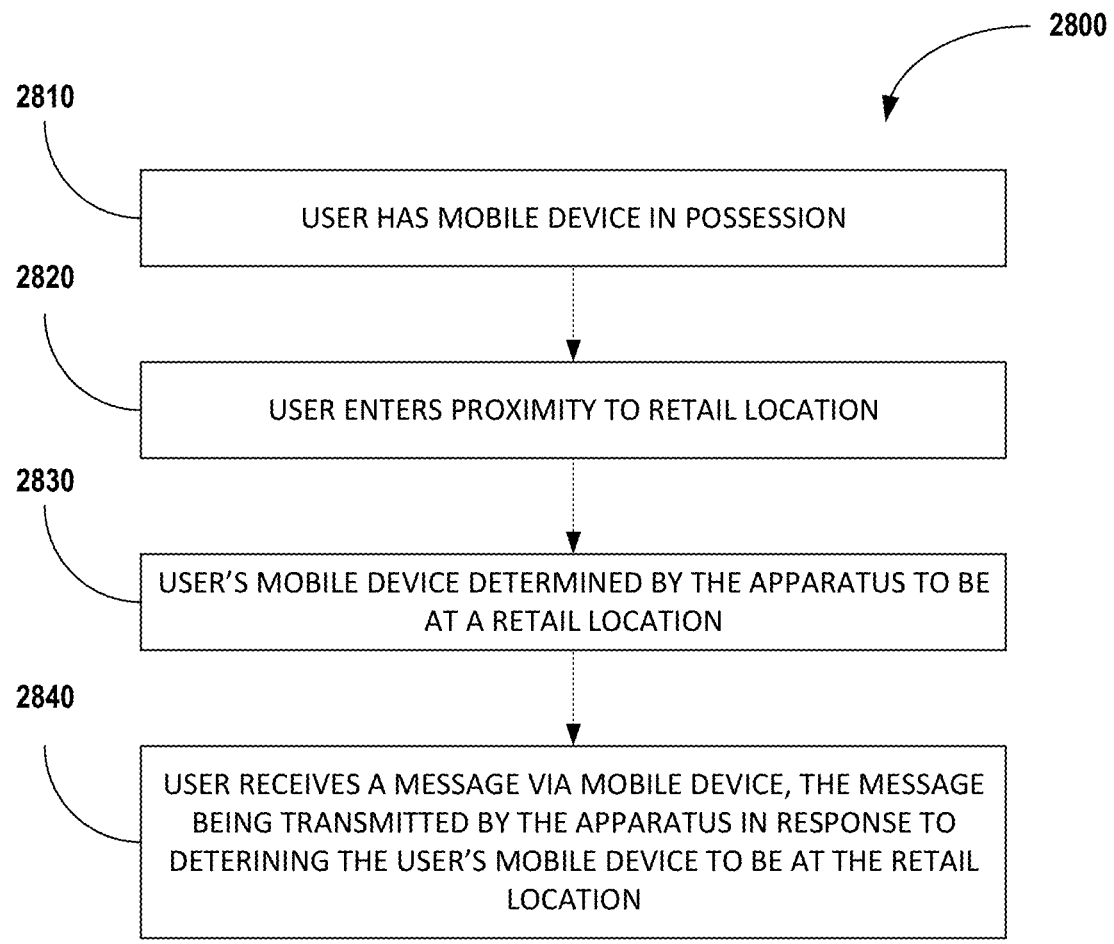
Figure 29:
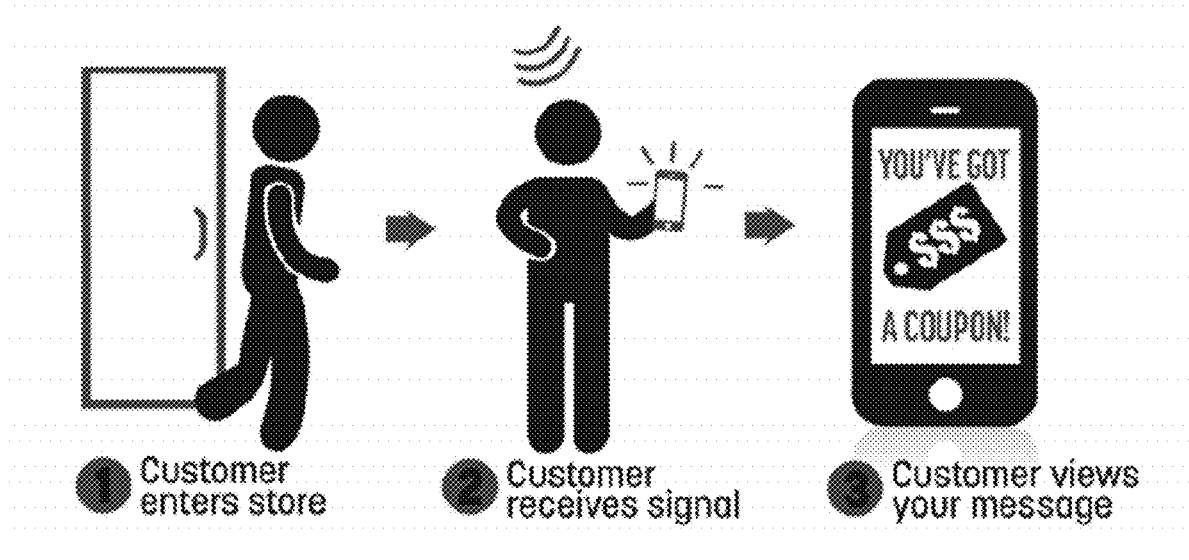
Figure 30:
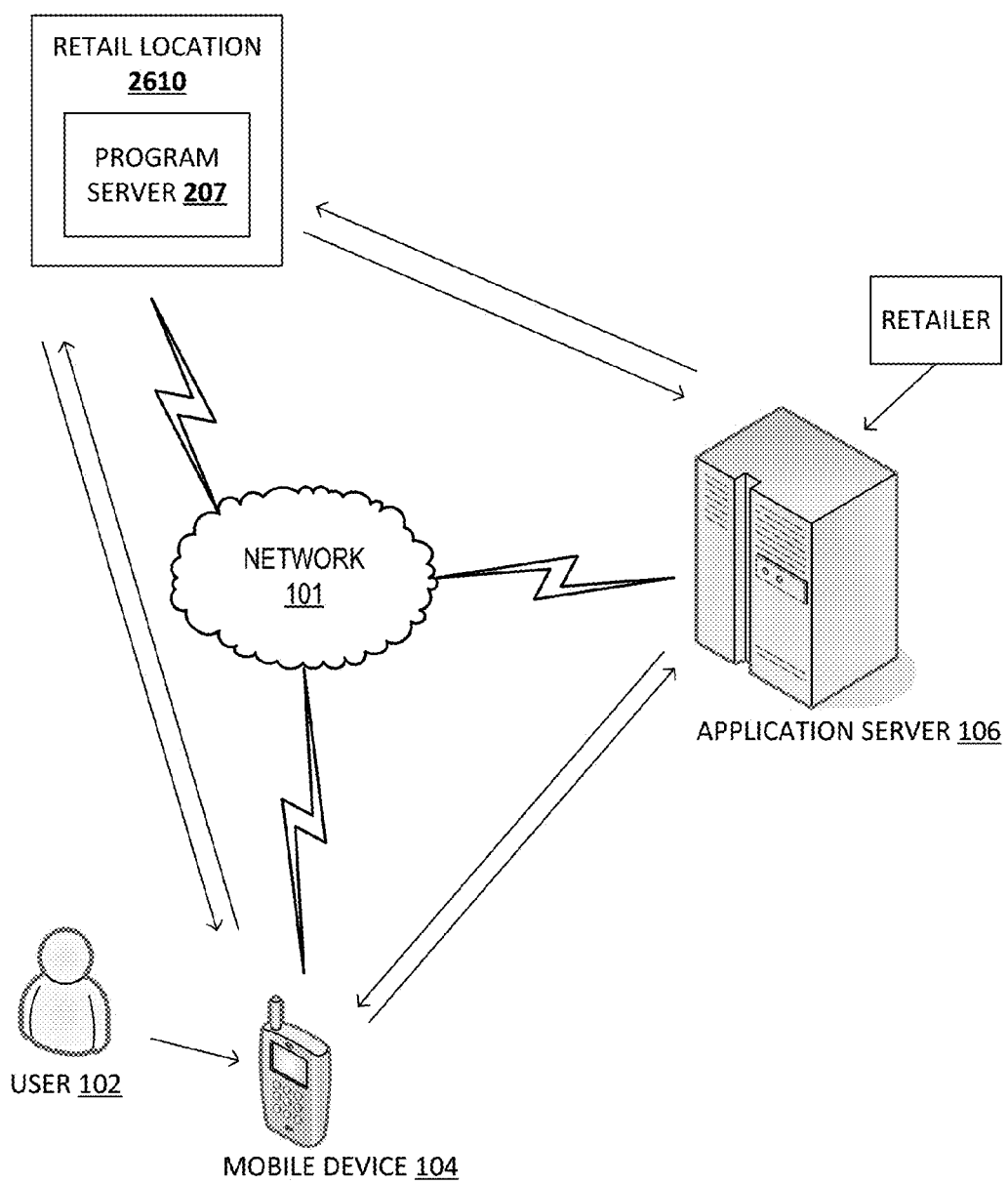
Figure 31:
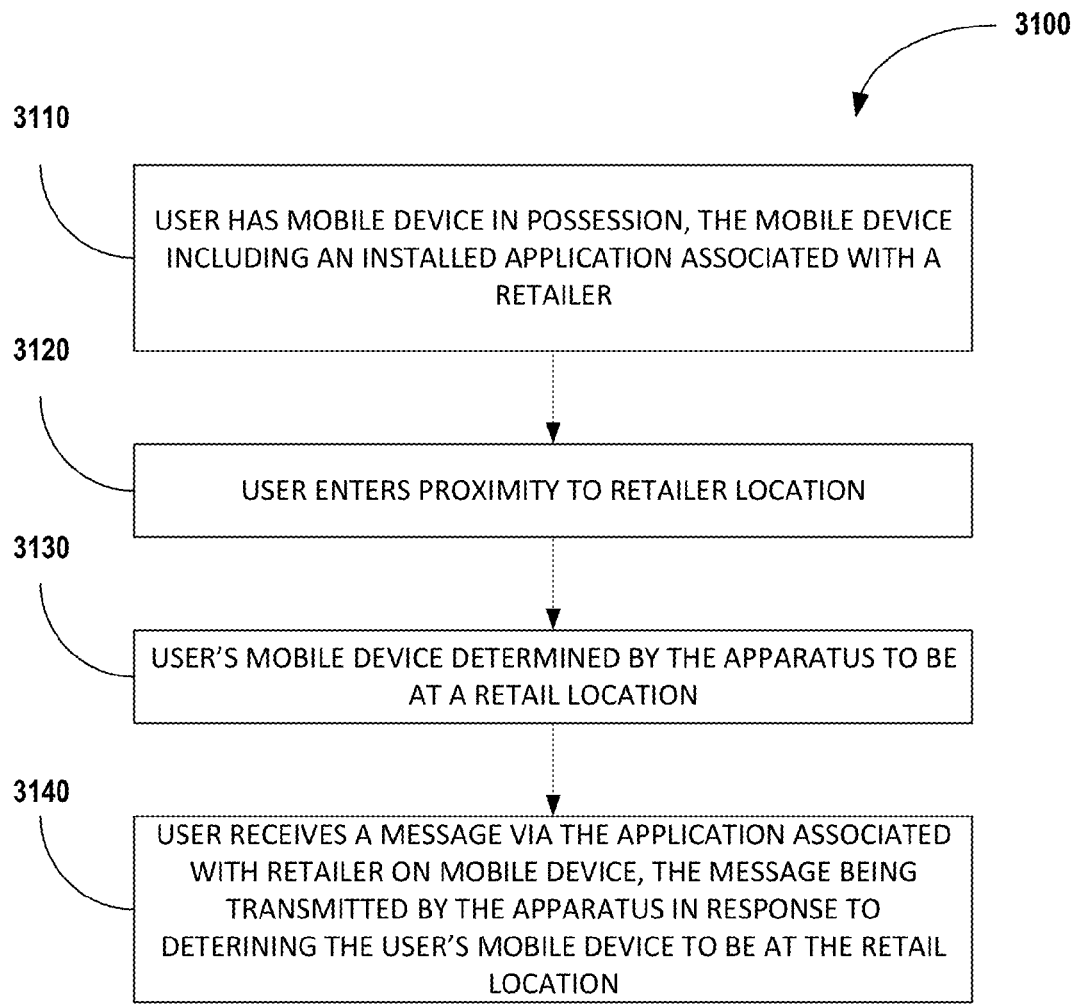
Figure 32:
Figure 33:
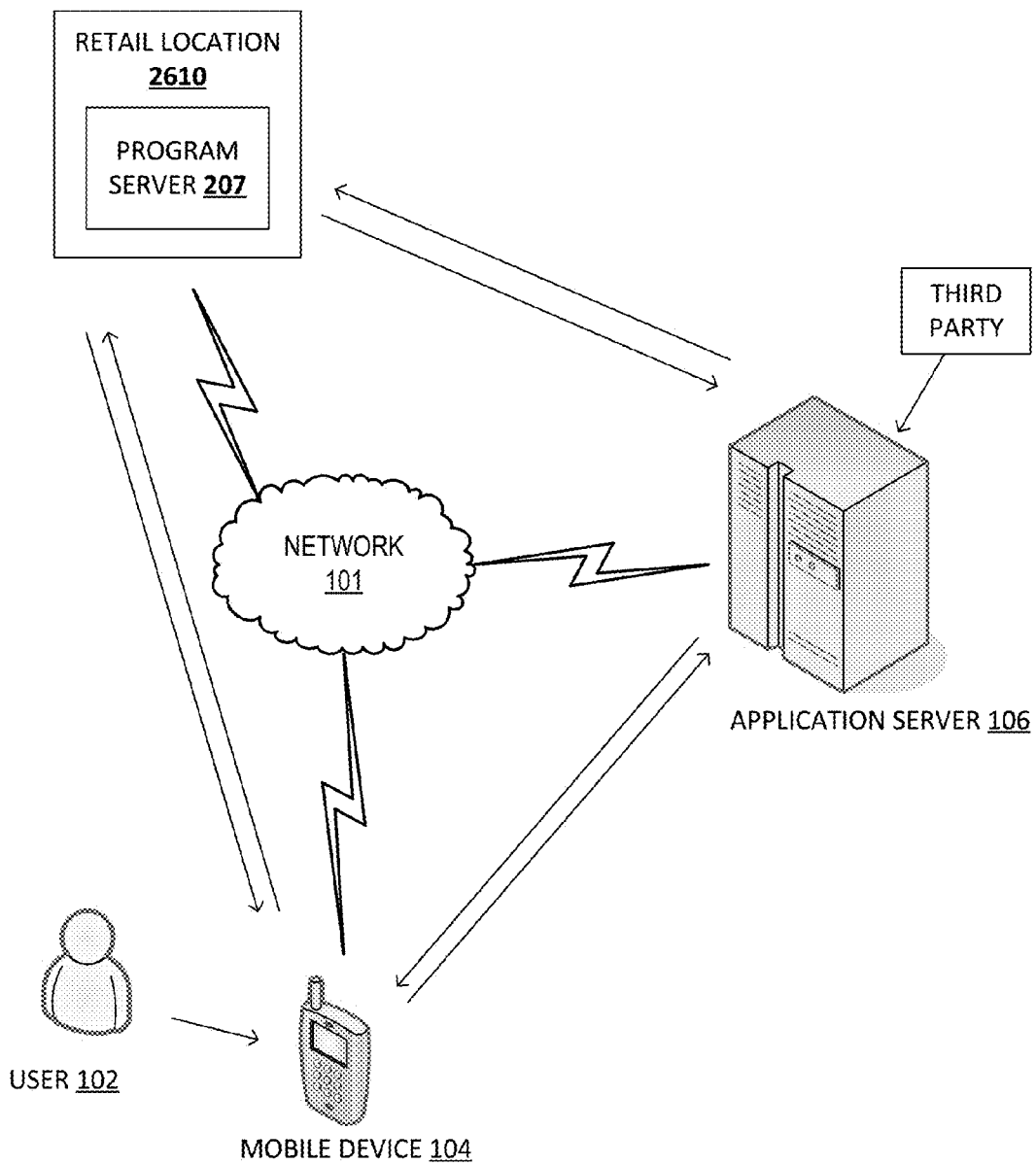
Figure 34:
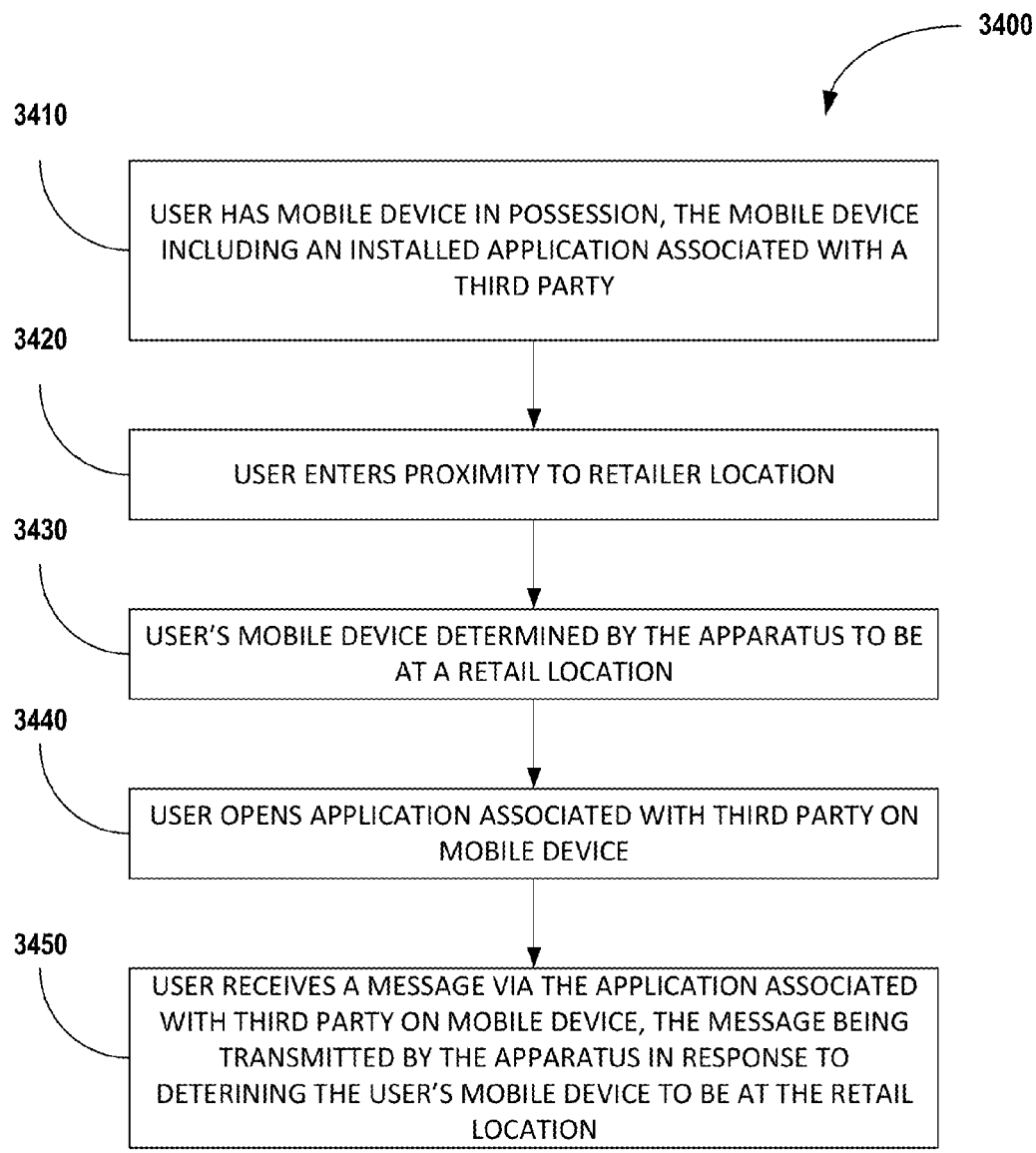
Figure 35:
Figure 36:
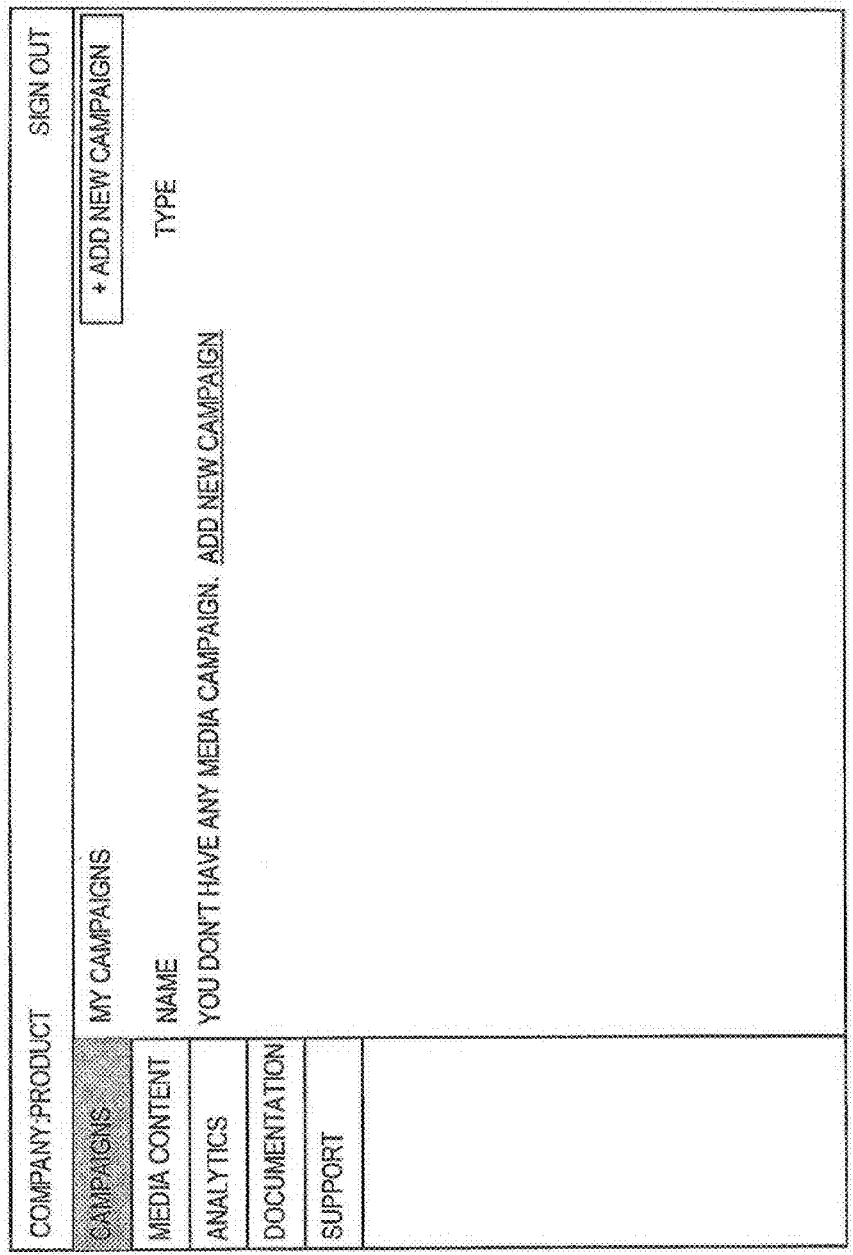
Figure 37:
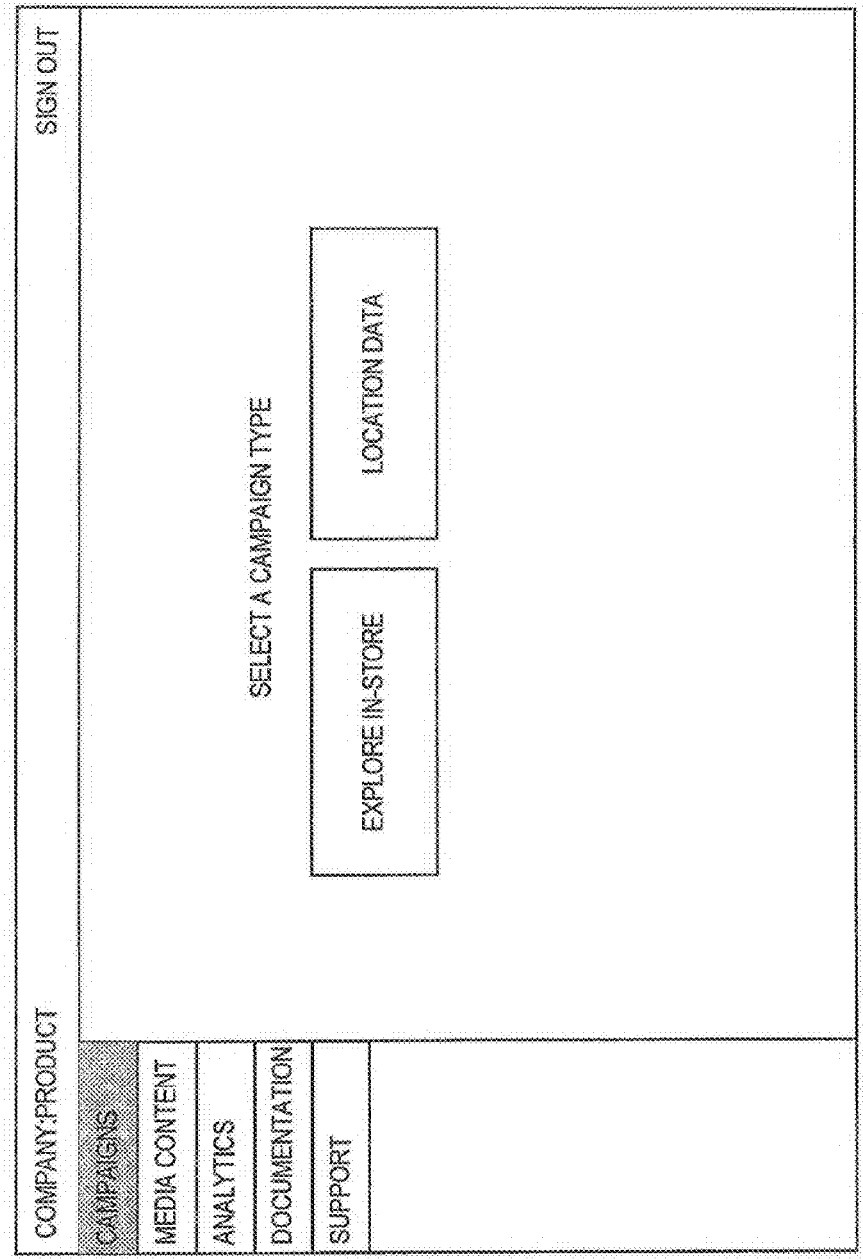
Figure 40:
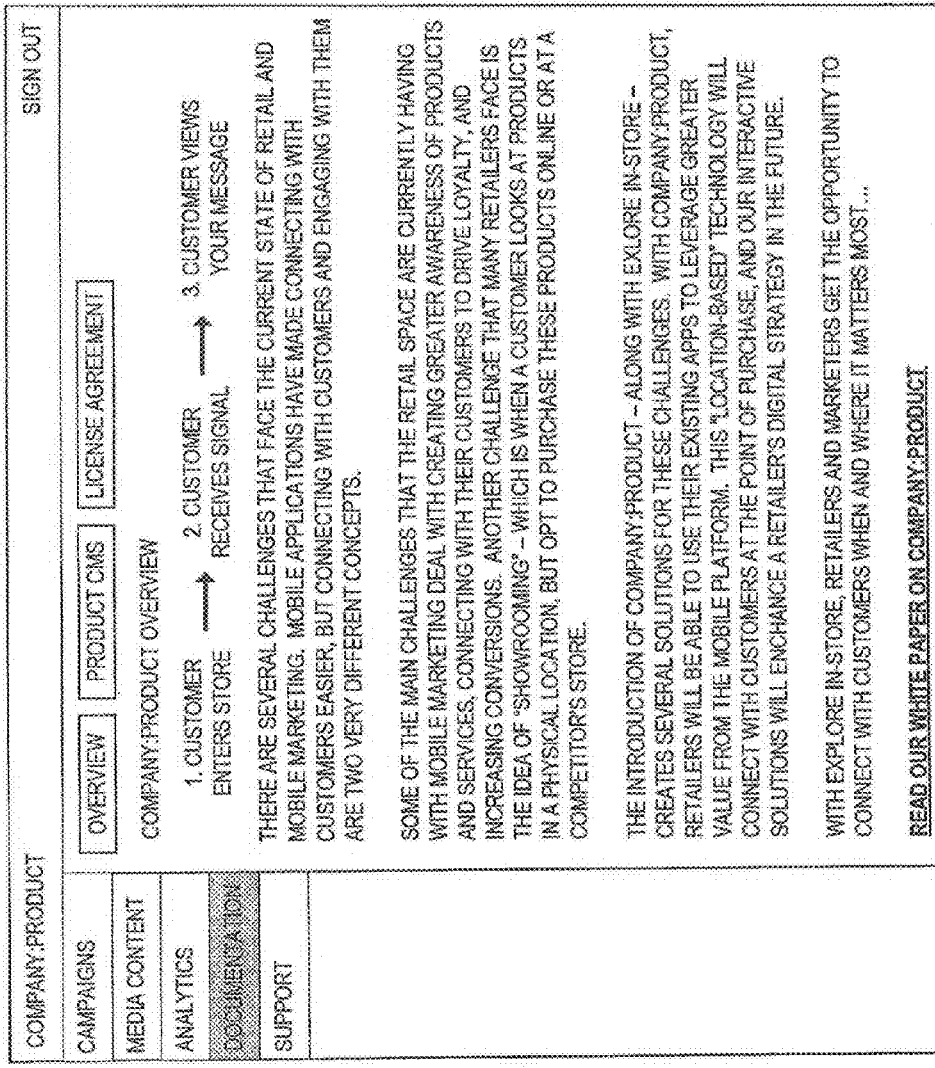

Having thus described embodiments of the invention in general terms, reference will now be made to the accompanying drawings, where:

FIG. 1 is a diagram illustrating a targeted location-based communication system environment, in accordance with embodiments of the present invention;

FIG. 2 is a diagram illustrating a targeted location-based communication system environment, in accordance with embodiments of the present invention;

FIG. 3 is a diagram illustrating a targeted location-based communication system environment, in accordance with embodiments of the present invention;

FIG. 4 is a flowchart illustrating a general process flow for targeting location-based communications, in accordance with embodiments of the present invention;

FIG. 5 is a flowchart illustrating a general process flow for providing an encoded signal, in accordance with embodiments of the present invention;

FIG. 6 is a flowchart illustrating a general process flow for encoding a signal, in accordance with embodiments of the present invention;

FIG. 7 is a flowchart illustrating a general process flow for applying a message vector, in accordance with embodiments of the present invention;

FIG. 8 is a flowchart illustrating a general process flow for targeting location-based communications, in accordance with embodiments of the present invention;

FIG. 9 is a flowchart illustrating a general process flow for decoding a signal, in accordance with embodiments of the present invention;

FIG. 10 is a flowchart illustrating a general process flow for providing targeted location-based communications, in accordance with embodiments of the present invention;

FIG. 11 is a diagram illustrating a key sequence, in accordance with embodiments of the present invention;

FIG. 12 is a diagram illustrating a key sequence, in accordance with embodiments of the present invention;

FIG. 13 is a diagram illustrating embedding multiple bits, in accordance with embodiments of the present invention;

FIG. 14 is a diagram illustrating a sample frame of a host signal, in accordance with embodiments of the present invention;

FIG. 15 is a diagram illustrating a watermarked frame, in accordance with embodiments of the present invention;

FIG. 16 is a diagram illustrating recovering a message, in accordance with embodiments of the present invention;

FIG. 17 is a diagram illustrating recovering a message, in accordance with embodiments of the present invention;

FIG. 18 is a diagram illustrating recovering a message, in accordance with embodiments of the present invention;

FIG. 19 is a diagram illustrating a layered spread spectrum, in accordance with embodiments of the present invention;

FIG. 20 is a diagram illustrating an exemplary 10-Bit watermark signal, in accordance with embodiments of the present invention;

FIG. 21 is a flowchart of a process flow for encoding a data signal over ultrasonic frequencies, in accordance with embodiments of the present invention;

FIG. 22A is a diagram illustrating an exemplary 1-Bit watermarked frame, in accordance with embodiments of the present invention;

FIG. 22B is a diagram illustrating an exemplary 0-Bit watermarked frame, in accordance with embodiments of the present invention;

FIG. 23A is a diagram illustrating the multiplication of a watermarked signal with the 1-Bit secret key sequence, in accordance with embodiments of the present invention;

FIG. 23B is a diagram illustrating the multiplication of a watermarked signal with the 0-Bit secret key sequence, in accordance with embodiments of the present invention;

FIG. 24 is a diagram illustrating the recovery of the multiplied watermarked signal, in accordance with embodiments of the present invention;

FIG. 25 is a diagram illustrating the resulting average key sequence values of the multiplied watermarked signal, in accordance with embodiments of the present invention;

FIG. 26 is a diagram illustrating the relationships between elements of the communication system, in accordance with embodiments of the present invention;

FIG. 27 is a diagram illustrating an entity-controlled communication system, in accordance with embodiments of the present invention;

FIG. 28 is a flowchart illustrating an exemplary process for an entity-controlled communication system, in accordance with embodiments of the present invention;

FIG. 29 is a diagram illustrating an exemplary use case for an entity-controlled communication system, in accordance with embodiments of the present invention;

FIG. 30 is a diagram illustrating a retailer-controlled communication system, in accordance with embodiments of the present invention;

FIG. 31 is a flowchart illustrating an exemplary process for a retailer-controlled communication system, in accordance with embodiments of the present invention;

FIG. 32 is a diagram illustrating an exemplary use case for a retailer-controlled communication system, in accordance with embodiments of the present invention;

FIG. 33 is a diagram illustrating a third-party-controlled communication system, in accordance with embodiments of the present invention;

FIG. 34 is a flowchart illustrating an exemplary process for a third-party-controlled communication system, in accordance with embodiments of the present invention;

FIG. 35 is a diagram illustrating an exemplary use case for a third-party-controlled communication system, in accordance with embodiments of the present invention;

FIG. 36 is a user interface for managing a campaign, in accordance with embodiments of the present invention;

FIG. 37 is a user interface for selecting a campaign type, in accordance with embodiments of the present invention;

Figure 38:
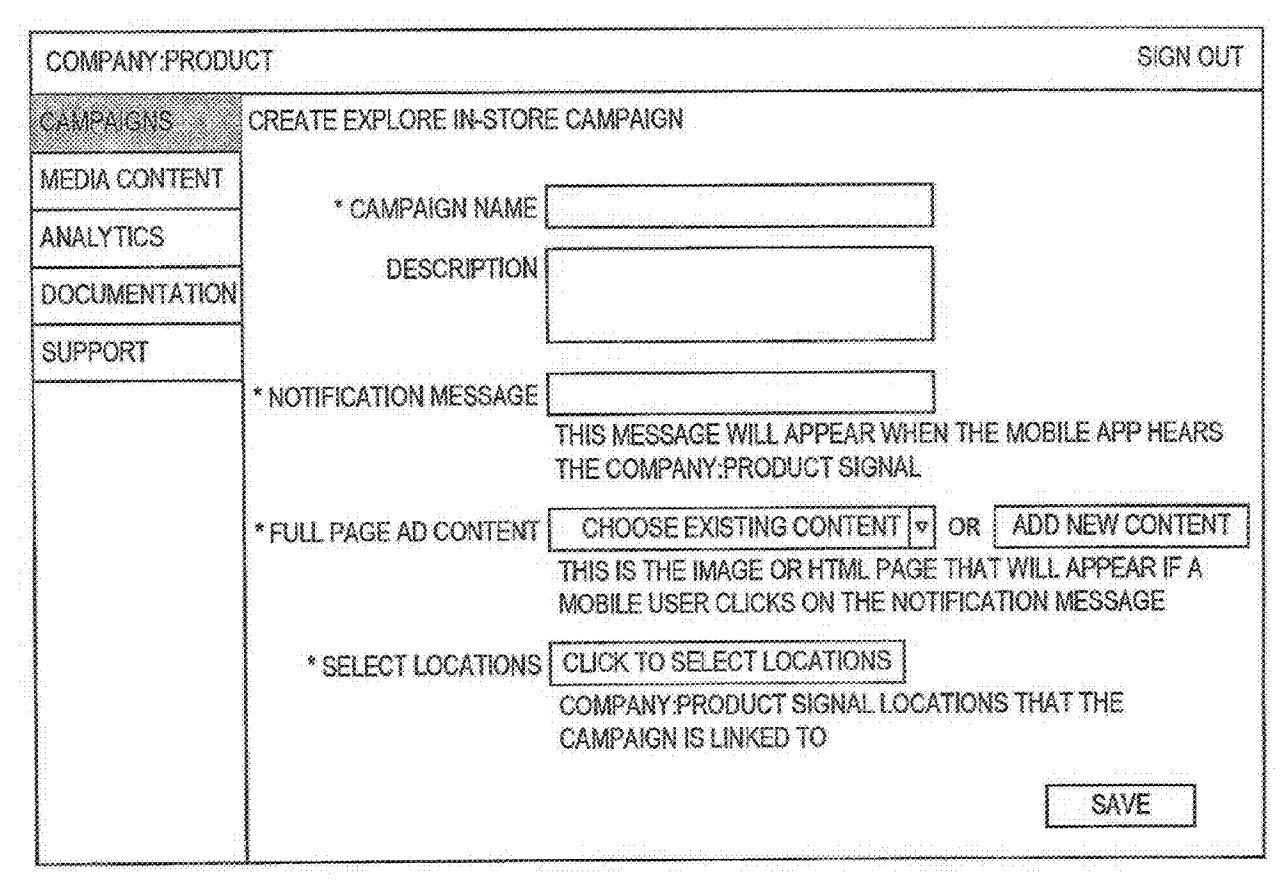

FIG. 38 is a user interface for creating a campaign, in accordance with embodiments of the present invention;

FIG. 39 is a user interface for viewing and sorting an overview of analytics of managed campaigns, in accordance with embodiments of the present invention;

FIG. 40 is a user interface for viewing information related to watermarking technologies and how they may be applied in a retail setting, in accordance with embodiments of the present invention; and FIG. 41 is a user interface for scheduling a campaign, in accordance with embodiments of the present invention;

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

As used herein, the terms "messages" and "communications" may be used interchangeably throughout the specification. It should also be noted that the term "entity" may refer to the terms "merchant" and "business" may be used interchangeably throughout the specification. As used herein, an entity may refer to a "user" of a mobile device, which may embody a merchant, a retailer, a business owner, a customer, a shopper, a marketer, an advertiser, a person, group of persons, organization, group of organizations, and/or group of organizations and persons.

Embodiments of the invention are directed to systems, methods, and computer program products for targeting location-based communications. The invention enables an entity to provide an encoded signal that is received and decoded by a mobile device. As an example, a host signal (a musical track originating from a program server, for example) may be embedded with data to generate an encoded signal. The encoded signal is then transmitted or broadcasted and then received by a mobile device. The mobile device is used to decode the signal and retrieve the data embedded therein. The embedded data or another signal based on the embedded data may be sent to an application server, where it is matched with one or more messages. The message(s) are then communicated to the mobile device, which may present a display based on the message(s). As used herein, the encoded portion of the signal may be referred to as a "watermark" and the encoded signal may be referred to as a "watermarked signal."

Referring now to the referenced figures, a system for providing location-based targeted offers and/or other information is provided. While the method for providing location-based targeted offers and/or other information may include a plurality of different steps, one exemplary embodiment includes the steps of generating an encoded signal by embedding data within an audio signal, transmitting the encoded signal such that it is received by a mobile device, using the mobile device and/or an application therein to decode the encoded signal and retrieve the embedded data, using the mobile device and/or an application therein to send the embedded data or another signal based on the embedded data to an application server such that it is matched with one or more corresponding messages, and sending the message(s) to the user's mobile device, where the user 102 may be presented an offer or other information.

Referring now to FIG. 1, a targeted location-based communication system environment 100, in accordance with one embodiment of the present invention, is illustrated. As shown, the communication system 108 is capable of sending and/or receiving information from the application server 106. Likewise, the application server 106 is capable of sending and/or receiving information from the mobile device 104. This communication may occur across the network 101. The network 101 may be a global area network (GAN), such as the Internet, a wide area network (WAN), a local area network (LAN), or any other type of network or combination of networks. The network 101 may provide for wireline, wireless, or a combination wireline and wireless communication between devices on the network. The communication system 108 may connect with a broadcasting device 111 for broadcasting an audible signal within a location, such as a merchant's business location. In one embodiment, the broadcasting device 111 may be or include a playback device, such as playback device 210 shown in FIG. 2. In some embodiments, the audible signal is an encoded signal that includes embedded data. The encoded signal may be generated by an encoding device 209 shown in FIG. 2 and may include digital watermarking or ultrasonic technologies. Specifically, the encoding device 209 is capable of embedding data within a host signal, such as a musical track. This encoded signal can then be transmitted by the broadcasting device 111 without interfering with a listener's listening experience. The encoded signal can then be received by the mobile device 104, which is capable of decoding the signal to retrieve the embedded data. In other embodiments, the communication system 108 is not connected with the broadcasting device 111, but rather, the broadcasting device 111 is connected to a program server, such as program server 207 of FIG. 2, and in yet other embodiments, the communication system 108 is operatively connected with the program server 207 and/or the playback device 209 of FIG. 2, which is connected to the broadcasting device 111.

The embedded data may be a decoded version of a watermarked message and/or signal. The mobile device 104 may then send the embedded data and/or another signal based on the embedded data to the application server 106 and/or elsewhere. The embedded data may be transmitted in response to the mobile device 104 decoding the encoded signal to identify and/or retrieve the embedded data contained in the encoded signal. In other words, the embedded data (or other received data) may include instructions for the mobile device 104 to forward some or all the embedded data or another signal based at least in part on some or all the embedded data to an application server 106 and/or elsewhere. In other embodiments, an application running on the mobile device 104 may include instructions for the mobile device 104 to forward some or all the embedded data or another signal based at least in part on some or all the embedded data to an application server 106 and/or elsewhere.

The application server 106 may include a processing device 134 that receives the embedded data transmitted by the mobile device 104. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 134 may include functionality to operate one or more software programs based on computer readable instructions 140 thereof, which may be stored in a memory device 136.

The application server 106 may further include a communication device 132 that is operatively coupled to the processing device 134. The communication device 132 is capable of sending communications to the mobile device 104 in response to the processing device 134 receiving the embedded data or other signal from the mobile device 104. The processing device 134 uses the communication device 132 to communicate with the network 101 and other devices on the network 101, such as, but not limited to, the communication system 108 and the mobile device 104. The communication device 132 generally comprises a modem, server, or other device for communicating with other devices on the network 101.

The processing device 134 is also operatively coupled to the memory device 136. The memory device 136 may house computer readable instructions 140 which may include a server application 142. In some embodiments, the memory device 136 includes data storage 138 for storing data related to the targeted location-based system environment 100 including, but not limited to, data used by the server application 142, or information provided by the user 102, mobile device 104, and/or communication system 108. For example, the data storage 138 may store all communications (including one or more message) received from a business. The server application 142 may then send the stored communications to a user 102 within the respective business location.

The application server 106 may be operatively coupled over a network 101 to the mobile device 104, and, in some embodiments, to the communication system 108. The communication system 108 may include an end system and/or interface used by a business, such as a computer terminal. The communication system 108 may also include and/or be connected with communication and/or broadcasting devices, such as a speaker system or broadcasting device 111. It should also be noted, in some embodiments the mobile device 104 may be interchanged with other end consumer systems, such as a computer. In this way, the application server 106 can send information to and receive information from the mobile device 104 and the communication system 108 to provide targeted location-based communications to a user 102. FIG. 1 illustrates only one example of an embodiment of a targeted location-based communication system environment 100, and it will be appreciated that in other embodiments one or more of the systems, devices, or servers may be combined into a single system, device, or server, or be made up of multiple systems, devices, or servers.

In the embodiment illustrated in FIG. 1, the server application 142 enables the user 102 to interact with the system. First, the server application 142 enables a user 102 to receive information based on his/her geographic location proximate to a business, via the mobile device 104. Next, the server application 142 enables a business to manually input communications, via the communication system 108, related to offers and/or other information they wish to provide the user 102. The server application 142 may be capable of gathering communications from a website using numerous techniques such as web scraping. For example, a business may post a communication, such as a weekly sales ad, on its business website and the server application 142 can capture the weekly sales ad through web scraping. Once captured, the website communication may be stored and used to create a response message for communication to a user.

Alternatively, or in conjunction, an entity, such as a merchant, may manually configure or control communications using an interface, such as a communication system 108 interface, provided over network 101 using the server application 142 and/or using application 162. The server application 142 may also be configured or controlled by a user 102 associated with a third party, such as an advertising agency, a marketing agency, or an application provider, who is responsible for managing a business's mobile marketing efforts. The communication system 108 may be utilized for transmitting messages (information, offers, advertisements, or the like) to potential customers' mobile devices 104 within a predetermined distance of a physical business establishment. Furthermore, the communication system 108 may enable the user 102 to configure or control one or more physical business establishments substantially simultaneously. For instance, the user 102 may configure the communication system 108 one time and have the changes take effect across multiple retail locations. To configure or control the content of the offer, message, or the like, the present invention may include a content management platform via which the retailer, the entity, or a third party may upload or edit unique content, images, text, or the like and distribute the content across one or more program servers 207.

In some embodiments, the server application 142 of the application server 106 enables or allows the user 102 to communicate, using the mobile device 104, the user's presence in a location based on the embedded information decoded by the mobile application 122. The communication sent from the mobile device 104 may be sent in response to user input indicating a desire to send the communication based on the decoded embedded data, and in many embodiments, the communication is sent automatically, that is, in response to the mobile device 104 decoding the embedded data from the encoded signal. In some embodiments, the mobile device 104 may send a communication in response to decoding the embedded data in the form of text communications (e.g., SMS format), voice communications, direct or indirect wireless network connection with the application server 106, and/or the like. In many embodiments, the user 102 may receive, in response to the sent communication, a response including a message in the form of an email, text, pop-up notification, or the like that is tailored to the embedded data and/or other signal based on the embedded data. The message may also be tailored to the user 102 based on information associated with the user 102. For example, the merchant may possess a database of information associated with their frequent shoppers. When a frequent shopper enters a predetermined range of a retail location configured in the communication system 108, the communication system 108 may transmit via the network 101 to the frequent shopper's mobile device 104 a special offer exclusive to the retailer's most frequent shoppers. The information associated with the user 102 may be stored by the apparatus in the application server 106 or elsewhere. All in all, tailoring the message based on embedded data, user information, purchase history, demographic information, location information, or the like may also enable the merchant, the entity, or the third party to precisely target specific segments of customers.

The response may be a message that has been chosen by a merchant, business or other entity associated with the location of the user 102. This message may be chosen by the entity using the communication system 108 as an interface and stored, for example, in the data storage 138 of the application server 106. The response message may be presented to the user 102 through an interface on the mobile device 104.

Response messages or communications are provided to users 102 based on the proximate position of the user's mobile device 104 with respect to a business. In this way, the user 102 may receive more beneficial offers through the targeted location-based communication system 100 than through other offer programs. Thus, the offers provided through the targeted location-based communication system 100 may be or include special offers that are provided only to users 102 through the system 100 and are not provided to the customer population at large.

An entity, such as a business, may use the communication system 108 to provide the server application 142 with information and/or data for inclusion in one or more response messages. In some embodiment, the response message may be an offer for a product. The server application 142 may then store in the application server 106 or elsewhere the data related to a message from the business such as, but not limited to the product, the message details, the expiration date for the offer, and the like. In this way, the server application 142 may have access to all messages available from all businesses utilizing the targeted location-based communication system 100, in a database. Thus, the application 142 may respond to received embedded data or other signals from many different businesses and/or business locations by using the embedded data to determine appropriate response messages to send each of the mobile devices, such as mobile device 104, initiating communication with the application server 106.

The server application 142 may provide computer readable instructions 140 to the processing device 134 to match a message or communication stored in the data storage 138 (which may have previously been, for example, received from a communication system 108 and stored in the data storage 138 of the application server 106) with a mobile device 104 of a user 102 based on the user's 102 location, more specifically, based on embedded data provided by the user's 102 mobile device 104. The server application 142 sends the response messages or communications to a user 102, using a network 101, to the user's mobile device 104.

The server application 142 may initiate a response message or communication to a user 102 based on one factor or a combination of factors. For example, application server 106 may consider not only the embedded data but also may consider other factors such as the time of day, the day of the week, and the like in making a determination regarding the appropriate response message for the user 102. The communication may be an offer for products that the user 102 may be interested in. The user 102 may have an interest in communications related to breakfast, lunch, or dinner specials based on the time of day in which the user 102 frequents a restaurant. To this extent a user entering a restaurant during one of these times may receive an encoded signal embodied by the music being played within the restaurant. The user's mobile device 104 may then decode the encoded signal and send the embedded data or other signal to the application server 106. In response, the user 102 may receive a special offer on his or her mobile device 104. In some embodiments, the offer may correspond to a merchant in proximity to where the user 102 is currently located.

The communication system 108 generally includes a communication device 152, a processing device 154, and a memory device 156. The processing device 154 is operatively coupled to communication device 152, and the memory device 156. The communication system 108 may include an input device such as a keyboard device to receive information from an individual associated with the communication system. The communication system 108 may additionally include a reader device including, but not limited to, a magnetic strip reader, a barcode scanner, a radio frequency (RF) reader, a character recognition device, a magnetic ink reader, a processor for interpreting codes presented over an electrical or optical medium, a biometric reader, a wireless receiving device, and/or the like. In some embodiments, the reading device receives information that may be used to communicate instructions via the communication device 152 over a network 101, to other systems such as, but not limited to the application server 106 and/or other systems. The communication device 152 generally comprises a modem, server, or other device for communicating with other devices on the network 101.

The communication system 108 includes computer readable instructions 160 stored in the memory device 156, which in one embodiment includes an application 162. A communication system 108 may also refer to any device used to provide information, messages and/or communications to be sent to a user 102, including but not limited to, specifying embedded data, or transmitting signals. In some embodiments, the communication system 108 may refer only to a plurality of components. For example, the communication system 108 may refer to a user device, or a user device and a merchant device interacting with one another to send and receive communications.

In some embodiments, the communication system 108 may serve as an interface between a merchant and the application server 106 to enable a merchant to specify one or more communications that may ultimately be received by users (e.g., using a mobile device) in particular locations. In some embodiments, the communication system 108 may serve as an interface between a merchant and the program server 207, encoding device 209 and/or playback device 210 (all of FIG. 2) to enable the merchant to change the data to be embedded in the host signal, thereby changing the communication (i.e., the watermarked signal) ultimately received by a user at a particular location. In yet other embodiments, the communication system 108 may serve as an interface between a merchant and both the application server 106 and the program server 207, encoding device 209 playback device 210 and/or broadcasting device 111.

In embodiments where the communication system 108 interfaces with the program server 207, encoding device 209 playback device 210 and/or broadcasting device 111, the communication system 108 may enable the merchant to manage (i.e., change or edit) the data that is to be embedded within a host signal. The embedded data may be a number which corresponds to a specific offer which the merchant wants to send to users within a respective business location. The merchant can alter the offer that is sent by changing the number that is embedded within the host signal. For example, during morning hours a restaurant can specify to embed a number "1" within the host signal where the number "1" corresponds to an offer for a breakfast special. Likewise, during the afternoon the restaurant can specify to embed a number "2" within the host signal where the number "2" corresponds to an offer for lunch specials.

In some embodiments, the communication system 108 is or includes an interactive computer terminal that is configured to initiate, communicate, process, and/or facilitate sending one or more communications to a user 102. A communication system 108 could be or include any device that may be used to communicate with a user 102 or the application server 106, such as, but not limited to, a digital sign, a magnetic-based payment device (e.g., a credit card, debit card, etc.), a personal identification number (PIN) payment device, a contactless payment device (e.g., a key fob), a radio frequency identification device (RFID) and the like, a computer, (e.g., a personal computer, tablet computer, desktop computer, server, laptop, etc.), a mobile device (e.g., a smartphone, cellular phone, personal digital assistant (PDA) device, music-playback device, personal GPS device, etc.), a merchant terminal, a self-service machine (e.g., vending machine, self-checkout machine, etc.), a public and/or business kiosk (e.g., an Internet kiosk, ticketing kiosk, bill pay kiosk, etc.), a gaming device (e.g., Nintendo Wii®, PlayStation Portable®, etc.), and/or various combinations of the foregoing.

In some embodiments, the communication system 108 may be operated in a public place (e.g., on a street corner, at the doorstep of a private residence, in an open market, at a public rest stop, etc.). In other embodiments, the communication system 108 is additionally or alternatively operated in a place of business (e.g., in a retail store, post office, banking center, grocery store, factory floor, etc.). In accordance with some embodiments, the communication system 108 may not be operated by the user of the communication system 108. In some embodiments, the communication system 108 is operated by a mobile business operator or a POS operator (e.g., merchant, vendor, salesperson, etc.). In yet other embodiments, the communication system 108 is owned by the entity offering the communication system 108 providing functionality in accordance with embodiments of the invention described herein.

The communication system's 108 application 162 enables the communication system 108 to be linked to the application server 106 to communicate, over the network 101, information related to messages to be transmitted to users. In this way, the application 162 associated with the communication system 108 may provide the application server 142 with various communications such as an appropriate geographic proximity offer match for the user 102. In one example, the user 102 enters a business establishment, the user's mobile device 104 receives an encoded signal, decodes the signal, and sends embedded data retrieved by decoding the signal to the application server 106, and receives a message sent from the application server 106 in response to the embedded data.

The application 162 associated with the communication system 108 may also receive information from the application server 106. The application 162 in the communication system 108 typically receives an audio signal from the application 142, such that the application 162 associated with the communication system 108 may transmit or initiate transmission of the signal to the user 102. In this regard, the application server 106 and/or communication system 108 perform one or more functions similar to the functions performed by the program server 207 discussed below with reference to FIG. 2.

FIG. 1 also illustrates a mobile device 104. The mobile device 104 may include a communication device 112, a processing device 114, and a memory device 116. The processing device 114 is operatively coupled to the communication device 112 and the memory device 116. The processing device 114 uses the communication device 112 to communicate with the network 101 and other devices on the network 101, such as, but not limited to, the application server 106. The communication device 112 generally has a modem, server, or other device for communicating with other devices on the network 101.

The mobile device 104 may have computer readable instructions 120 stored in the memory device 116, which in one embodiment includes the user application 122. Application 122 may cause the processing device 114 to receive and decode an encoded signal, and send embedded data or another signal to the application server 106 as discussed elsewhere herein in greater detail. The mobile device 104 may also include data storage 118 located in the memory device 116. The data storage 118 may be used to store information related to a received signal, decoded signal, embedded data, received communications and/or the like. A "mobile device" 104 may or include any mobile communication device, such as a cellular telecommunications device (i.e., a cell phone or mobile phone), personal digital assistant (PDA), a mobile Internet accessing device, or other mobile device including, but not limited to portable digital assistants (PDAs), pagers, mobile televisions, gaming devices, laptop computers, cameras, video recorders, audio/video player, radio, GPS devices, any combination of the aforementioned, or the like. Although only a single mobile device 104 is depicted in FIG. 1, the targeted location-based communication system environment 100 may contain numerous mobile devices similar to mobile device 104 and carried by a plurality of users 102.

Referring now to FIG. 2, a targeted location-based communication system environment 200 is shown, in accordance with embodiments of the invention. As illustrated, the targeted location-based communication system environment 200 is capable of broadcasting an encoded signal at a given location. The targeted location-based communication system may include a program server 207 for housing various media content including audio and video files that may be used as hosts for encoding a watermark, thereby resulting in an encoded signal or watermarked signal. The program server 207 may be included within the communication system 108 (FIG. 1) so that an entity may manipulate a playlist for a location.

The program server 207 generally includes a communication device 204, a processing device 206, and a memory device 208. The processing device 206 is operatively coupled to the communication device 204 and the memory device 208. The processing device 206 uses the communication device 204 to communicate with the network 101 and other devices on the network 101, such as, but not limited to, the encoding device 209. The encoding device 209 may be included as a part of the communication system 108 as seen in FIG. 1. The communication device 204 generally comprises a modem, server, or other device for communicating with other devices on the network 101.

As further illustrated in FIG. 2, the program server 207 includes computer readable instructions 212 stored in the memory device 208, which in one embodiment includes a program server application 214. In some embodiments, the memory device 208 includes data storage 211 for storing data related to the targeted location-based system environment 200. For example, the program server 207 may store a plurality of host signals in the data storage 211 of the program server 207. One or more host signals may be sent from the program server 207 to an encoding device 209 using the communication device 204. The host signal may be an audio file such as a musical track or voice communication.

The encoding device 209 may include a communication device 272, a processing device 274, and a memory device 276. The processing device 274 is operatively coupled to the communication device 272 and the memory device 276. The processing device 274 uses the communication device 272 to communicate with the network 101 and other devices on the network 101, such as, but not limited to, the program server 207 (and thus the communication system 108), application server 107 and/or the playback device 210. The communication device 272 generally comprises a modem, server, or other device for communicating with other devices on the network 101. As further illustrated in FIG. 6, the encoding device 209 may include computer readable instructions 280 stored in the memory device 276, which in one embodiment includes an encoding application 282.

At the encoding device 209, the host signal may be received using the communication device 272. The encoding device 209 may then use software, embodied by the application 282, to embed data within the host signal resulting in an encoded signal. The process of embedding data within the host signal may include converting the data to be embedded to a signal and masking the data signal with the host signal such that an encoded signal, including both the data signal that is representative of embedded data and the host signal, is generated. In an embodiment where the host signal is an audio file, the encoded signal may be saved as a new audio file and stored within the data storage 278 of the encoding device 209. The encoded signal may then be sent to a playback device 210 and broadcast at a location may be initiated by the playback device 210. The playback device 210 typically includes an electronic circuit designed for receiving, processing, and/or playing an audio signal (either audible or non-audible by humans), a preamplifier, an amplifier, and a speaker. In other embodiments, the playback device 210 may be any mobile communication device, such as a cellular telecommunications device (i.e., a cell phone or mobile phone), personal digital assistant (PDA), a mobile Internet accessing device, or other mobile device including, but not limited to portable digital assistants (PDAs), pagers, mobile televisions, gaming devices, laptop computers, cameras, video recorders, audio/video player, radio, any combination of the aforementioned, or the like.

The playback device 210 may also be or include hardware and/or software to open the media file including the encoded signal or process the encoded signal in order to initiate broadcast of the encoded signal using a broadcasting device 111. One or more of the program server 207, the encoding device 209 and/or the playback device 210 may be housed within a single device or may be a combination of two or more devices working in collaboration. In one embodiment, for example, a single box houses the program server 207, the encoding device 209 and the playback device 210. In some embodiments, for example, the program server 207 and its components discussed above perform one or more of the functions discussed in association with one or both the encoding device 209 and the playback device 210.

As illustrated by FIG. 3, in other embodiments, the playback device 210 may store a plurality of host signals in the data storage 318 of the playback device 210. In some embodiments, storing a plurality of host signals includes storing one or more audio files. Also, either in addition to the audio files stored at the playback device 210 or instead of storing the audio files at the playback device 210, one or more audio files may be stored in the program server 207 and sent to the playback device 210. At least one host signal can be sent from the playback device 210 to an encoding device 209. The host signal may be an audio file such as a musical track or voice communication. The audio file may be a file that is identical to a master track. In one embodiment, the host signal is sent by the playback device 210 to the encoding device 209 as an audio file. In an alternative embodiment, the host signal is sent from the playback device 210 to the encoding device 209 by broadcasting the host signal and recording the broadcasted audio using the encoding device 209. In various embodiments, the audio file being sent and/or received may be either an analog or digital signal and may be transmitted via the network 101, a satellite network, a Wi-Fi network, a Bluetooth network, a wired or wireless communications network, or the like. Furthermore, the playback device may be configured to convert an analog signal to digital signal or a digital signal to an analog signal via a conversion process or a conversion circuit. For example, an audio file can be sent from the program server 207 to the playback device 210 in a digital file format and converted to an analog file format at the playback device 210. Likewise, the host signals being sent and/or received may be either an analog or digital signal. For example, a host signal can be sent from the playback device 210 in a digital file format and converted to an analog file format at the encoding device 209.

In various embodiments, the playback device 210 may include a communication device 312, a processing device 314, and a memory device 316. The processing device 314 is operatively coupled to the communication device 312 and the memory device 316. The processing device 314 uses the communication device 312 to communicate with the network 101 and other devices on the network 101, such as, but not limited to, the program server 207 and/or the encoding device 209. The communication device 312 generally includes a modem, server, or other device for communicating with other devices on the network 101. The playback device 210 includes computer readable instructions 320 stored in the memory device 316, which in one embodiment includes application 302.

At the encoding device 209, the host signal may be received using the communication device 272. The encoding device 209 may receive the host signal as an audio file, signal representing the audio file or by recording the host signal as it is being broadcasted. The encoding device 209 may then use software, embodied by the application 282, to process the host signal and embed data within the host signal. The encoded signal may then be sent to a broadcasting device 111 for broadcasting within a location. The encoded signal being sent and/or received may be either an analog or digital signal. The broadcasting device may be an amplifier or speaker system capable of broadcasting an audio signal.

Referring now to FIG. 4, a method for targeting location based communications is illustrated, in accordance with embodiments of the invention. At step 402 data input and a host signal are sent and received for encoding. In the embodiment illustrated in FIG. 2, the data input and host signal are sent by the program server 207 and received by the encoding device 209. At step 404 the encoding device 209 embeds the data input within the host signal to generate an encoded signal. At step 406 the encoded signal is transmitted to a device that is capable of broadcasting the encoded signal within a respective location. In some embodiments, the encoding device 209 may dually function as a broadcasting device and broadcast the encoded signal. At step 408 the encoded signal is broadcasted, by the broadcasting device 111, within a respective location and received by a mobile device 104. At step 410 the mobile device 104 decodes the encoded signal to retrieve the embedded data input. The embedded data is then sent by the mobile device 104 and received by a second device, such as the application server 106, at step 412. At step 414, a message, based at least partially on the embedded data, is sent by the application server 106 to the mobile device 104.

Referring now to FIG. 5, a method 500 for providing an encoded signal is illustrated, in accordance with embodiments of the invention. In an exemplary embodiment, the method comprises a first step 502 for receiving an input of data. After data has been received, the method may include generating a data signal based at least partially on the data input. Additionally, an audio signal may be received at step 504. The signal corresponding to the data input may then be embedded within the audio signal to render a single encoded signal at step 506. Subsequently, the encoded signal may be transmitted to a device at step 508 for identifying users to receive messages with certain content. It should be noted that method 500 may be executed by one or more devices within the targeted location-based communication system 100, 200 and/or 300, such as the application server 106, the communication system 108, the program server 207, the encoding device 209 and/or the playback device 210.

Method 500 may be implemented, for example, by one or more of the components illustrated in FIGS. 2 and 3. As a specific example, one or more steps of method 500 may be implemented by the application server 106, program server 207 and/or playback device 210. Further exemplary implementations are discussed at length above with reference to FIGS. 2 and 3.

In an exemplary embodiment, the method 500 may be executed by the encoding device 209. In such embodiments, the encoding device 209 is associated with an application 282 contained therein. The application 282 is configured to execute computer readable instructions 280 for encoding signals. The computer readable instructions 280 associated with the application 282 may vary depending upon the method step that is being executed. For example, at event 502 the system is configured to receive data input. In such an embodiment, the application 282 is configured to execute several computer readable instructions 280 for receiving data input. In one embodiment, upon receiving data input, the system is configured to generate a data signal based at least partially on the data input. The data input may be data in which a user wishes to embed within a host signal. A data signal may be generated using a signal generator. As such the received data is input into a signal generator such that a data signal representative of the data input is generated in response. It should be noted that the data signal may be generated independent of any information being provided about the host signal. In an alternative embodiment, the data input does not have to be converted to a data signal prior to being embedded in the host signal. In such an embodiment, the data is represented by a randomly generated key-sequence that is embedded in the host signal. In another example, at event 204 the system is configured to receive a host signal. In such an embodiment, the encoding device 209 is associated with an application 282 that is configured to execute several computer readable instructions 280 for receiving host signals, such as songs, public address announcements and the like.

The encoding device 209 may rely on software and/or hardware as a means for encoding signals. For example, the encoding device may rely on software and/or hardware as a means for receiving data input or host signals. The encoding device 209 may include electronic circuitry such as, but not limited to, some combination of diodes, transistors, gates and/or other logical components that encode the data within the host signal. In an instance that the method 500 is executed by an alternative device within the system, the alternative device may comprise a similar electronic circuitry to aid in encoding data within a host signal.

In one embodiment, the encoding device 209 is equipped with additional hardware to aid in encoding signals. For example, the encoding device 209 may comprise near-field communication systems, such as Bluetooth and/or other wireless technology that aids in encoding signals. To this extent, the encoding device 209 may use the wireless technology as a means for receiving host signals and/or transmitting an encoded signal. Other hardware to aid in encoding signals may include microphone hardware associated with the encoding device 209. The microphone hardware may be used as a means for receiving a host signal. For example, in one embodiment, the microphone hardware associated with the encoding device 209 is capable of receiving and recording signals or data that needs to be embedded within a host signal. In another example, the encoding device 209 may comprise a keyboard for inputting data into the encoding device 209. For example, in one embodiment, the keyboard hardware associated with the encoding device 209 is capable of allowing an individual to manually input data into the encoding device 209. The data input received may be numbers, words, phrases, letters, alphanumeric combinations, and the like.

Additionally, the encoding device 209 may rely on software as a means for receiving data input or host signals. In some embodiments, the encoding device 209 may rely on a combination of hardware and software as a means for receiving signals. Data can be received by the encoding device 209 using hardware and embedded within the received signals using software associated with the encoding device 209. The data input or host signals may be directly uploaded to the encoding device 209 or sent via text communication, voice communications and the like. In one embodiment, the encoding device 209 is configured to automatically upload advertisements associated with a particular business entity. In one embodiment, the encoding device 209 is configured to receive host signals and store them in memory 276 for later use. For example, in one embodiment, the host signal is received by sending an .mp3 version of the signal to the encoding device 209. It should be noted that the host signal does not have to be limited to an .mp3 audio format, but may also be embodied by other forms of audio including, but not limited to, .wav, .wma, .raw, .m4a, and the like. As such, in an exemplary embodiment, the host signal is a musical track.

At event 506, an encoded signal is generated by embedding data within the host signal. In one embodiment, the encoded signal is a watermark spread across audible frequencies. The targeted location-based communications system 100, 200, and/or 300 is capable of masking the watermark to avoid detection by humans. The watermark may be adjusted based on the characteristics of a host signal. To this extent, each signal must be individually watermarked. In one embodiment, the host signal is an audio signal such as a musical track, and encoding a signal comprises the encoding device 209 having access to a key sequence that is predetermined by the targeted location-based communication system 100, 200, and/or 300. The encoding device 209 may be the application server 106, the communication system 108, a standalone device, part of another device or component, or another device within the system capable of embedding data within a signal. The key sequence may be stored directly in the memory 276 of encoding device 209 or stored elsewhere and accessible to the communication device 272 associated with the encoding device 209.

The key sequence may be randomly generated by a pseudo-random key sequence generator. The embedded data may be expressed in binary and two key sequences may be generated. A first key sequence is generated to express a 1-Bit, and a second key sequence is generated to express a 0-Bit. In one embodiment, the second key sequence generated to express a 0-Bit is a mirror image or the inverse of the first key sequence generated to express a 1-Bit.

Embedding data within the host signal may comprise amplifying/boosting and/or cutting by a positive and/or negative delta value associated with the key sequence to generate a watermarked signal. In one embodiment, a spread spectrum watermark process may be used to embed data within the host signal. In such an embodiment, data input and the host signal are passed to an encoding device 209 such that a watermarked track is generated. The encoding device 209 may be or include an application contained within the encoding device 209. In some embodiments, the encoding process requires information about the host signal for proper masking of the data input to occur. In such embodiments, the encoding device 209 may analyze the host signal to produce a unique watermark that is well-masked.

At event 508 the system is configured to transmit the encoded signal. The method may be executed by various system components such as the application server 106. In one embodiment, the method is executed by the encoding device 209. In such an embodiment, the encoding device 209 is associated with an application 282 contained therein. The application 282 is configured to execute several computer readable instructions 280 for transmitting an encoded signal. The encoding device 209 may rely on software and/or hardware as a means for transmitting an encoded signal. In such an embodiment the encoding device 209 may transmit the encoded signal using the communication device 272 associated with the encoding device 209. The encoded signal may be transmitted to a playback device or broadcasting device as described above with reference to FIGS. 2 and/or 3.

Some of the steps of method 500 may be further explained with reference to FIG. 15, which is discussed at length below. As illustrated in FIG. 15, in some embodiments, encoding the signal includes using a layered spread spectrum. In such embodiments, individual bits are transmitted across various frequencies throughout the spectrum. Specifically, multiple bits are transmitted simultaneously using multiple key sequences. Each key sequence may correspond to a bit being reported to an application. As such, the signal may be invariant over time. The frequency spectrum may be divided into twelve (12) bins represented by the amplitudes shown in the illustrated embodiment. Likewise the key sequence may also have twelve (12) components, as illustrated in the figures. It should be noted that while the illustrated embodiments have a key sequence with twelve (12) components, in other embodiments, the key sequence may have any number of components. As illustrated in FIG. 19, the layered spread spectrum may have twenty (20) frequency bins for transmitting encoded information. The key sequences for a single bit may only correspond to certain frequency bins. For example, the key sequence for Bit 1 may only correspond to the first, fifth, ninth, thirteenth, and seventeenth frequency bins, from bottom to top, respectively. In an example where two bits are being transmitted the bits may alternate frequencies. The first key sequence may be applied to all the odd number bits, and the second key sequence may be applied to all the even number bits. In one embodiment, key sequences may only operate on the frequency bins to which they are assigned. This feature may aid in increasing the accuracy during decoding because an increased number of frequency bins corresponds to an increased accuracy during encoding.

Referring now to FIG. 6, another method 600 for providing an encoded signal is illustrated. In some embodiments, method 600 may be a more detailed version of the method 500 described with reference to FIG. 5. Method 600 may include reading a frame from an audio signal input at step 602. In an exemplary embodiment, the audio signal is received in the time domain; thus a predetermined amount of samples and/or frames may be read. For example, a sixty (60) second audio signal may be received. The sixty (60) second audio signal may be divided in ten (10) frames such that ten (10)—six-second frames are received. The audio input may be pulse-code modulation (PCM) data. In one embodiment, the audio input is an analog signal represented in digital form.

At event 604, a frame is padded by appending zeros to the end of a frame. The number of zeroes added to the end of a frame may depend on the length of the message vector. At event 606, the audio signal including the additional trailing zeros is transformed from the time domain to the frequency domain. The audio signal may be transformed using an algorithm such as a Fast Fourier Transform (FFT). Other algorithms may be used to transform a signal, including, but not limited to, the discrete cosine transformation algorithm (DCT).

At event 608, a message vector is applied to the frequency components. The message vector may be generated using a random key sequence that is based on one or more message bits. As illustrated in FIG. 7, event 608 may include step 608A or 608B. Steps 608A and/or 608B may be used to apply a message vector to a plurality of frequency components. In one embodiment, represented by event 720, applying a message to a plurality of frequency components comprises the frequency components being multiplied by a message vector, where the message vector may be based on a message bit corresponding to the received input data. In an alternate embodiment, applying a message to a plurality of frequency components comprises converting the frequency components to decibels (dB) (step 722), adding the message vector to the frequency components (step 724), and converting the sum of the message vector and frequency components to amplitudes (step 726).

Now referring back to FIG. 6, at event 610, the signal frame is transformed back to the time domain. The signal frame may be transformed back to the time domain using the inverse of the algorithm used to transform the signal to the frequency domain. For example, an audio signal transformed to the frequency domain using FFT is transformed back to the time domain using the inverse Fast Fourier Transformation (iFFT). The prior referenced method steps are repeated for each sample in the time domain such that, at event 612, each newly watermarked frame is appended to a previously watermarked frame. In one embodiment, the watermarked frames may be appended such that the frames overlap with respect to the trailing zeros appended to the end of each frame sample. This is commonly known as the "overlap-add" method. In another embodiment, rather than appending zeros to the end of the frame, the frame may be prepended with samples taken from the end of a previous frame. When combining the processed frames, these samples may be simply discarded. This is commonly known as the "overlap-save" method.

In one embodiment where FFT is used, the length of the FFT corresponds to one less than the transaction length plus the length of the secret key. The transaction length may be chosen to result in optimal computational performance. For example, reducing the transaction length may result in lower memory storage requirements, while increasing the transaction length may result in less floating-point operations for a given input. After choosing a value for the transaction length the message vector may be adjusted to match the FFT length. When multiplying the frequency components by the message vector, at event 608, it may be applied such that symmetry rules of real-input FFT are maintained. To this extent, the vector may be multiplied by the first half of the frequency components. The other half of the frequency components may then be set according to the symmetry rules of the real-input FFT, by taking the complex conjugates of the first half. In some embodiments, when calculating the message vector, multiplication or convolution may be used in either the time domain or the frequency domain.

Referring now to FIG. 8, a method 800 for providing targeted location-based communications is provided, in accordance with embodiments of the present invention. In an exemplary embodiment, the method includes receiving an encoded signal at step 802. After the signal has been received, embedded data may be obtained by decoding the encoded signal, as shown in step 804. The embedded data may then be sent to a server as shown at step 806. At least partially in response to sending the embedded data, a message is subsequently received at step 808.

Method 800 may be executed by a number of devices. In an exemplary embodiment, the method is executed by a mobile device 104. As such, the method is described herein with reference to the mobile device 104. It should be noted, that while the mobile device 104 is the primary example used herein, the method 800 is also executable by other devices. Thus, as used herein, the term "mobile device" 104 may be interchanged with any other device capable of executing the method steps. Although the method is described with references to only a single mobile device 104, the targeted location-based communication system environment 100, 200 and/or 300 may execute the method 800 using multiple mobile devices 104.

In one embodiment, the mobile device 104 receives a plurality of different signals, including an encoded signal. As previously mentioned, at event 802 an encoded signal is received. The signals received by the mobile device 104 may fall within a predefined frequency range that is established by at least one component within the targeted location-based communication system environment 100, 200 and/or 300. The mobile device 104 is configured to receive both audible and inaudible signals. In an exemplary embodiment, the signal received is a signal that is within the audible human frequency range. To this extent, the signal received may include frequencies within the range 20 Hz-20 kHz. For example, in one embodiment, the encoded signal received is an audible music signal. The signal is generally perceptible by the human ear and can also be received by the mobile device 104. In an alternative embodiment, an inaudible signal is received. The inaudible signal is not perceivable by the human ear but the mobile device 104 may be configured to receive the inaudible signal. To this extent, the inaudible signal received may range from values less than 20 Hz or greater than 20 kHz. In one embodiment, the signal received is a combination of both an audible signal and an inaudible signal. For example, the embedded data may be converted to an inaudible that is transmitted in conjunction with an audible signal to a device.

In some embodiments, the mobile device 104 is associated with a computer application 122 contained therein. The application 122 is configured to execute several computer readable instructions 120 for receiving signals, more specifically the application 122 is configured to execute several computer readable instructions 120 for receiving encoded signals. The mobile device 104 may solely rely on software as a means for receiving signals. Signals may be received directly or indirectly by the mobile device 104. In particular, a mobile device 104 configured to directly receive signals is capable of receiving a signal in response to an action. In one embodiment, the action requires opening an application 122 associated with a particular business or entity. For example, the user 102 carrying a mobile device 104 enters a business establishment such as a grocery store. The user 102 then opens an application 122 that has been provided by the business establishment on the user's mobile device 104. In response to opening the application the mobile device 104 immediately beings to monitor to receive signals being transmitted within the business establishment. Signals can be received as soon as they are detected by the mobile device 104. In an alternative embodiment, the mobile device 104 is configured to indirectly receive signals. The mobile device 104 may be capable of receiving a signal without the user 102 directly opening or accessing an application on the mobile device 104. In one embodiment, the application 122 is configured to run as a background process on the mobile device 104. Upon entering the business establishment, the mobile device 104 is configured to automatically monitor to receive signals being transmitted within the business establishment. Signals can be received by the mobile device 104 as soon as they are detected by the mobile device 104. Additionally the mobile device 104 may comprise music recognition software to aid in receiving signals. To this extent, the music recognition software is capable of determining what type of signals are being transmitted and only receive a predetermined signal type. For example, in one embodiment, the system is configured to only receive audio signals. As such, the music recognition software is capable of detecting that a particular signal is an audio signal and bypassing all other detected signals from being received.

In contrast, the mobile device 104 may solely rely on hardware as a means for receiving signals. In one embodiment, the mobile device 104 is equipped with additional hardware to aid in receiving signals. For example, the mobile device 104 may comprise hardware such as Bluetooth and/or other wireless technology that aids in receiving signals. Other hardware to aid in receiving signals includes microphone hardware associated with the mobile device 104. For example, in one embodiment, the microphone hardware associated with the mobile device 104 is capable of receiving and the memory device 116 is capable of recording signals that are transmitted within a particular area where the mobile device 104 is located. In some embodiments, the mobile device 104 may rely on both a combination of hardware and software as a means for receiving signals.

As previously mentioned, at event 802 an encoded signal is received. In an exemplary embodiment, the encoded signal is a host signal that has been embedded with data. In some embodiments, the data is transformed into a signal such that the data signal can be masked by the host signal and collectively transmitted to the mobile device 104 as an encoded signal. To this extent, upon receiving the encoded signal, the mobile device 104 is configured to decode the encoded signal and retrieve the embedded data contained therein, as illustrated by event 804.

In the illustrated embodiment, the mobile device 104 is associated with an application 122 contained therein. The application 122 is configured to execute several computer readable instructions 120 for decoding signals, more specifically the application 122 is configured to execute several computer readable instructions 120 for retrieving embedded data that is contained within an encoded signal. As such, the mobile device 104 may rely on software as a means for decoding signals. Signals may be decoded directly or indirectly by the mobile device 104. In particular, a mobile device 104 configured to directly decode signals is capable of decoding a signal in response to an action, such as receiving an encoded signal on the mobile device 104. In one embodiment, the action requires opening an application 122 associated with a particular business or entity. For example, the user 102 enters a business establishment such as a grocery store. The user 102 then opens an application 122 that has been provided by the business establishment on his or her mobile device 104. In response to opening the application, the mobile device 104 immediately beings to monitor to receive signals being transmitted within the business establishment. Signals can be decoded as soon as they are detected by the mobile device 104. In an alternative embodiment, a mobile device 104 configured to indirectly decode signals is capable of decoding a signal albeit of any additional actions being executed by the user 102 or the mobile device 104. In other embodiments, the application 122 is configured to run as a background process on the mobile device 104. It may not be necessary for the user 102 to open a particular application prior to being able to decode a signal. Additionally the mobile device 104 may comprise music recognition software to aid in decoding signals. To this extent, the music recognition software is capable of determining what types of signals are being transmitted such that the mobile device 104 only decodes a predetermined signal type. For example, in one embodiment, the system is configured to only decode audio signals. As such, the music recognition software is capable of detecting that a particular signal is an audio signal and bypassing all other detected signals from being decoded.

In one embodiment, decoding an encoded signal comprises the mobile device 104 having access to a key sequence that is predetermined by the targeted location-based communication system 100, 200 and/or 300. The key sequence may be stored directly in the memory 600 of the mobile device 104 or stored elsewhere and accessible by the communication device 312 associated with the mobile device 104.

In one embodiment, the key sequence is chosen by randomly alternating a static delta value (δ) in the positive and/or negative direction. For example, as illustrated in FIG. 11, the key sequence for embedding a 1-Bit may be +δ, +δ, −δ, +δ, +δ, −δ, +δ, −δ, +δ, −δ, −δ, −δ. In one embodiment, the second key sequence generated to express a 0-Bit is a mirror image or the inverse of the first key sequence generated to express a 1-Bit.

Likewise, as illustrated in FIG. 12, the key sequence for embedding a 0-Bit is the inverse of the key sequence generated to embed a 1-Bit. For example, the key sequence for embedding a 0-Bit may be −δ, −δ, +δ, −δ, −δ, +δ, −δ, +δ, −δ, +δ, +δ, +δ. In one embodiment, multiple bits are embedded within a host signal.

For example, as illustrated in FIG. 13, the key sequence may be adjusted at regular intervals according to the bit sequence. The bit sequence may be provided at a rate of 1 bit per every millisecond. In an alternate embodiment, the bit sequence may be provided at a faster and/or slower rate according to predetermined criteria. In the example illustrated in FIG. 13, the key sequence corresponding to the bit sequence 1, 0, 1, 1, 0, 1, 1, 1, 0, 1, 1, 0, 1, 1, 0, 1, 1 for embedding 17 bits may be as follows:

1: +δ, +δ, −δ, +δ, +δ, −δ, +δ, −δ, +δ, −δ, −δ, −δ
0: −δ, −δ, +δ, −δ, −δ, +δ, −δ, +δ, −δ, +δ, +δ, +δ
1: +δ, +δ, −δ, +δ, +δ, −δ, +δ, −δ, +δ, −δ, −δ, −δ
1: +δ, +δ, −δ, +δ, +δ, −δ, +δ, −δ, +δ, −δ, −δ, −δ
0: −δ, −δ, +δ, −δ, −δ, +δ, −δ, +δ, −δ, +δ, +δ, +δ
1: +δ, +δ, −δ, +δ, +δ, −δ, +δ, −δ, +δ, −δ, −δ, −δ
1: +δ, +δ, −δ, +δ, +δ, −δ, +δ, −δ, +δ, −δ, −δ, −δ
1: +δ, +δ, −δ, +δ, +δ, −δ, +δ, −δ, +δ, −δ, −δ, −δ
0: −δ, −δ, +δ, −δ, −δ, +δ, −δ, +δ, −δ, +δ, +δ, +δ
1: +δ, +δ, −δ, +δ, +δ, −δ, +δ, −δ, +δ, −δ, −δ, −δ
1: +δ, +δ, −δ, +δ, +δ, −δ, +δ, −δ, +δ, −δ, −δ, −δ
0: −δ, −δ, +δ, −δ, −δ, +δ, −δ, +δ, −δ, +δ, +δ, +δ
1: +δ, +δ, −δ, +δ, +δ, −δ, +δ, −δ, +δ, −δ, −δ, −δ
1: +δ, +δ, −δ, +δ, +δ, −δ, +δ, −δ, +δ, −δ, −δ, −δ

To this extent, the key sequence is flipped or inversed each time the bit sequence alternated from a "1" to a "0" or from a "0" to a "1."

In one embodiment, embedding data within the host signal may comprise amplifying/boosting and/or cutting by a positive and/or negative delta value associated with the key sequence to generate a watermarked signal. To this extent, the encoding device 209 may add or subtract different amplitudes to or from the host signal. The amplitude may be equal to a positive or negative delta value.

Now referring to FIG. 14, FIG. 14 illustrates a sample frame of an original signal which may be received by the system. The original signal may function as a host signal capable of masking embedded data. The host signal may be any original signal that has not been previously altered. In an alternative embodiment, the host signal is a signal that has been previously altered but is still capable of hosting further embedding data. The vertical axis of FIG. 14 represents the amplitude or gain of the host signal and the horizontal axis of FIG. 14 represents the time frame or frequency of the host signal.

Now referring to FIG. 15, in some embodiments, the original/host signal may be received in the time domain and converted to the frequency domain. In such an embodiment, data may be embedded within the host signal at different frequency levels or ranges. The frequency levels may be associated with several "frequency bins" which each represent a different frequency range. To this extent, data corresponding to a single bit may be spread across several frequencies when being embedded within the host signal. FIG. 15 illustrates an extracted portion of the host signal that corresponds to a single bit, which may be referred to as Bit 1 throughout the specification. As illustrated in FIG. 19, the embedded data may include four (4) Bits. In various embodiments the data could include fewer or substantially more bits. Referring back to FIG. 15 and continuing the 4 bit example represented by FIG. 19, Bit 1 is representative of a bit which is equivalent to the value of "1" (1-Bit) where components corresponding to the 1-Bit are spread across twelve (12) frequency bins (1, 5, 9, 13, 17, 21, 25, 29, 33, 37, 41 and 45).

The amplitude levels associated with the host/original signal are boosted by a +δ value or cut by a −δ value with respect to the key sequence for embedding a 1-Bit. Single amplitudes within the key sequence correspond to a single frequency bin within the host signal. This technique generates a watermarked signal having one or more values that have been boosted and/or cut based on the key sequence of the bit being embedded. For example, the amplitude associated with the first and fifth frequency bins of the host signal are boosted by +δ. The amplitude associated with the ninth frequency bin of the host signal is cut by −δ and so forth until each of the amplitudes within the host signal has been boosted or cut by a positive or negative δ value, respectively.

In such an embodiment, retrieving the embedded data from within the watermarked or encoded signal or "decoding the encoded signal" comprises multiplying the encoded signal by a first key sequence, as illustrated in FIG. 16. In order to retrieve the embedded data corresponding to Bit 1, the frequency bins which Bit 1 are spread across must be multiplied by the first key sequence. Multiplying a signal by the key sequence may comprise multiplying the amplitude of an individual frequency bin by the corresponding amplitude of the key sequence. For example, in the illustrated embodiment, the watermarked signal corresponding to the frequency bins of Bit 1 is multiplied by the secret key sequence. For example, the first amplitude (+δ) of the key-sequence is multiplied by the amplitude associated with the first frequency bin, the second amplitude of the key-sequence (+δ) is multiplied by the amplitude associated with the fifth frequency bin, and so forth. In an alternate embodiment, the amplitude values in each frequency bin of the watermarked signal may be converted to decibels prior to multiplication by the key sequence. In some embodiments, there may be a single key sequence which may be transformed into either a 1-Bit message vector or a 0-Bit message vector. The 1-Bit message vector may be equal to the key sequence. The 0-Bit message vector may be the inverse of the key sequence (i.e. the key sequence multiplied by negative one).

As illustrated in FIG. 17, multiplying the watermarked signal by the key sequence causes the values of the amplitudes to shift in the same direction with respect to the positive and/or negative δ value. For example, if a positive δ value was applied to the host signal then the watermarked signal is shifted in the positive direction with respect to the x-axis (horizontal axis) after being multiplied by the key sequence. Likewise, if a negative δ value was applied to the host signal then the watermarked signal is shifted in the negative direction with respect to the x-axis after being multiplied by the key sequence. The amplitudes of the signal can then be averaged to obtain a value "r", where r is approximately equal to +δ if the value of the embedded bit is "1", as illustrated in FIG. 18. In an instance that the value of the embedded bit is "0" then r is approximately equal to −δ. In alternate embodiments, a decision rule is used to determine whether or not the embedded data is representative of a 1-Bit or a 0-Bit, the decision rule may be a signal average greater than zero is a 1-Bit and a signal average less than zero is a 0-Bit. For example, if signal average is greater than zero then the system determines that the signal is representative of a 1-Bit. Likewise, if the signal average is less than zero then the system determines that the signal is representative of a 0-Bit. It should be noted that, in an exemplary embodiment, the decision rule is applied to one frame (in time) of the signal, thus a decision is not made for the entire signal at once, instead the system determines whether or not a portion of the signal is representative of a 1-Bit or a 0-Bit, thus multiple bits may be embedded within a single signal. For example, the system may determine whether the frequency bins corresponding to Bit 1 (e.g. frequency bins 1, 5, 9, 13, 17, 21, 25, 29, 33, 37, 41 and 45) are representative of a 1-Bit or a 0-Bit.

Referring now to FIG. 9, a method 900 for decoding an encoded signal may comprise reading a frame from an audio signal input 902. In an exemplary embodiment, the audio signal is received in the time domain, thus a predetermined number of samples and/or frames may be read. The audio input may be received using hardware such as a microphone. It should be noted that a sample and/or frame of a signal may be defined as any portion of the signal that is less than the whole signal itself. At event 904, the audio signal is transformed from the time domain to the frequency domain using Fast Fourier Transformation (FFT). The audio signal is then converted to decibels at event 906. At event 908, the system computes bit estimators. This computation may be represented by $r_i = \Sigma(k_i \times d)_j$ where. The notation "$k_i$" is representative of the key sequence for Bit "I," "d" is representative of the vector of frequency components in decibels, and the summation is applied to the one or more components represented by the notation "j."

After retrieving a series of 1-Bits and 0-Bits, the bits can collectively represent the embedded data masked by the host signal. The embedded data may represent numbers, words, phrases, letters, alphanumeric combinations, and the like. At event 806, after retrieving the embedded data, the embedded data is sent to a separate entity such as the application server 106. The embedded data may be sent via text, SMS, email, voice communications, text communications, Bluetooth, RFID, and the like.

In one embodiment, the mobile device may receive a message, at event 808, in response to sending the embedded data. The message may be received via text, SMS, email, voice communications, text communications, Bluetooth, RFID, and the like. The message could contain an offer from a particular business, an advertisement, coupons, vouchers, and the like. In one embodiment, the message may be time-sensitive. For example, the message may contain an offer that expires if not used the day it is received. In another embodiment, the message may be a form of visual indicia, such as a QR code, that can be presented to the merchant at a point-of-sale device and redeemed for a special offer. Receiving a message may be solely based on the embedded data. For example, the embedded data may indicate the location of the user 102, more specifically the business establishment in which the user 102 is located. To this extent, the embedded data can be matched with one or more messages stored in the application server 106 that are indicated to be sent to a user. In another embodiment, receiving a message may be based on one or more rules or secondary factors specified by the business or entity providing the communications. These one or more factors may include, but not be limited to, time frame (e.g. day of week, month, time of day, etc.), location, and the like. For example, the mobile device 104 may receive a message based on the embedded data and the fact that it is lunchtime, or in combination with the application of the mobile device.

Referring now to FIG. 10, a method 1000 for providing targeted location-based communications is illustrated, in accordance with one embodiment of the present invention. In an exemplary embodiment, the method first comprises a step 1002 for storing one or more messages associated with an entity. Additionally, the system is configured to receive data from a device, as illustrated at step 1004. At block 1006, at least one of the one or more messages stored are then selected based at least partially on the data received at step 1004. The system may then send at least one of the one or more messages selected to a separate entity, such as a mobile device 104, at block 1008.

The one or more messages sent to the separate entity may reflect offers, advertisements, and/or other information which an entity (a merchant, a retailer, a business, or the like) wants to communicate to the user 102. In one embodiment, messages are received from the communication system 108 and stored in the memory device 136 of the application server 106, more specifically the data storage 138 of the application server 106. The messages may be stored in a data table that is referenced by a pointer or a unique identifier. The pointer may correspond to the embedded data that is retrieved by the mobile device 104. In such an embodiment, upon receiving data, the application server 106 may use the data to reference a data table where messages are stored. In this way, the application server 106 can match a user 102 with communications which the associated entity and/or business want to send the user 102. The pointer may be an integer that corresponds to a message in the database. The pointer may also correspond to a merchant name for which one or more offers are available. For example, a user 102 carrying a mobile device 104 may be shopping at Merchant A, and the mobile device 104 may receive an encoded signal that is transmitted within the area. The mobile device 104 may then decode the encoded signal to retrieve embedded data and send the embedded data to the application server 106. The application server 106 may then use the data as a key to access a table and send the user 102 a message that is particular to the user 102 and the user's current location, and received by the mobile device 104.

A key sequence may be used in embedding an audio signal. FIG. 11 provides a diagram which illustrates the key sequence for embedding a 1-Bit as part of the audio signal. As illustrated the key sequence for a 1-Bit may be a randomly chosen sequence which alternates positive and negative delta ($\delta$) values. For example, as illustrated in FIG. 11, the key sequence for embedding a 1-Bit may be "+$\delta$, +$\delta$, −$\delta$, +$\delta$, +$\delta$, −$\delta$, +$\delta$, −$\delta$, +$\delta$, −$\delta$, −$\delta$, −$\delta$." As stated above, one key sequence may be used to encode or decode either a 1-Bit message vector or a 0-Bit message vector. In other embodiments, multiple keys may be used in a layered spread spectrum method of encoding and decoding. For example, a first key sequence may be associated with Bit 1, a second key sequence may be associated with Bit 2, a third key sequence may be associated with Bit 3, and so on.

FIGS. 12-19 illustrate various method or process steps discussed in greater detail above. More specifically, FIG. 12 provides a diagram which illustrates the key sequence for embedding a 0-bit. As illustrated the key sequence for embedding a 0-bit may the mirror image of the key sequence for embedding a 1-bit. For example, as illustrated in FIG. 11, the key sequence for embedding a 1-Bit may be "−$\delta$, −$\delta$, +$\delta$, −$\delta$, −$\delta$, +$\delta$, −$\delta$, +$\delta$, −$\delta$, +$\delta$, +$\delta$, +$\delta$." FIG. 13 provides a diagram which illustrates embedding multiple bits. As illustrated the bit sequence may be alternated at regular intervals based upon which bit is being embedded. FIG. 14 provides a diagram which illustrates a sample frame of an original/host signal. As illustrated the amplitude of the signal may vary at different intervals. FIG. 15 provides a diagram which illustrates a watermarked frame for a 1-bit. As illustrated in FIG. 15, the amplitude levels associated with the host/original signal are boosted by a +$\delta$ value or cut by a −$\delta$ value with respect to the key sequence for embedding a 1-Bit. As represented in FIG. 15, single amplitudes within the key sequence correspond to single amplitudes within the host signal. FIG. 16 provides a diagram which illustrates the process for recovering a message or embedded data from the watermarked signal. As illustrated the embedded data from within the watermarked and/or encoded signal comprises multiplying the encoded signal by a first key sequence associated with the 1-bit. FIG. 17 provides a diagram which further illustrates the process for recovering a message or embedded data from the watermarked signal. As illustrated in FIG. 17, multiplying the watermarked signal by the key sequence causes the values of the amplitudes to shift in the same direction with respect to the positive and/or negative $\delta$ value. FIG. 18 provides a diagram which further illustrates the process for recovering a message or embedded data from the watermarked signal. As illustrated in FIG. 17, multiplying the watermarked signal by the key sequence causes the values of the amplitudes to shift in the same direction with respect to the positive and/or negative $\delta$ value.

FIG. 19 provides a diagram which illustrates a layered spread spectrum according to various embodiments of the invention. As illustrated in FIG. 19, the layered spread spectrum may have twenty (20) frequency bins for transmitting encoded information. The key sequences for a single bit may only correspond to certain frequency bins. For example, the key sequence for "Bit 1" may only correspond to the first, fifth, ninth, thirteenth, and seventeenth frequency bins, from top to bottom, respectively, and a different key sequence for "Bit 2" may only correspond to the second, sixth, tenth, fourteenth, and eighteenth frequency bins, from top to bottom, respectively. Hence, the value of "Bit 1", for example, depends on the signal corresponding to the first, fifth, ninth, thirteenth, and seventeenth frequency bins, from top to bottom, respectively. For any particular instant in time or frame (in time) of the signal, the system should be able to determine the value of each of Bits 1-4, in this example. As previously noted, an exemplary embodiment may utilize more frequency bins than illustrated in the figures and may encode/decode more bits that illustrated in the figures.

In some embodiments, instead of encoding all data bits of a data signal at a first period in time of the host signal, the data bits of the data signal are encoded in groups of bits. For example, for a data signal having twenty data bits, a first group of data bits including bits 1-5 are encoded across the desired set of frequency bins. As the host signal progresses in time to a second period, a second set of data bits including bits 6-10 of the data signal are encoded across the same set of frequency bins as the first group of data bits had been during the first period. Similarly, as the host signal progresses in time to a third period, a third set of data bits including bits 11-15 of the data signal are encoded across the same set of frequency bins as the first and second groups had been during the first and second periods, respectively. Finally, as the host signal progresses in time to a fourth period, a fourth set of data bits including bits 16-20 of the data signal are encoded across the same set of frequency bins as the first, second and third groups had been during the first, second and third periods, respectively. In different embodiments, the sets of frequency bins may be different and/or may overlap only partially for different groups of bits and time periods. For example, the first group of bits may be encoded over a first bin of frequencies ranging from 10 kHz to 11 kHz, the second group of bits may be encoded over a second bin of frequencies ranging from 11 kHz to 12 kHz, the third group of bits may be encoded over a third bin of frequencies ranging from 12 kHz to 13 kHz and the fourth group of bits may be encoded over a fourth bin of frequencies ranging from 14 kHz to 15 kHz. In another example, one or more of the frequency bins may overlap, such as the first group of bits being encoded over the range of 10 kHz to 11 kHz and the second group of bits being encoded over the range of 10.5 kHz to 11.5 kHz.

As shown in FIG. 20, an example 10 bit watermark signal is shown. Bits 1-5 are the group 1 bits and bits 6-10 are the group 2 bits. As shown, the watermark is encoded across the ultrasonic spectrum from 20 kHz to 22 kHz. During time period 1, the group 1 bits are encoded across frequency bins within the range of 20 kHz to 21 kHz. During time period 2, the group 2 bits are encoded across bins from the ranges 21 kHz to 21.5 kHz and 20 kHz to 20.5 kHz. Then the pattern repeats with the third time period so that the group 1 bits are encoded again. This encoding/decoding scheme may be implemented in either an audible-range implementation or an ultrasonic watermark as discussed below.

Referring now to FIGS. 21-25, alternative methods for encoding and decoding a data signal are discussed (collectively referred to herein as the "ultrasonic watermarking"

methods). These methods involve the ultrasonic sound spectrum, namely, frequencies that are outside the human audible hearing range. Ultrasonic frequencies are generally considered to be those above about 20 kHz, and in most embodiments of the invention, ultrasonic frequencies are considered to range from about 20 kHz to about 22 kHz. In contrast to the audible-range encoding and decoding methods discussed above, in general the ultrasonic watermarking methods do not require a host signal for encoding/decoding a data signal.

Referring to FIG. 21, a flowchart illustrates a method 2100 for encoding a data signal over ultrasonic frequencies. The first step, represented by block 2110 is to select a key sequence. The key sequence is selected at random and has an equal number of positive key sequence values as negative key sequence values. The key sequence is selected as discussed in detail above with reference to FIG. 11.

The next step, represented by block 2120 is to determine which frequency bins correspond to negative key sequence values and set them to zero. The next step, represented by block 2130 is to generate a sine wave signal for each of the frequency bins that correspond to positive key sequence values, or are "boosted." Thus, a sine wave is generated for each of the frequency bins that corresponds to a positive key sequence value of the random key sequence. This process may be executed via computer-readable code. Once the sine waves are generated for each of the frequency bins corresponding to positive key sequence values, all the sine waves are summed, as represented by block 2140.

This method provides an advantage over some other methods because of the great difference between the decibel levels of the various frequency bins when moving from a "zero" to a "boosted" bin. For example, a boosted frequency bin may have a sound pressure level (SPL) of 70 dB and the adjacent frequency bin will have a decibel level of zero dB under this methodology. On the other hand, if the frequency bins associated with the negative key sequence values of the key sequence retained an SPL, then the difference between adjacent frequency bins may be relatively small. That is, the adjacent frequency bin may have an SPL of 60 dB, which is only a 10 dB difference from the previous frequency bin, and therefore, may provide a greater opportunity for noise to degrade the encoded signal.

Referring to FIGS. 22A and 22B, the message vector is shown divided among multiple frequency bins. The corresponding frequency bins from the secret key are also shown, similar to the illustration of FIG. 15 described above; however, there is no host signal in this ultrasonic watermarking implementation. In FIG. 22A, the watermarked signal is created by using only the positive key sequence values, or 1-Bits. The negative key sequence values of the secret key are removed such that the modified secret key includes a SPL of zero for the frequency bins associated with negative key sequence values of the original secret key. Thus, only the frequency bins associated with positive key sequence values may be included in the message vector. Conversely, in FIG. 22B, the message vector is created using only the same secret key, may correspond with negative key sequence values, or 0-Bits. The key sequence may be multiplied by (−1) so that the negative key sequence values of the secret key become positive key sequence values. Once flipped (i.e. multiplied by (−1)), the resulting negative key sequence values (i.e. the formerly positive key sequence values) may be removed such that the modified secret key includes a SPL of zero for the frequency bins associated with positive key sequence values of the original secret key. Thus, only the frequency bins associated with originally negative key sequence values (which are transformed into positive key sequence values after the multiplication with (−1)) may be included in the 0-bit message vector. In some embodiments, the multiplication in 0-Bit encoding may occur before the positive key sequence values are removed from the secret key. In other embodiments, the multiplication in 0-Bit encoding may occur after the positive key sequence values are removed from the secret key.

In some embodiments, the same secret key used to encode the signal may be used to decode the signal. As shown in FIG. 23A, the 1-Bit message vector may be multiplied by the secret key. Conversely, as depicted in FIG. 23B, the 0-Bit message vector may be multiplied by the secret key. The resulting recovered signal may include positive key sequence values, negative key sequence values, or zero key sequence values.

As shown in FIGS. 24 and 25, in order to determine if the recovered signal represents a "1" or a "0" Bit, the apparatus may compute the average of the recovered signal's amplitudes. If the computed amplitude average of the recovered signal is a positive numerical value, then it is determined that the recovered signal is a "1" Bit. Conversely, if the computed amplitude average of the recovered signal is a negative numerical value, then it is determined that the recovered signal is a "0" Bit. The receiving device may then interpret the recovered signal as a "1" Bit or a "0" Bit and process accordingly.

As an example, the aforementioned watermarking technologies may be applied to a retail shopping experience to increase customer engagement. When shopping at a retail location 2610, the user 102 may benefit from receiving an offer (a coupon, an advertisement, a deal, a message, information, or the like) at the point of sale. Because the user 102 may already be using his mobile device 104 to check prices or read reviews on particular products, there may be a need to transmit an offer to the user's mobile device 104 while he is physically at the retail location 2610.

FIGS. 26 through 35 illustrate embodiments of a system and method for transmitting an offer to the user's mobile device 104 within a predetermined proximity of the retail location 2610. An apparatus (a computing device, an application server, a program server, or the like) may be provided for executing this process.

FIG. 26 depicts a system overview for the present invention. The system may utilize a media distribution network 2600 associated with the present invention. The media distribution network 2600 may include a combination of the aforementioned technologies including watermarking technologies, the application server 106, the playback device 210, the program server 207, the communication system 108, or the like and may serve the purpose of transmitting media and messages to mobile devices 104 within range of a predetermined area, such as a retail location 2610.

As depicted in FIG. 26, the program server 207 may be configured or controlled by one or more entity. In some embodiments, the program server 207 may be operated by the entity associated with the media distribution network 2600. In other embodiments, the program server 207 may be operated by the retailer or business owner. In alternative embodiments, the program server 207 may be operated by a third party such as an application provider, a coupon provider, a social network, or the like. Lastly, a product supplier, an advertising agency, a marketing agency, or the like may manage the content of an advertising campaign for the retailer or the third party wherein a message is transmitted to the user's mobile device 104.

Each involved piece of the system depicted in FIG. 26 may include a defined role of operation. For example, the third party may provide access to developer content via a software developer kit (SDK), keys, or the like. The advertising or marketing agency may manage the content of the message or offer and may handle how the content is distributed. The agencies may also be under the supervision of the entity, the retailer, or the third party. In some embodiments, the agencies may coordinate with a preexisting network of customers or with an application provider to push advertisements for products within the network 101. In other embodiments, the entity, the retailer, and the third party may all be the same entity. Furthermore, while the retailer may be enabled to change to which retail locations 2610 the content may be distributed, the retailer may have no or limited access to the content management platform.

As described herein, FIGS. 27, 30, and 33 illustrate exemplary system diagrams of the present invention operating in a variety of configurations. In some embodiments, the application server 106 may include a content management system that may be controlled by the entity associated with the present invention, as shown in FIG. 27. In other embodiments, the application server 106 may be controlled by the retailer, as illustrated in FIG. 30. In alternative embodiments, the application server 106 may be controlled by a third party, as depicted in FIG. 33. The program server 207 is typically installed at one or more retail location 2610 and may communicate with the application server 106 and/or the user's mobile device 104 via the network 101.

In some embodiments, the message may be transmitted from the application server 106 directly to the user's mobile device 104 as demonstrated in FIGS. 27 through 29. In other embodiments, the message may be transmitted from the application server 106 to the program server 2620. While this method may require the program server 207 to store the message in memory, it may also enable the program server 207 to distribute the message to multiple computing devices (including the user's mobile device 104) within the predetermined retail location 2610 proximity. This may save time, storage space, and network bandwidth as opposed to transmitting the message from the application server 106 directly to the mobile device 104 confirmed to be at the retail location 2610.

In some embodiments, the message may be transmitted directly to the user's mobile device 104 in the form of a text message, an email, an alert, a notification, or the like. The message may include a pop-up window that enables the user 102 to select the message, redeem an offer, or to learn more information. When the user 102 selects the pop-up window, the apparatus may present an interface for learning more information about the message or instructions on how to redeem an offer, an advertisement, or the like. Information associated with the message may include the duration of an offer, a discount, product information, or the like.

A program server 207 may be installed in a retail location 2610, wherein the program server 207 is configured as described herein. The program server 207 may scan the surrounding area at a predetermined distance from the physical location of the program server 207 for any mobile device 104 that may be associated with a potential customer.

Upon locating a mobile device 104, the program server 207 may communicate to the application server 106 to request to send a message, an advertisement, an offer, or the like to the mobile device 104. This method ensures that the nearby mobile device 104 receives the message, which may be helpful in increasing sales leads, as well as cross-selling in passerby shoppers, neighboring stores, or the like.

FIG. 28 depicts the process 2800 for transmitting the message directly to the user's mobile device 104. At block 2810 the process includes the user 102 having a mobile device 104 in possession. At block 2820 the process includes the user entering a proximity to a retail location 2610. At block 2830 the process includes the user's mobile device 104 being determined by the apparatus to be at a retail location 2610. At block 2840 the process includes the user 102 receiving a message on his mobile device 104, the message being transmitted by the apparatus in response to determining the user's mobile device 104 to be at the retail location 2610. FIG. 29 illustrates an example of this process 2800.

In other embodiments, the offer may be transmitted via an application associated with the retailer as demonstrated in FIGS. 30 through 32. For example, if the user 102 opens Company A's application on his mobile device 104 while at the retail location 2610, then the apparatus may present a message, an offer, an advertisement, an alert, a notification, or the like inside the retailer application. The offer may include a pop-up window that enables the user 102 to select the message, redeem an offer, or to learn more information. When the user 102 selects the pop-up window, the apparatus may present an interface for learning more information about the message or instructions on how to redeem an offer, an advertisement, or the like. Information associated with the message may include the duration of an offer, a discount, product information, or the like. FIG. 30 illustrates an exemplary system for transmitting the message directly to the user's mobile device 104 via an application associated with the retailer.

FIG. 31 depicts the process 3100 for transmitting the message directly to the user's mobile device 104 via an application associated with the retailer. At block 3110 the process includes the user 102 having a mobile device 104 in possession, wherein the mobile device 104 includes an installed application associated with a retailer. At block 3120 the process includes the user 102 entering a proximity to a retail location 2610. At block 3130 the process includes the user's mobile device 104 being determined by the apparatus to be at a retail location 2610. At block 3140 the process includes the user 102 receiving a message on his mobile device 104 via the application associated with the retailer, the message being transmitted from the apparatus in response to determining the user's mobile device 104 to be at the retail location 2610. FIG. 32 exemplifies this process 3100.

In alternative embodiments, the message may be transmitted via a third party application. For example, if the user 102 opens an application on his mobile device 104 that is strictly purposed for providing coupons, the message associated with the retail location 2610 may present an alert, a notification, an offer, or the like inside the third party application. The message may include a pop-up window that enables the user 102 to select an offer, redeem the offer, or to learn more information. When the user 102 selects the pop-up window, the apparatus may present an interface for learning more information about the message or instructions on how to redeem an offer. Information associated with the offer may include the duration of the offer, a discount, product information, or the like. FIG. 33 illustrates an exemplary system for transmitting the offer directly to the user's mobile device 104 via an application associated with a third party application.

In some embodiments, the user 102 may not need to open the application associated with the retailer or the third party. The message or offer may be presented directly to the user's mobile device 104. In other embodiments, the mobile device 104 may or may not require installation of a particular application to communicate with the program server 207 or the application server 106. The present invention may be configured to automatically transmit and receive information. For example, the mobile device 104 may automatically listen for watermarked signals at all times. When the program server 207 at a retail location 2610 determines that the mobile device 104 is within a predetermined distance of a location of interest (e.g., a retail location 2610), the application server 106 or the program server 207 may automatically transmit a message, a notification, an offer, or the like to the mobile device 104.

FIG. 34 depicts the process 3400 for transmitting the message directly to the user's mobile device 104 via a third party application. At block 3410 the process includes the user 102 having a mobile device 104 in possession, wherein the mobile device 104 includes a downloaded application associated with a third party. At block 3420 the process includes the user 102 entering a proximity to a retail location 2610. At block 3430 the process includes the user's mobile device 104 being determined by the apparatus to be at a retail location 2610. At block 3440 the process includes the user 102 opening the application associated with the third party. At block 3450 the process includes the user 102 receiving a message on his mobile device 104 via the application associated with the third party, the message being transmitted from the apparatus in response to being determined by the apparatus to be at a retail location 2610. FIG. 35 exemplifies this process 3400.

As an example, the present invention may recognize that the user 102 has entered within a predetermined proximity to a retail location 2610. The apparatus may present to the user's mobile device 104 a message in the form of a banner, a text message, an SMS message, an image, a pop-up window, or the like. The user 102 may select the message on the mobile device 104 and may be presented with more information associated with an offer (or a deal, an advertisement, or the like). The offer may be presented to the user 102 via a website, an application, a pop-up window, or the like. In some embodiments, the user 102 may redeem the offer directly from his mobile device 104 or apply to it a purchase while at the retail location 2610.

The present invention may also include a content management platform associated with the program server 207, the playback device 210, and/or the application server 106. In some embodiments, the content management platform may enable the retailer to generate or manage the content of an offer, an advertisement, a message, an image, text, a length of an advertisement campaign, a location of an offer, or the like. The offer (or message, advertisement, or the like) may be stored by the content management platform for later recall and/or distribution. In other embodiments, the present invention may be configured to enable the retailer to purchase or manage advertising space. In alternative embodiments, the present invention may include analytics to allow the retailer or a third party advertising or marketing agency to track progress of an advertising campaign. The content management platform may also enable the entity, the retailer, or a third party to modify the content at various times throughout the day.

The present invention may include at least one interface for retailer content management. The interface may be located inside a retail location 2610. In some embodiments, one interface may enable the retailer to manage the content or advertising campaign for multiple retail locations 2610, including a subset of retail locations 2610. For example, if a retailer has multiple stores, the retailer may configure the content management system to operate over a particular geographic area, such as the stores in a specific state, county, country, or the like. Multiple interfaces may also control the same retail location's 2610 content management system. Thus, the present invention may allow for the content management system to be controlled or configured from a central location.

Figure 41:
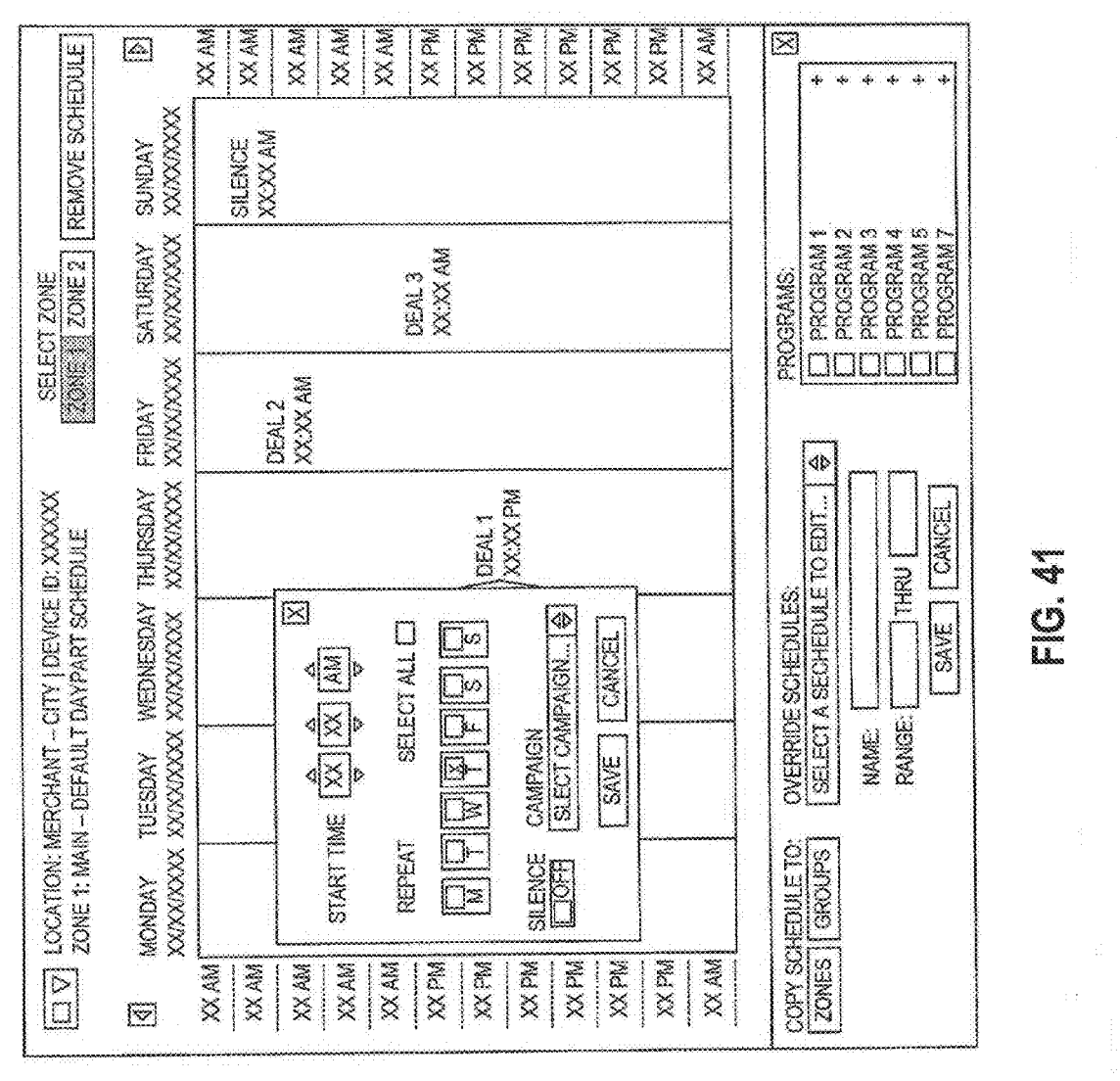

FIGS. 36 through 41 illustrate exemplary user interfaces for the present invention. FIG. 36 shows how the user (an entity, a retailer, a marketer, an advertiser, an application provider, or the like) may manage campaigns via the content management platform. FIG. 37 depicts how the user may select a campaign type. FIG. 38 shows how the user may create a campaign type. FIG. 39 presents a sample analytics overview of the campaigns and includes the ability to sort by location or by campaign title. FIG. 40 illustrates an information page where the user may learn more about how the present invention works and creates value. FIG. 41 is an illustrated schedule feature for managing campaign durations, locations, or the like. A campaign may be edited or controlled for a predetermined period of time or day.

All in all, the present invention may promote customer use of the retailer's application while in the store. By providing the user 102 with a message including deals or offers, the retailer can incentivize use of the retailer's application. Increased use of the retailer's application may increase customer awareness of products and coupons, thus potentially generating more sales revenue.

The system may be further configured to collect information associated with the user's mobile device 104 (and therefore the user 102). In some embodiments, collected information may include contact information, demographic information, network identification information, an IP address, transaction information (including a transaction history), customer purchasing habits, information associated with an account, or the like. The information may be transmitted from the user's mobile device 104 to the program server 207 or the application server 106 via the network 101, a wireless network, a satellite network, a Wi-Fi network, audio watermarking technologies, or the like.

The purpose of collecting this information may be to amass a database of metrics so the entity may better understand its customers. For example, a retailer may be able to process the collected information using a variety of methods or algorithms to gauge how many customers are at a retail location 2610 during a particular period of time or how many purchases of items were made, to calculate a sales conversion rate, or the like. The type processing may be determined by the entity, the retailer, or the third party. Hence, collecting information associated with the user's mobile device 104 may increase awareness of customer habits and may potentially increase sales revenue.

Any of the features described herein with respect to a particular process flow are also applicable to any other process flow. In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for transmitting at least one message stored in a database to a mobile device of a user based on a presence of the mobile device in a signal transmission area by transmitting an encoded signal in the signal transmission area that includes encoded data indicating a location of the at least one message in the database and transmitting the at least one message in the database to the mobile device based on the mobile device of the user decoding the data from the encoded signal and transmitting a request signal based on the data decoded from the encoded signal to a content management server to request the at least one message from the database, the system comprising:
   a database comprising at least one message stored therein at respective storage locations in the database;

a content management server in communication with the database and configured to maintain data associated with the at least one message stored in the database, wherein:

the data maintained by the content management server indicates the storage location of the at least one message in the database, the data can be encoded into a signal transmitted in a signal transmission area resulting in an encoded signal, and the data is recognizable only by mobile devices running a decoding application, where the decoding application is configured to cause at least one mobile device to decode the data encoded in the encoded signal transmitted in the signal transmission area and configured to transmit a request signal based on the data decoded from the encoded signal to the content management server, wherein the data indicates the storage location of the at least one message from the at least one mobile device;

at least one encoding device configured to generate the encoded signal that includes the data indicating the storage location of the at least one message stored in the database; and at least one broadcast device configured to transmit, in the signal transmission area, the encoded signal encoded with the data indicating the storage location of the at least one message stored in the database, wherein the content management server is further configured to:

receive the request signal transmitted by the at least one mobile device associated with a user in response to the at least one mobile device decoding the encoded data from the encoded signal transmitted by the at least one broadcast device using the decoding application, wherein the request signal from the at least one mobile device is based on the data that indicates the storage location of the at least one message in the database;

select the at least one message associated with the storage location of the database indicated in the request signal; and send the selected at least one message to the at least one mobile device.

2. The system of claim 1, wherein:

the user is present in at least one location of a plurality of locations;

the at least one message is associated with a messaging campaign of a third party entity in the database based on instructions received from the third party entity through a messaging campaign interface operatively connected with the content management server;

the at least one encoding device is maintained by a media distribution entity to generate the encoded signal comprising the data and based at least in part on instructions from the content management server; and one or more of the at least one broadcast devices are maintained by the media distribution entity to transmit the encoded signal proximate at least one of the plurality of locations based at least in part on the instructions from the content management server.

3. The system of claim 2, wherein the third party entity comprises a product supplier that supplies at least one product and the selected at least one message is associated with the at least one product.

4. The system of claim 2, wherein the media distribution entity manages a media distribution network comprising the at least one broadcast device and the at least one encoding device.

5. The system of claim 4, wherein one or more of the at least one encoding devices is operably connected to the one or more of the at least one broadcast devices and wherein each encoding device generates at least one encoded signal based at least in part on the instructions from the content management server.

6. The system of claim 5, wherein the instructions from the content management server are received by the content management server from the third party entity through the messaging campaign interface operatively connected with the content management server.

7. The system of claim 5, wherein the instructions from the content management server are received by the content management server from the media distribution entity through a media distribution interface operatively connected with the content management server.

8. A non-transitory computer-readable storage medium comprising executable instruction code stored thereon for causing one or more processing devices executing said instruction code to transmit at least one message stored in a database to a mobile device of a user based on a presence of the mobile device in a signal transmission area by transmitting an encoded signal in the signal transmission area that includes encoded data indicating a location of the at least one message in the database and transmitting the at least one message in the database to the mobile device based on the mobile device of the user decoding the data from the encoded signal and transmit a request signal based on the data decoded from the encoded signal to a content management server to request the at least one message from the database, the executable instruction code configured to cause said one or more processing devices to:

store at least one message at respective storage locations in a database;

store data in a content management server in communication with the database and configured to maintain data associated with the at least one message stored in the database, wherein:

the data maintained by the content management server indicates the storage location of the at least one message in the database, the data can be encoded into a signal transmitted in a signal transmission area resulting in an encoded signal, and the data is recognizable only by mobile devices running a decoding application, where the decoding application is configured to cause at least one mobile device to decode the data encoded in the encoded signal transmitted in the signal transmission area and configured to transmit a request signal based on the data decoded from the encoded signal to the content management server, wherein the data indicates the storage location of the at least one message from the at least one mobile device;

generate the encoded signal that includes the data indicating the storage location of the at least one message stored in the database;

transmit, in the signal transmission area, the encoded signal encoded with the data indicating the storage location of the at least one message stored in the database;

receive, using the content management server, the request signal transmitted by the at least one mobile device associated with a user in response to the at least one mobile device decoding the encoded data from the encoded signal transmitted by the at least one broadcast device using the decoding application, wherein the request signal from the at least one mobile device is based on the data that indicates the storage location of the at least one message in the database;

select the at least one message associated with the storage location of the database indicated in the request signal; and send the selected message to the at least one mobile device.

9. The non-transitory computer-readable storage medium of claim 8, wherein:
the user is present in at least one location of a plurality of locations;
the at least one message is associated with a messaging campaign of a third party entity in the database based on instructions received from the third party entity through a messaging campaign interface operatively connected with the content management server;
the at least one encoding device is maintained by a media distribution entity to generate the encoded signal comprising the data and based at least in part on instructions from the content management server; and
one or more of the at least one broadcast devices are maintained by the media distribution entity to transmit the encoded signal proximate at least one of the plurality of locations based at least in part on the instructions from the content management server.

10. The non-transitory computer-readable storage medium of claim 9, wherein the third party entity comprises a product supplier that supplies at least one product and the selected at least one message is associated with the at least one product.

11. The non-transitory computer-readable storage medium of claim 9, wherein the media distribution entity manages a media distribution network comprising the one or more of the at least one broadcast devices and the at least one encoding device.

12. The non-transitory computer-readable storage medium of claim 11, wherein one or more of the at least one encoding devices is operably connected to the one or more of the at least one broadcast devices and wherein each encoding device generates at least one encoded signal based at least in part on the instructions from the content management server.

13. The non-transitory computer-readable storage medium of claim 12, wherein the instructions from the content management server are received by the content management server from the third party entity through the messaging campaign interface operatively connected with the content management server.

14. The non-transitory computer-readable storage medium of claim 12, wherein the instructions from the content management server are received by the content management server from the media distribution entity through a media distribution interface operatively connected with the content management server.

15. A method for transmitting at least one message stored in a database to a mobile device of a user based on the presence of the mobile device in a signal transmission area by transmitting an encoded signal in the signal transmission area that includes encoded data indicating a location of the at least one message in the database and transmitting the at least one message in the database to the mobile device based on the mobile device of the user decoding the data from the encoded signal and transmitting data request signal based on the data decoded from the encoded signal to a content management server to request the at least one message from the database, the method comprising:

storing at least one message at respective storage locations in a database;

storing data in a content management server in communication with the database and configured to maintain data associated with the at least one message stored in the database, wherein:
the data maintained by the content management server indicates the storage location of the at least one message in the database,
the data can be encoded into a signal broadcast in a signal transmission area,
the data is recognizable only by mobile devices running a decoding application, where, the decoding application is configured to cause at least one mobile device to decode the data encoded in the encoded signal transmitted in the signal transmission area and configured to transmit a request signal based on the data decoded from the encoded signal to the content management server, wherein the data indicates the storage location of the at least one message from the at least one mobile device;

generating the encoded signal that includes the data indicating the storage location of the at least one message stored in the database;

transmitting, in the signal transmission area, the encoded signal encoded with the data indicating the storage location of the at least one message stored in the database;

receiving, using the content management server, a request signal transmitted by the at least one mobile device associated with a user in response to the at least one mobile device decoding the encoded data from the encoded signal transmitted by the at least one broadcast device using the decoding application, wherein the request signal from the at least one mobile device is based on the data that indicates the storage location of the at least one message in the database;

selecting the at least one message associated with the storage location of the database indicated in the request signal; and sending the selected message to the at least one mobile device.

16. The method of claim 15, wherein:
the user is present in at least one location of a plurality of locations;
the at least one message is associated with a messaging campaign of a third party entity in the database based on instructions received from the third party entity through a messaging campaign interface operatively connected with the content management server;
the at least one encoding device is maintained by a media distribution entity to generate the encoded signal comprising the data and based at least in part on instructions from the content management server; and
one or more of the at least one broadcast devices are maintained by the media distribution entity to transmit the encoded signal proximate at least one of the plurality of locations based at least in part on the instructions from the content management server.

17. The method of claim 16, wherein the third party entity comprises a product supplier that supplies at least one product and the selected at least one message is associated with the at least one product.

18. The method of claim 16, wherein the media distribution entity manages a media distribution network comprising the one or more of the at least one broadcast devices and the at least one encoding device.

19. The method of claim 18, wherein one or more of the at least one encoding devices is operably connected to each of the one or more of the at least one broadcast devices and wherein each encoding device generates at least one encoded signal based at least in part on the instructions from the content management server.

20. The method of claim 19, wherein the instructions from the content management server are received by the content management server from the third party entity through the messaging campaign interface operatively connected with the content management server.

* * * * *